United States Patent [19]
Nishigaki et al.

[11] Patent Number: 6,159,673
[45] Date of Patent: Dec. 12, 2000

[54] OXONOL COMPOUND, LIGHT-SENSITIVE MATERIAL AND PROCESS FOR THE SYNTHESIS OF OXONOL COMPOUND

[75] Inventors: Junji Nishigaki; Yasuaki Deguchi, both of Kanagawa, Japan

[73] Assignee: Fuji Photo Film Co., Ltd., Minami-ashigara, Japan

[21] Appl. No.: 09/233,444

[22] Filed: Jan. 20, 1999

Related U.S. Application Data

[63] Continuation-in-part of application No. 08/896,064, Jul. 17, 1997, abandoned.

[30] Foreign Application Priority Data

| Jul. 17, 1996 | [JP] | Japan | 8-206527 |
| Aug. 19, 1996 | [JP] | Japan | 8-235893 |
| Mar. 10, 1997 | [JP] | Japan | 9-55315 |

[51] Int. Cl.$^7$ .................... G03C 1/815
[52] U.S. Cl. ............ 430/512; 430/522; 430/517; 430/518; 430/559; 544/140; 544/296; 546/119; 546/199; 546/211; 546/255; 546/256; 548/183; 548/243; 548/247; 548/249; 548/226; 548/302.7; 548/311.4; 548/312.4; 548/364.7; 548/365.4; 548/365.1; 548/374.1; 548/376.1; 548/377.1; 548/485; 548/579
[58] Field of Search .................. 548/302.7, 243, 548/247, 312.4, 579, 183, 226, 365.1, 249, 311.4, 374.1, 376.1, 377.1, 485; 430/512, 522, 517, 518, 559; 546/256, 199, 211, 119, 255; 544/296, 140

[56] References Cited

FOREIGN PATENT DOCUMENTS

11119379 A2  4/1990  Japan.

*Primary Examiner*—Joseph McKane
*Assistant Examiner*—Ebenezer Sackey
*Attorney, Agent, or Firm*—Birch, Stewart, Kolasch & Birch, LLP

[57] ABSTRACT

An oxonol compound is represented by the following formula (I):

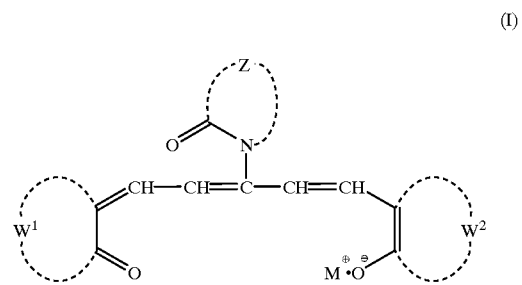

in which Z is an atomic group that forms a cyclic amide ring; each of $W^1$ and $W^2$ independently is an atomic group that forms an acidic nucleus ring; and M is a cation. Other oxonol compounds, a light-sensitive material containing an oxonol compound and a process for the synthesis of an oxonol compound are also disclosed.

22 Claims, No Drawings

OXONOL COMPOUND, LIGHT-SENSITIVE MATERIAL AND PROCESS FOR THE SYNTHESIS OF OXONOL COMPOUND

CROSS-REFERENCE TO RELATED APPLICATION

This is a continuation-in-part application of U.S. patent application Ser. No. 08/896,064 filed on Jul. 17, 1997, now abandoned.

FIELD OF THE INVENTION

The present invention relates to oxonol compounds, a light-sensitive material containing an oxonol compound and a process for the synthesis of an oxonol compound.

BACKGROUND OF THE INVENTION

A light-sensitive material, particularly a silver halide photographic material usually contains a dye, which functions as an antiirradiation dye, an antihalation dye or a filter dye that absorbs a light of a specific wavelength. An oxonol compound has been known as a representative photographic dye.

For example, U.S. Pat. Nos. 3,247,127, 3,469,985, 4,078, 933, British Patent Nos. 506,385, 1,177,429, 1,311,884, 1,338,799, 1,433,102, 1,467,214, 1,553,516, Japanese Patent Provisional Publication Nos. 48(1973)-85130, 49(1974)-114420, 55(1980)-161233 and 59(1984)-111640 disclose oxonol dyes having a pyrazolone nucleus or a barbituric acid nucleus. Japanese Patent Provisional Publication No. 5(1993)-197079 discloses an oxonol dye having a furanone or thiophene skeleton. U.S. Pat. No. 5,283,165 discloses an oxonol dye having a pyrrolinone skeleton. U.S. Pat. Nos. 2,533,472, 3,379,533 and British Patent No. 1,278, 621 disclose other oxonol dyes.

In the case that an oxonol dye is used as a photographic (antiirradiation, antihalation or filter) dye, the dye functions at the step of imagewise exposing a silver halide photographic material to light. After the exposing step, the dye should be removed or bleached at the step of developing or fixing the photographic material. If the dye is not sufficiently removed or bleached from the photographic material, the image (particularly white background) would be colored with the remaining dye. Further, a photographic system has another problem that the dye is accumulated in a developing solution. A recent photographic system requires a rapid development process. The above-mentioned problems about the dyes are remarkable in the rapid development process.

In the case that an oxonol dye is used as an antihalation dye, an absorption spectrum is the important factor of the dye. It has been known that the absorption spectrum can be changed by attaching a substituent group to a methine chain of the dye. European Patent No. 397,435 discloses an oxonol dye having a five, six or seven-membered carbon cyclic, heterocyclic or condensed cyclic group on a methine chain of the dye. U.S. Pat. Nos. 3,653,905 and 4,042,397 disclose barbituric acid oxonol dyes, which may have a methine chain substituted with an alkyl group, an aralkyl group, an aryl group or carboxyl. U.S. Pat. No. 3,370,950 discloses an oxonol dye having a pyrazolone skeleton and a methine chain substituted with acetyl. Japanese Patent Provisional Publication Nos. 8(1996)-50346 and 8(1996)-109334 describe that the coloring of the white background can be prevented by introduction of a substituent group into a methine chain of an oxonol dye.

SUMMARY OF THE INVENTION

The present inventors have studied the known oxonol dyes. As a result, the present inventors note a problem that the known dyes are not stable in an aqueous solution. The present inventors further note that the problem is caused by the substituent group attached to a methine chain of the dyes. A silver halide photographic material is usually prepared by using an aqueous solution of a dye. The problem of the instability of a dye in an aqueous solution further causes a problem in the preparation of a photographic material.

An object of the present invention is to provide an oxonol compound, which can advantageously be used as a dye in a silver halide photographic material.

Another object of the invention is to provide an excellent oxonol dye, which is stable in an aqueous solution, has an appropriate absorption spectrum, and is easily removed or bleached at a development process.

A further object of the invention is to provide a light-sensitive material containing an excellent oxonol dye.

A furthermore object of the invention is to provide a process for the synthesis of an excellent oxonol dye.

The present invention provides an oxonol compound represented by the following formula (I):

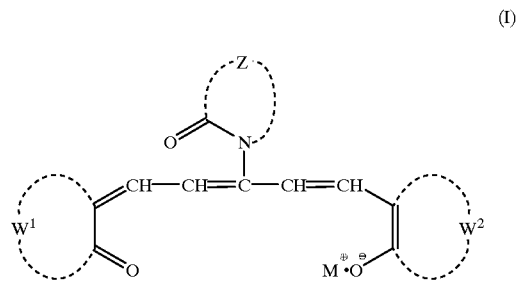

in which Z is an atomic group that forms a cyclic amide ring; each of $W^1$ and $W^2$ independently is an atomic group that forms an acidic nucleus ring; and M is a cation.

The invention also provides an oxonol compound represented by the following formula (IIa), (IIIa), (IIb), (IIIb), (IIc) or (IIIc):

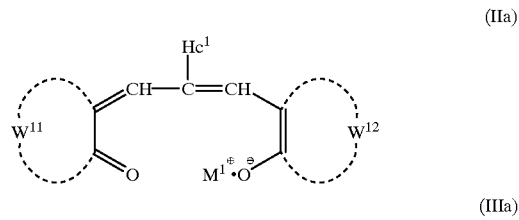

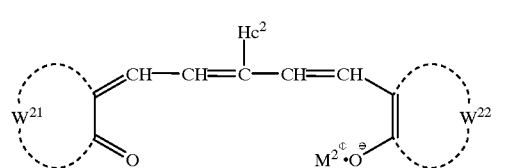

-continued

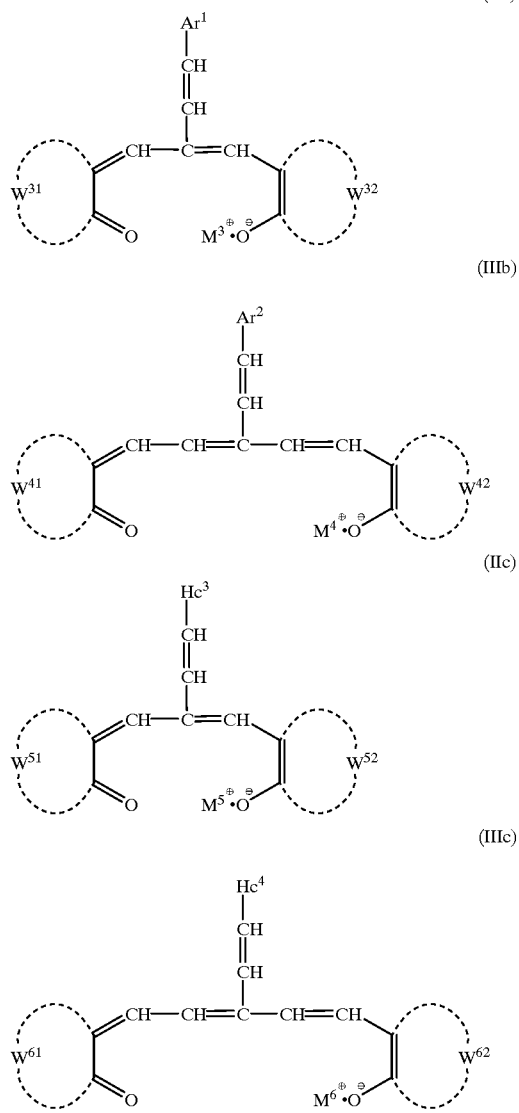

in which each of $W^{11}$, $W^{12}$, $W^{21}$, $W^{22}$, $W^{31}$, $W^{32}$, $W^{41}$, $W^{42}$, $W^{51}$, $W^{52}$, $W^{61}$ and $W^{62}$ independently is an atomic group that forms an acidic nucleus ring; each of $M^1$, $M^2$, $M^3$, $M^4$, $M^5$ and $M^6$ independently is a cation: each of $Hc^1$, $Hc^2$, $Hc^3$ and $Hc^4$ independently is an unsaturated heterocyclic group; and each of $Ar^1$ and $Ar^2$ independently is an aromatic group.

The invention further provides a light-sensitive material comprising a support, a light-sensitive layer and a non-light-sensitive layer, wherein the light-sensitive layer or the non-light-sensitive layer contains an oxonol dye represented by the above-mentioned formula (I), (IIa), (IIIa), (IIb), (IIIb), (IIc) or (IIIc).

The invention furthermore provides a process for the synthesis of an oxonol compound, wherein an oxonol compound represented by the following formula (VI) is synthesized by a reaction of an α-ketomethylene compound represented by the following formula (IV) with a pyridinium compound represented by the following formula (V):

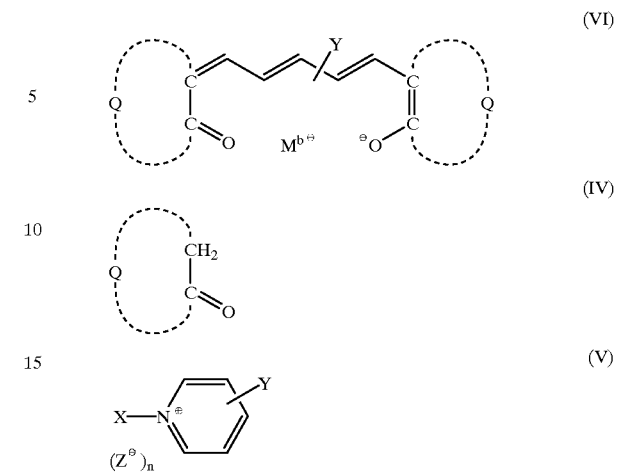

in which Q is an atomic group that forms a carbon ring or a heterocyclic ring; X is a heterocyclic group; Y is a substituent group for the methine chain in the formula (VI) or the pyridinium ring in the formula (V); Z is an anion; n is an integer required for neutralizing the molecule in the formula (V); and $M^b$ is a cation.

According to study of the present inventors, the stability of an oxonol dye can be improved by attaching a specific substituent group to only the meso-position of a methine chain (the centered methine) of the dye. The oxonol compounds of the present invention are stable in an aqueous solution. Further, the compounds have an appropriate absorption spectrum. Furthermore, the dyes can easily be removed from a silver halide photographic material at a development process. Accordingly, the oxonol compounds of the present invention can be advantageously used in a silver halide photographic material. The oxonol compound can advantageously be synthesized by the above-mentioned process.

DETAILED DESCRIPTION OF THE INVENTION

The oxonol compounds of the present invention are characterized in a specific substituent group at the meso-position of the methine chain (the centered methine).

The first embodiment of the oxonol dye is represented by the formula (I).

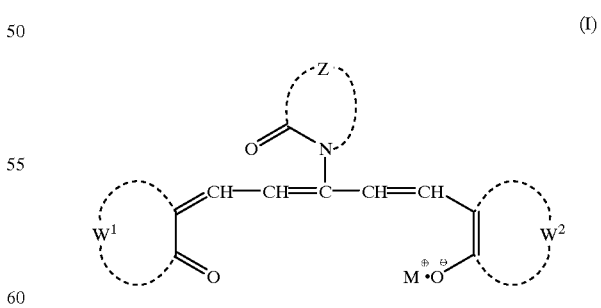

In the formula (I), Z is an atomic group that forms a cyclic amide (heterocyclic) ring. Since the linking group of —CO—N— is shown in the formula (I), Z represents the other atoms (including substituent groups attached to the atoms) and the bonds between the atoms. The cyclic amide ring preferably is a four to seven-membered ring, and more preferably is a five or six-membered ring. The hetero atom in the ring preferably is nitrogen, oxygen or sulfur, and more preferably is nitrogen or oxygen. Another heterocyclic ring, an aliphatic ring or an aromatic ring (preferably another heterocyclic ring or an aromatic ring) may be condensed with the cyclic amide ring of Z.

Examples of the cyclic amide rings include 2,4-imidazolidinedione-3-yl, 2,4-oxazolidinedione-3-yl, succinimido, phthalimido, maleimido, 2,4,6-pyperidinetrione-1-yl, 2,10-perhydroazecinedione-1-yl, 2,4-thiazolidinedione-3-yl, 2,6-piperidinedione-1-yl, 3,5-morpholinedione-4-yl, 2,6-piperadinedione-1-yl, 2-pyrrolidinone-1-yl, 2-pyrroline-5-one-1-yl, 5-pyrazolidinone-1-yl, 5-pyrazolone-1-yl, 2-imidazolidinone-1-yl, 2-imidazoline-5-one-1-yl, 3-pyrazoline-5-one-1-yl, 2-indolinone-1-yl, 1-isoindolinone-2-yl, 2-piperidinone-1-yl, 2-piperadinone-1-yl, 3-morpholinone-4-yl and 2-pyridone-1-yl. The cyclic amide ring preferably is 2,4-imidazolidinedione-3-yl, 2,4-oxazolidinedione-3-yl, succinimido, phthalimido, maleimido, 2,6-piperidinedione-1-yl, 3,5-morpholinedione-4-yl, 2-pyrrolidinone-1-yl, 2-piperidinone-1-yl and 3-morpholinone-4-yl. The cyclic amide ring more preferably is 2,4-imidazolidinedione-3-yl, succinimido, phthalimido, 3,5-morpholinedione-4-yl, 2-pyrrolidinone-1-yl and 2-piperidinone-1-yl.

The heterocyclic ring of Z may have a substituent group. Examples of the substituent groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, hydroxyl, an alkoxycarbonyl group having 2 to 10 carbon atoms (e.g., methoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt.

In the formula (I), each of $W^1$ and $W^2$ independently is an atomic group that forms acidic nucleus ring. The acidic nucleus ring preferably is a four to seven-membered heterocyclic ring, and more preferably is a five or six-membered heterocyclic ring. The hetero atom in the ring preferably is nitrogen, oxygen or sulfur, and more preferably is nitrogen or oxygen. The ring preferably has at least one nitrogen atom as the hetero atom. The heterocyclic ring is preferably unsaturated. Another heterocyclic ring, an aliphatic ring or an aromatic ring (preferably another heterocyclic ring or an aromatic ring) may be condensed with the heterocyclic ring. $W^1$ and $W^2$ in the formula (I) preferably have an identical chemical structure.

Examples of the acidic nucleus rings of $W^1$ and $W^2$ include furanone, benzofuranone, pyrrolinone, pyridone, pyrazolone, pyrazolidinedione, isoxazolone, imidazolone, pyrazolopyridone, barbituric acid, rhodanine, hydantoin, thiohydantoin, oxyindole, diazaindanone and coumarin. Benzofuranone, pyridone, pyrazolone, pyrazolidinedione, isoxazolone, imidazolone, pyrazolopyridone, barbituric acid, oxyindole and diazaindanone are preferred, benzofuranone, pyrazolone, pyrazolidinedione and isoxazolone are more preferred, and pyrazolone is most preferred.

The acidic nucleus ring of $W^1$ and $W^2$ may have a substituent group. Examples of the substituent groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, hydroxyl, an alkoxycarbonyl group having 2 to 10 carbon atoms (e.g., raethoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt. The alkyl group, carboxyl, hydroxyl, sulfo and amino are preferred, and the alkyl group, hydroxyl and sulfo are more preferred.

In the formula (I), M is a cation. The cation preferably is a monovalent ion. Examples of the cations include proton, an alkali metal ion (e.g., lithium ion, potassium ion, sodium ion) and an organic ion (e.g., tetraalkcylammonium ion, pyridinium ion). Proton, potassium ion, sodium ion, triethylammonium ion and pyridinium ion are preferred, and proton, potassium ion and sodium ion are more preferred. In the case that M is proton, the proton and the neighboring oxygen atom form hydroxyl.

A preferred oxonol compound is represented by the formula (Ia).

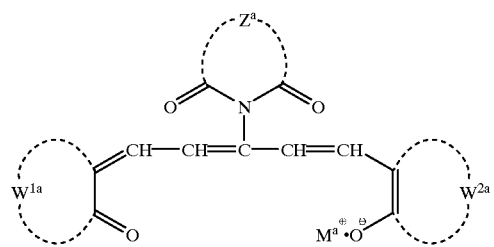

In the formula (Ia), $Z^a$ is an atomic group that forms a cyclic imide (heterocyclic) ring. Since the linking group of —CO—N—CO— is shown in the formula (Ia), $Z^a$ represents the other atoms (including substituent groups attached to the atoms) and the bonds between the atoms. The cyclic imide ring preferably is a four to seven-membered ring, and more preferably is a five or six-membered ring. The hetero atom in the ring preferably is nitrogen, oxygen or sulfur, and more preferably is nitrogen or oxygen. Another heterocyclic ring, an aliphatic ring or an aromatic ring (preferably another heterocyclic ring or an aromatic ring) may be condensed with the cyclic imide ring of $Z^a$.

The substituent groups of the cyclic imide ring of $Z^a$ are the same as those of the cyclic amide ring of Z in the formula (I).

$Z^a$ preferably is a linking group selected from the group consisting of —$CR^{1a}R^{2a}$—$NR^{3a}$—, —$CR^{4a}R^{5a}$—O—, —CR$^{6a}$R$^{7a}$—CR$^{8a}$R$^{9a}$—, —CR$^{10a}$=CR$^{11a}$—, —CR$^{12a}$R$^{13a}$—CR$^{14a}$R$^{15a}$—CR$^{16a}$R$^{17a}$—, —CR$^{18a}$R$^{19a}$—S— and —CR$^{20a}$R$^{21a}$—O—CR$^{22a}$R$^{23a}$—. Each of R$^{1a}$, R$^{2a}$, R$^{3a}$, R$^{4a}$, R$^{5a}$, R$^{6a}$, R$^{7a}$, R$^{8a}$, R$^{9a}$, R$^{10a}$, R$^{11a}$, R$^{12a}$, R$^{13a}$, R$^{14a}$, R$^{15a}$, R$^{16a}$, R$^{17a}$, R$^{18a}$, R$^{19a}$, R$^{20a}$, R$^{21a}$, R$^{22a}$ and R$^{23a}$ has the same meanings of the substituent groups of the cyclic amide ring of Z in the formula (I). Two of R$^{1a}$, R$^{2a}$, R$^{3a}$, R$^{4a}$, R$^{5a}$, R$^{6a}$, R$^{7a}$, R$^{8a}$, R$^{9a}$, R$^{10a}$, R$^{11a}$, R$^{12a}$, R$^{13a}$, R$^{14a}$, R$^{15a}$, R$^{16a}$, R$^{17a}$, R$^{18a}$, R$^{19a}$, R$^{20a}$, R$^{21a}$, R$^{22a}$ and R$^{23a}$ may be combined to form an aromatic, aliphatic or heterocyclic ring condensed with the cyclic imide ring.

In the formula (Ia), each of W$^{1a}$ and W$^{2a}$ independently is an atomic group that forms acidic nucleus ring. The definitions and the substituent groups of W$^{1a}$ and W$^{2a}$ are the same as those of W$^{1}$ and W$^{2}$ in the formula (I).

In the formula (Ia), M$^{a}$ is a cation. The definitions and the substituent groups of M$^{a}$ are the same as those of M in the formula (I).

Examples of the oxonol compounds represented by the formula (Ia) are shown below.

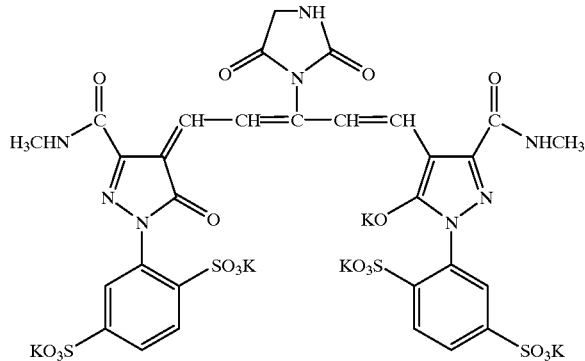

Ia-1

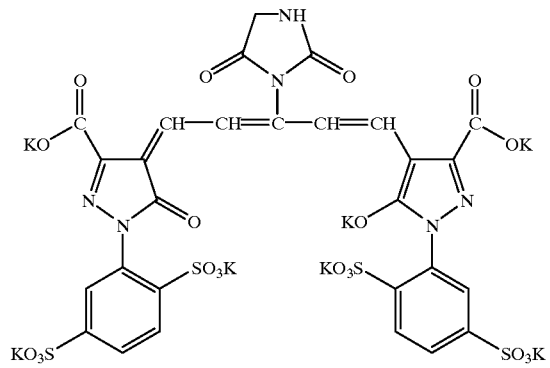

Ia-2

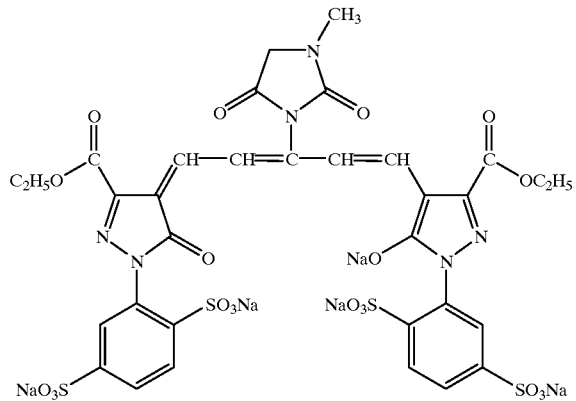

Ia-3

-continued
Ia-4
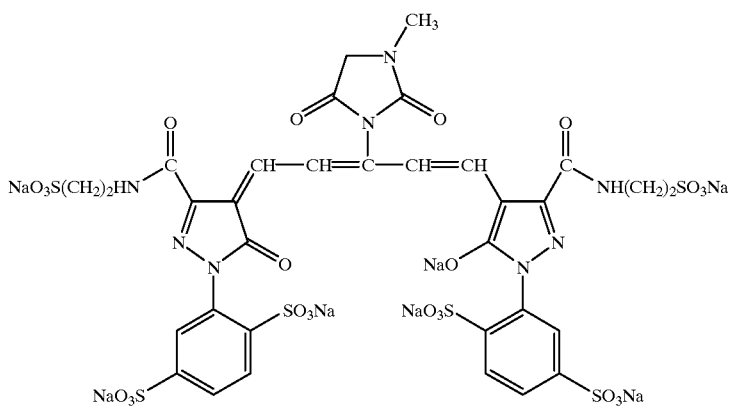
Ia-5
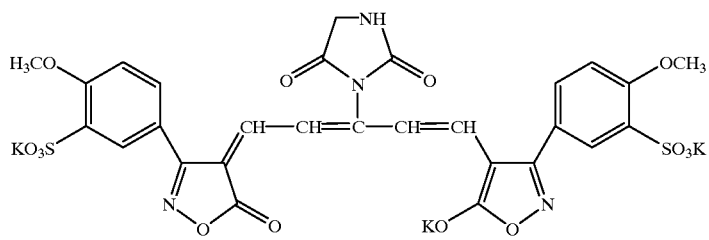
Ia-6
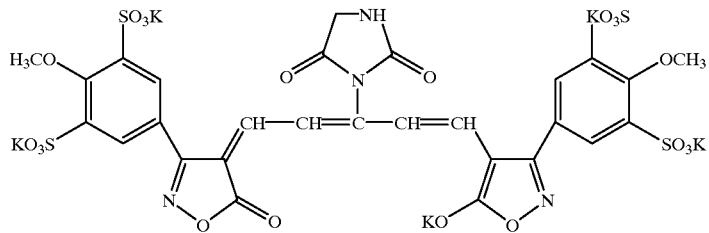
Ia-7
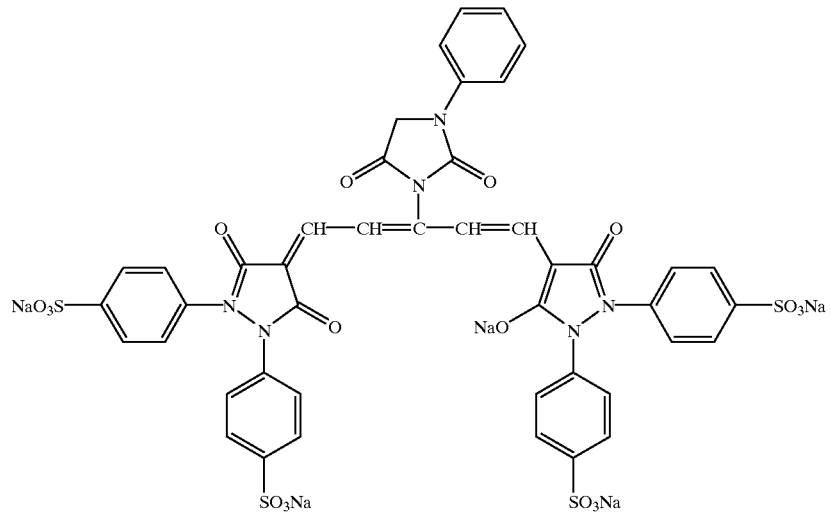

Ia-8
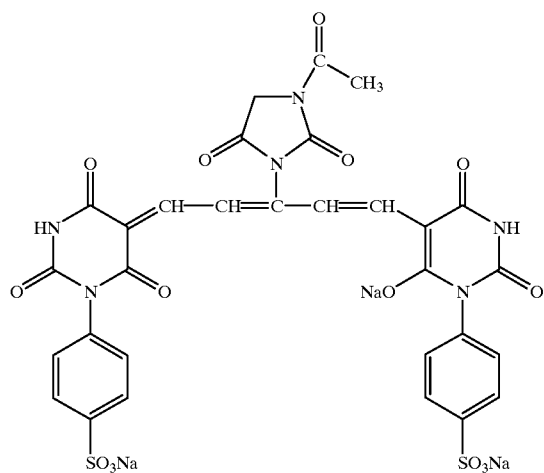
Ia-9
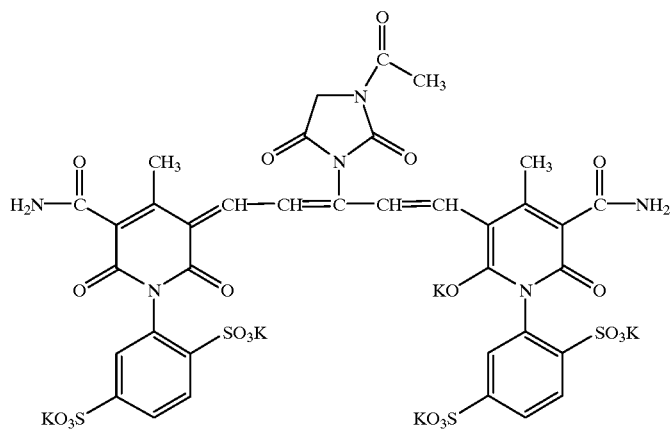
Ia-10
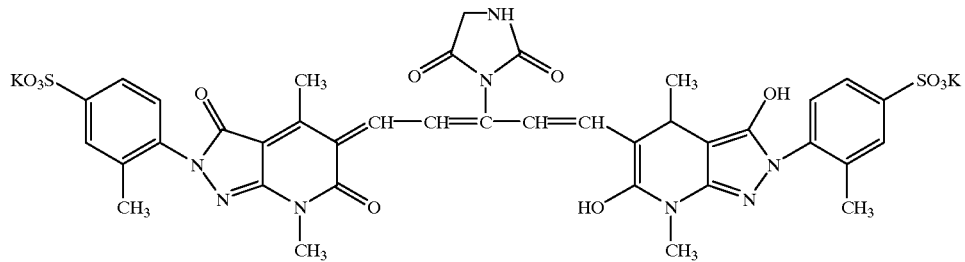
Ia-11
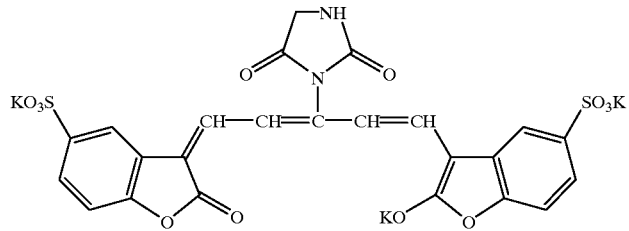

Ia-12
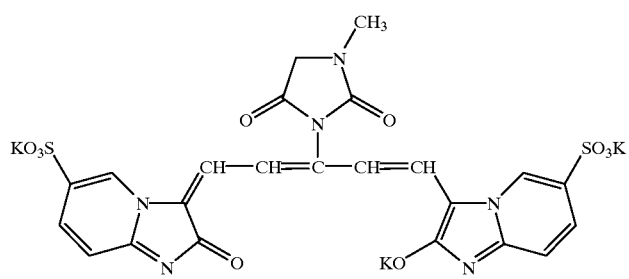
Ia-13
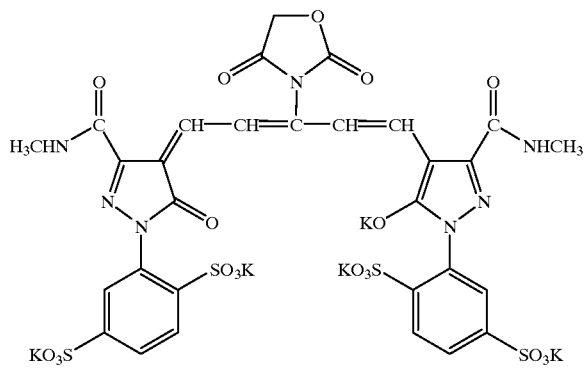
Ia-14
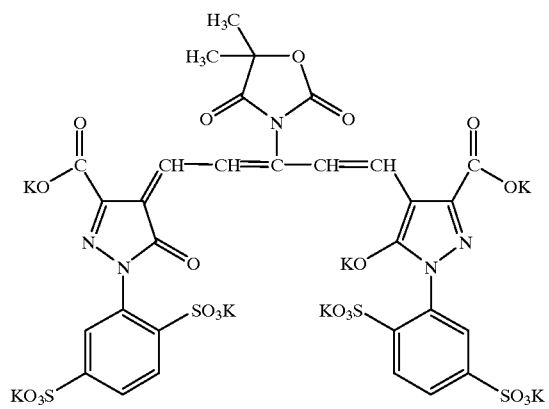
Ia-15
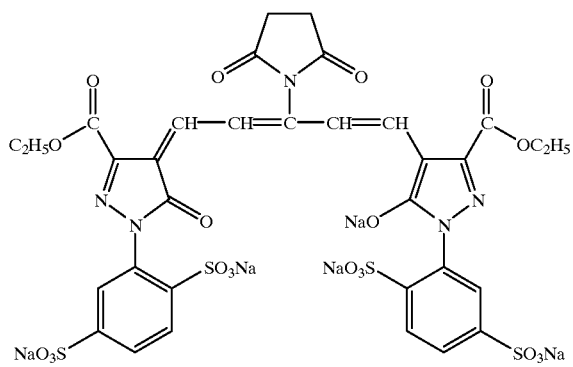

Ia-16
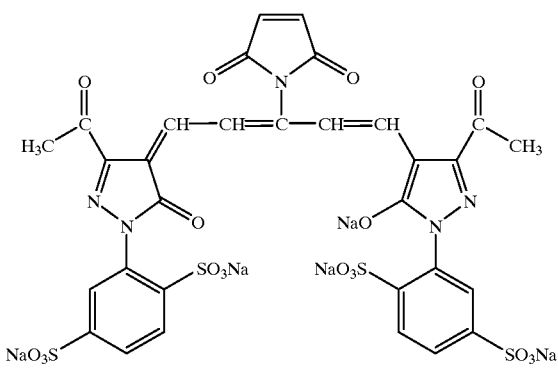
Ia-17
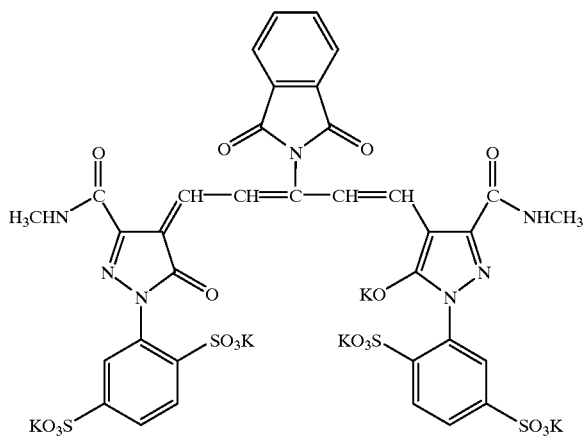
Ia-18
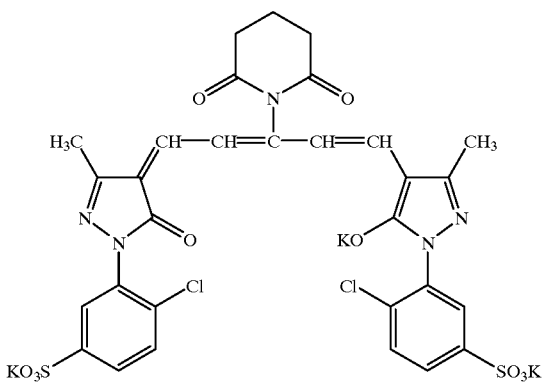
Ia-19
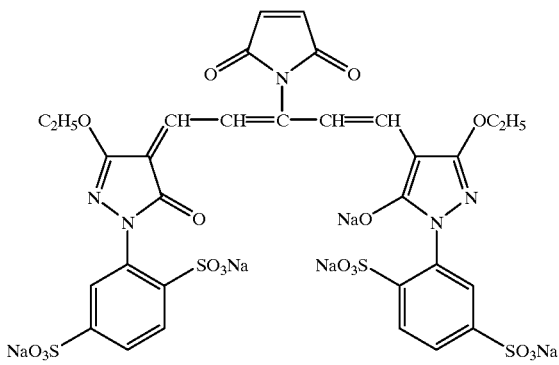

Ia-20
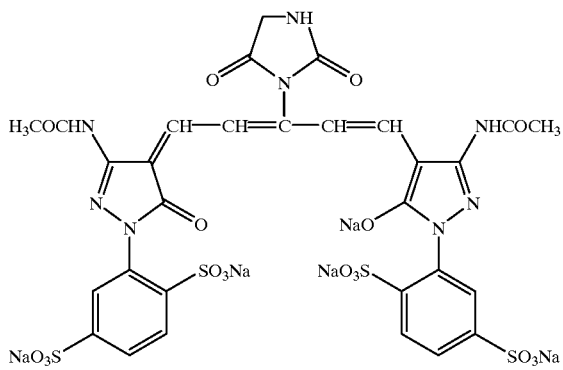
Ia-21
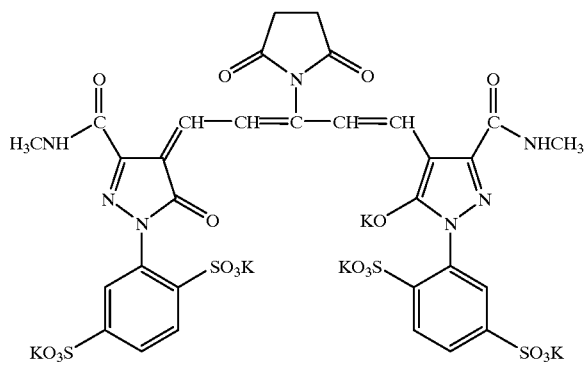
Ia-22
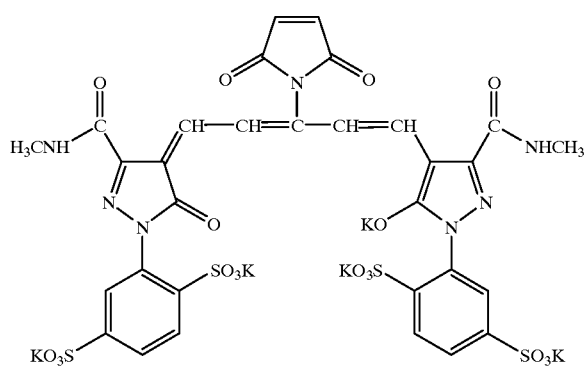
Ia-23
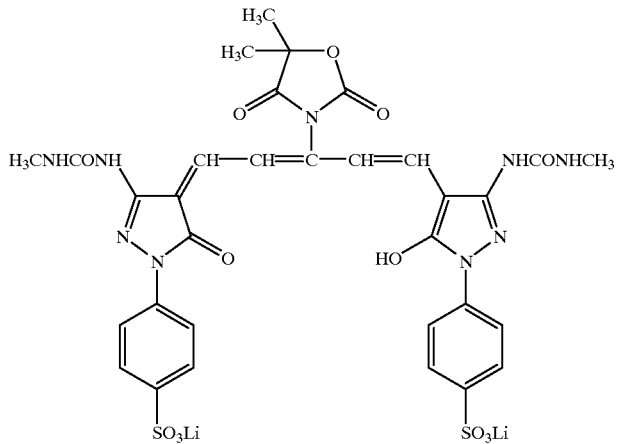

Ia-24
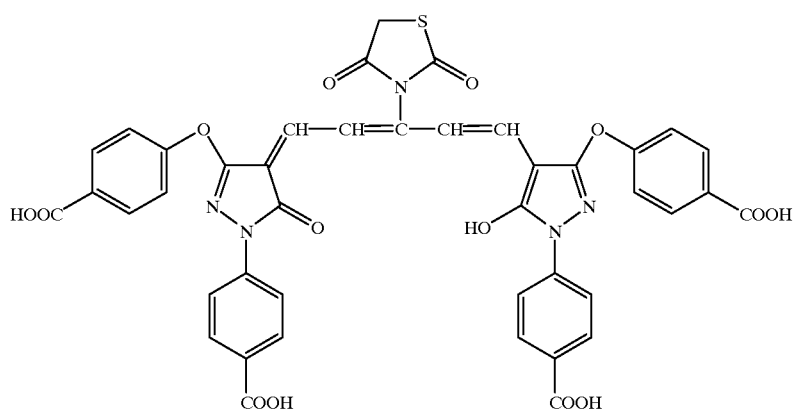
Ia-25
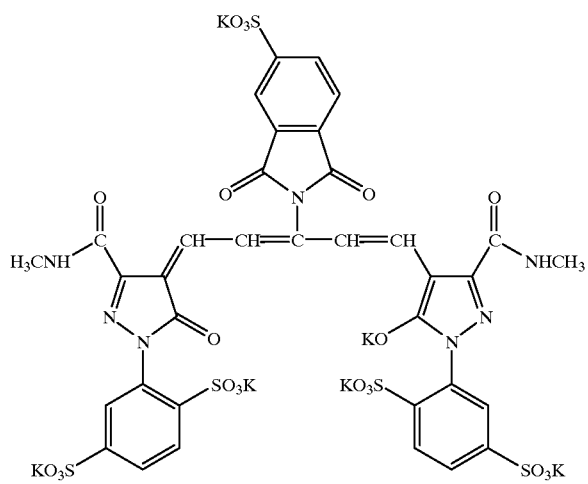
Ia-26
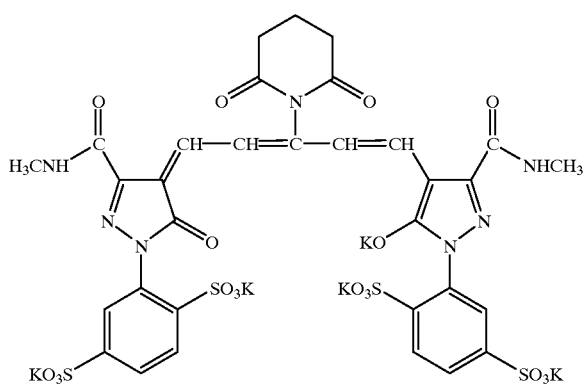
Ia-27
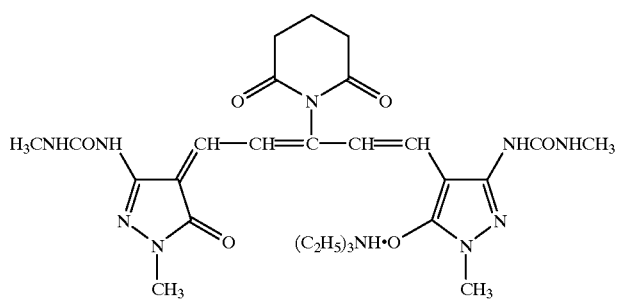

Ia-28
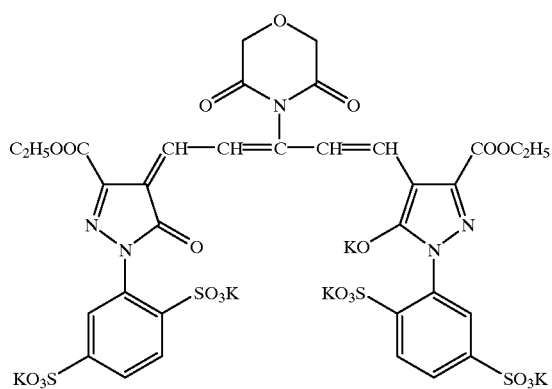
Ia-29
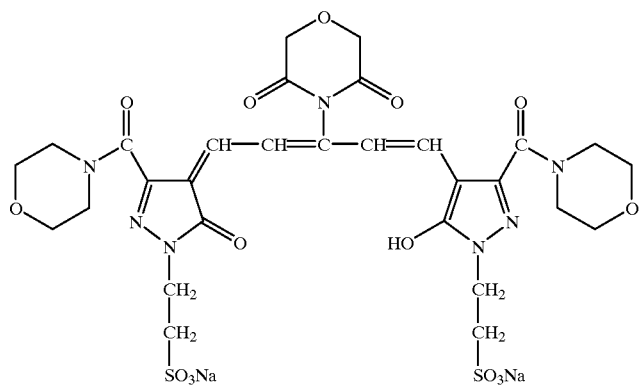
Ia-30
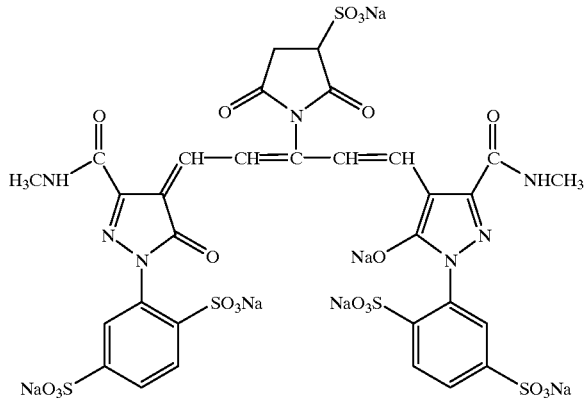
Ia-31
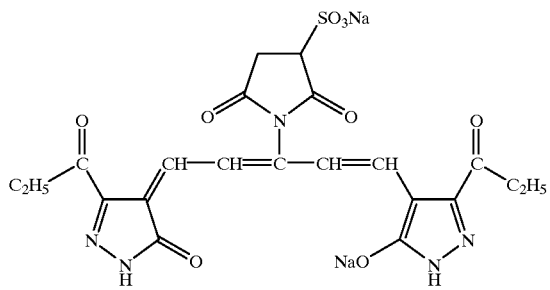

Another preferred oxonol compound is represented by the formula (Ib).

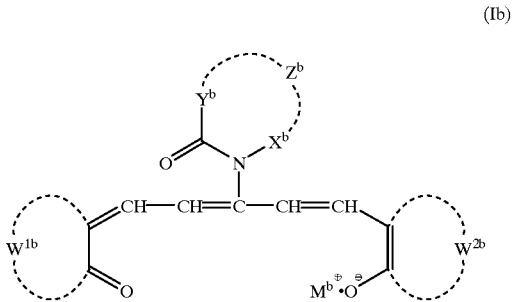

(Ib)

In the formula (Ib), $X^b$ is —CHR$^{1b}$—, —CR$^{2b}$=, —NR$^{3b}$— or —N=. $R^{1b}$ is hydrogen, hydroxyl or carboxyl. $R^{2b}$ is hydrogen or is combined with $R^{8b}$ to form a benzene ring condensed with the cyclic amide ring. $R^{3b}$ is hydrogen or an alkyl group having 1 to 20 carbon atoms.

In the formula (Ib), $Y^b$ is —CR$^{4b}$R$^{5b}$—, —CR$^{6b}$= or —NR$^{7b}$—. Each of $R^{4b}$, $R^{5b}$ and $R^{7b}$ independently is hydrogen or an alkyl group having 1 to 20 carbon atoms. $R^{6b}$ is hydrogen or is combined with $R^{9b}$ to form a benzene ring condensed with the cyclic amide ring.

In the formula (Ib), $Z^b$ is —CH$_2$—, —CR$^{8b}$=, —N=, =CR$^{9b}$—, —CH$_2$—CH$_2$—, —NH—CH$_2$—, —O—CH$_2$— or =CH—CH=, —O—, —S— or —CO—CH$_2$—. In the above-mentioned linking groups, the right side is attached to $X^b$, and the left side is attached to $Y^b$. $R^{8b}$ is hydrogen or is combined with $R^{2b}$ to form a benzene ring condensed with the cyclic amide ring. $R^{9b}$ is hydrogen or is combined with $R^{6b}$ to form a benzene ring condensed with the cyclic amide ring.

In the formula (Ib), each of $W^{1b}$ and $W^{2b}$ independently is an atomic group that forms an acidic nucleus ring. The definitions and the substituent groups of $W^{1b}$ and $W^{2b}$ are the same as those of $W^1$ and $W^2$ in the formula (I).

In the formula (Ib), $M^b$ is a cation. The definitions and the substituent groups of $M^b$ are the same as those of M in the formula (I).

The oxonol compound represented by the formula (Ib) is more preferably represented by the formula (Ic).

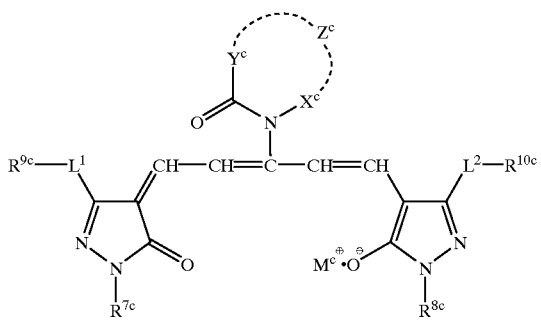

(Ic)

In the formula (Ic), $X^c$ is —CHR$^{1c}$—, —CR$^{2c}$=, —NH— or —N=. $R^{1c}$ is hydrogen, hydroxyl or carboxyl. $R^{2c}$ is hydrogen or is combined with $R^{5c}$ (described below) to form a benzene ring condensed with the cyclic amide ring.

In the formula (Ic), $Y^c$ is —CH$_2$—, —CR$^{3c}$= or —NR$^{4c}$—. $R^{3c}$ is hydrogen or is combined with $R^{6c}$ (described below) to form a benzene ring condensed with the cyclic amide ring. $R^{4c}$ is hydrogen or an alkyl group having 1 to 20 carbon atoms.

In the formula (Ic), $Z^c$ is —CH$_2$—, —CR$^{5c}$=, —N=, =CR$^{6c}$—, —CH$_2$—CH$_2$—, —NH—CH$_2$—, —O—CH$_2$— or =CH—CH=. In the above-mentioned linking groups, the right side is attached to $X^c$, and the left side is attached to $Y^c$. $R^{5c}$ is hydrogen or is combined with $R^{2c}$ to form a benzene ring condensed with the cyclic amide ring, and $R^{6c}$ is hydrogen or is combined with $R^{3c}$ to form a benzene ring condensed with the cyclic amide ring.

In the formula (Ic), each of $R^{7c}$ and $R^{8c}$ independently is hydrogen, an alkyl group (preferably 1 to 20 carbon atoms), a sulfoalkyl group (preferably 1 to 20 carbon atoms), a carboxyalkyl group (preferably 2 to 20 carbon atoms), a hydroxyalkyl group (preferably 1 to 20 carbon atoms), a halogenated alkyl group (preferably 1 to 20 carbon atoms), an aryl group (preferably 6 to 20 carbon atoms), an alkylaryl group (preferably 7 to 20 carbon atoms), a sulfoaryl group (preferably 6 to 20 carbon atoms), a carboxyaryl group (preferably 7 to 20 carbon atoms), a hydroxyaryl group (preferably 7 to 20 carbon atoms), a halogenated aryl group (preferably 6 to 20 carbon atoms), an aralkyl group (preferably 7 to 20 carbon atoms), an alkoxycarbonyl group (preferably 2 to 10 carbon atoms), an acyl group (preferably 2 to 10 carbon atoms) or a carbamoyl group (preferably 1 to 20 carbon atoms). Each of $R^{7c}$ and $R^{8c}$ more preferably is a sulfoalkyl group (e.g., sulfoethyl), a carboxyalkyl group (e.g., carboxymethyl), a sulfoaryl group (e.g., 4-sulfophenyl, 2,5-disulfophenyl) or a carboxyaryl group (e.g., 4-carboxyphenyl), and more preferably is a sulfoalkyl group or a sulfoaryl group, and most preferably is a sulfoaryl group.

In the formula (Ic), each of $L^1$ and $L^2$ independently is a single bond or a divalent linking group selected from the group consisting of —O—, —CO—, —NR$^{11c}$—, —SO$_2$—, —SO— and a combination thereof. Examples of the combinations include —CO—NR$^{11c}$—, —CO—O—, —NR$^{11c}$—CO— and —NR$^{11c}$—CO—NR$^{11c}$—, $R^{11c}$ is hydrogen, an alkyl group (preferably 1 to 20 carbon atoms), a sulfoalkyl group (preferably 1 to 20 carbon atoms), an aryl group (preferably 6 to 20 carbon atoms), a sulfoaryl group (preferably 6 to 20 carbon atoms), an aralkyl group (preferably 7 to 20 carbon atoms), morpholino or cyano.

In the formula (Ic), each of $R^{9c}$ and $R^{10c}$ independently is hydrogen, an alkyl group (preferably 1 to 20 carbon atoms), a sulfoalkyl group (preferably 1 to 20 carbon atoms), an aryl group (preferably 6 to 20 carbon atoms), a sulfoaryl group (preferably 6 to 20 carbon atoms), an aralkyl group (preferably 7 to 20 carbon atoms), morpholino or cyano. In the formula (Ic), $M^c$ is a cation. The definitions and the substituent groups of $M^b$ are the same as those of M in the formula (I).

Examples of the oxonol compounds represented by the formula (Ib) are shown below.

Ib-1
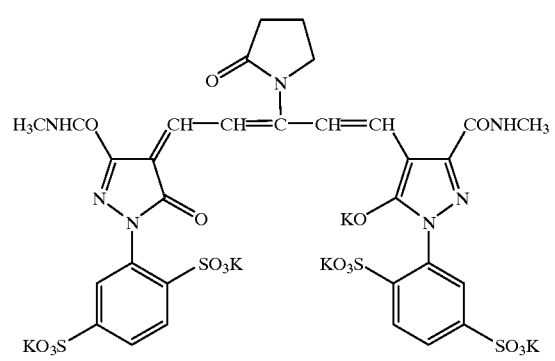
Ib-2
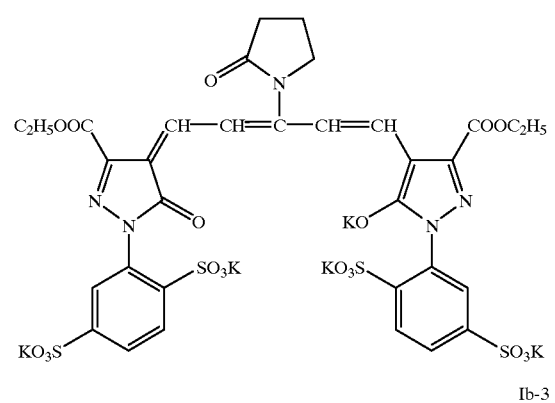
Ib-3
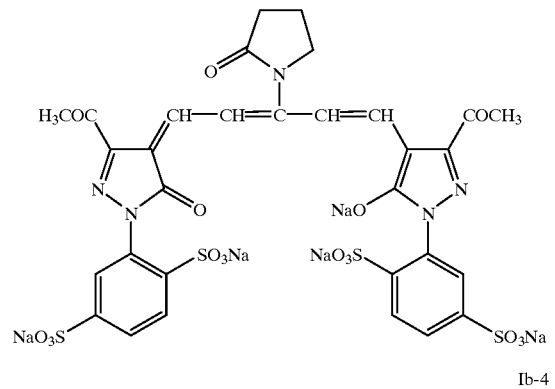
Ib-4
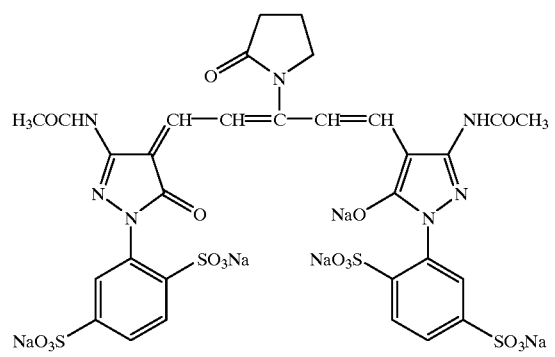
Ib-5
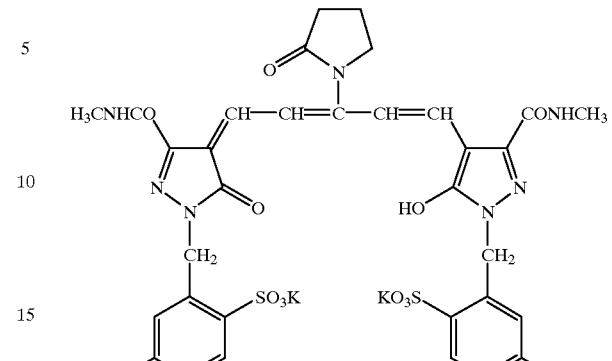
Ib-6
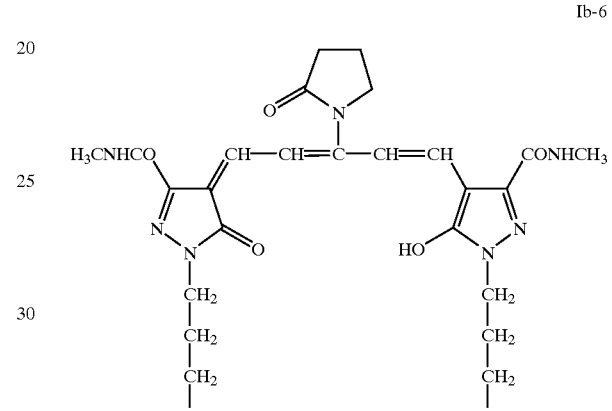
Ib-7
Ib-8
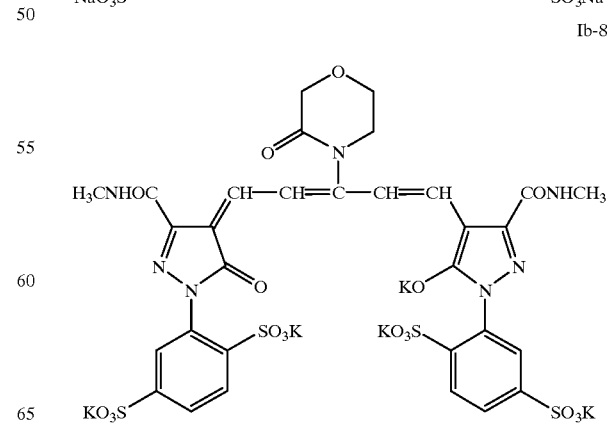

-continued

Ib-9
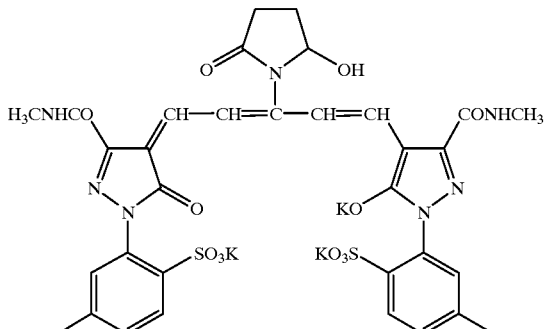

Ib-10
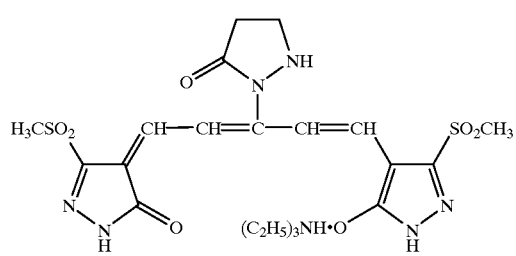

Ib-11
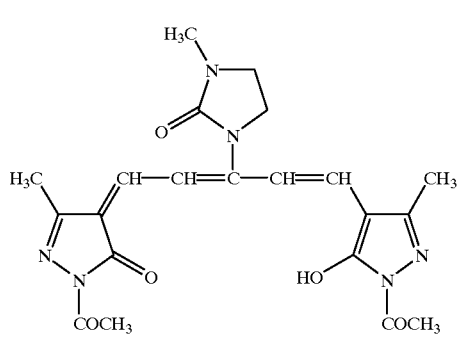

Ib-12
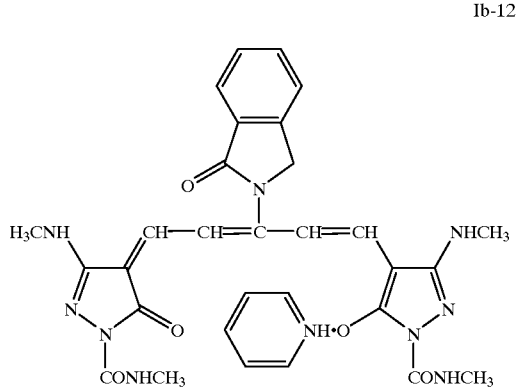

The second embodiment of the oxonol dye is represented by the formula (IIa) or (IIIa).

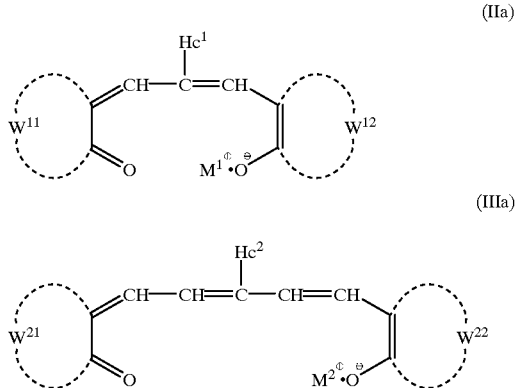

In the formulas (IIa) and (IIIa), each of $W^{11}$, $W^{12}$, $W^{21}$ and $W^{22}$ independently is an atomic group that forms an acidic nucleus ring. The acidic nucleus ring preferably is a four to seven-membered ring, and more preferably is a five or six-membered ring. The hetero atom in the ring preferably is nitrogen, oxygen or sulfur, and more preferably is nitrogen or oxygen. The ring preferably has at least one nitrogen atom as the hetero atom. The heterocyclic ring is preferably unsaturated. Another heterocyclic ring, an aliphatic ring or an aromatic ring (preferably another heterocyclic ring or an aromatic ring) may be condensed with the acidic nucleus ring. $W^{11}$ and $W^{12}$ in the formula (IIa) preferably have an identical chemical structure. $W^{21}$ and $W^{22}$ in the formula (IIIa) also preferably have an identical chemical structure.

Examples of the acidic nucleus rings include furanone, benzofuranone, pyrrolinone, pyridone, pyrazolone, pyrazolidinedione, isoxazolone, imidazolone, pyrazolopyridone, barbituric acid, rhodanine, hydantoin, thiohydantoin, oxyindole, diazaindanone and coumarin. Benzofuranone, pyridone, pyrazolone, pyrazolidinedione, isoxazolone, imidazolone, pyrazolopyridone, barbituric acid, oxyindole and diazaindanone are preferred, benzofuranone, pyrazolone, pyrazolidinedione and isoxazolone are more preferred.

The acidic nucleus ring may have a substituent group. Examples of the substituent groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, an alkoxycarbonyl group having 2 to 10 carbon atoms (e.g., methoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt.

In the formulas (IIa) and (IIIa), each of $M^1$ and $M^2$ independently is a cation. The cation preferably is a monovalent ion. Examples of the cations include proton, an alkali metal ion (e.g., lithium ion, potassium ion, sodium ion) and an organic ion (e.g., tetraalkylammonium ion, pyridinium ion). Proton, potassium ion, sodium ion, triethylammonium ion and pyridinium ion are preferred, and proton, potassium ion and sodium ion are more preferred. In the case that $M^1$ or $M^2$ is proton, the proton and the neighboring oxygen atom form hydroxyl.

In the formulas (IIa) and (IIIa), each of $Hc^1$ and $Hc^2$ independently is an unsaturated heterocyclic group. The heterocyclic ring preferably is a four to seven-membered ring, and more preferably is a five or six-membered ring. The hetero atom in the ring preferably is nitrogen, oxygen or sulfur, and more preferably is nitrogen or oxygen. The ring preferably has at least one nitrogen atom as the hetero atom. Another heterocyclic ring, an aliphatic ring or an aromatic ring (preferably another heterocyclic ring or an aromatic ring) may be condensed with the heterocyclic ring.

Examples of the unsaturated heterocyclic groups include pyridyl, quinolyl, pyridazinyl, pyrimidinyl, pyrazyl, pyrrolyl, indolyl, pyrazolyl, isoxazolyl, indazolyl, imidazolyl, triazolyl, tetrazolyl, oxazolyl, furanyl and thienyl. The unsaturated heterocyclic group preferably is 4-pyridyl, 2-pyridyl, imidazolyl, triazolyl, tetrazolyl, oxazolyl or furanyl, and more preferably is 4-pyridyl, 2-pyridyl or furanyl.

The unsaturated heterocyclic group may have a substituent group. Examples of the substituent groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, an alkoxycarbonyl group having 2 to 10 carbon atoms (e.g., methoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt.

The oxonol compound is preferably represented by the formula (IIA) or (IIIA).

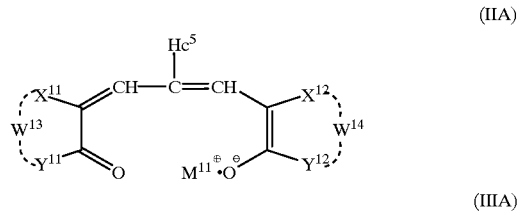
(IIA)

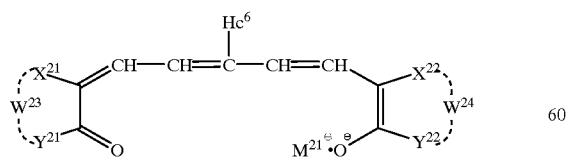
(IIIA)

In the formulas (IIA) and (IIIA), each of $X^{11}$, $X^{12}$, $X^{21}$ and $X^{22}$ independently is $-CR^{11}=$, $-CO-$ or $-NR^{12}-$.

In the formulas (IIA) and (IIIA), each of $Y^{11}$, $Y^2$, $Y^{21}$ and $Y^{22}$ independently is $-NR^{13}-$, $-N=$ or $-O-$.

Each of $R^{11}$, $R^{12}$ and $R^{13}$ independently is an alkyl group having 1 to 6 carbon atoms (e.g., methyl, ethyl, propyl, carboxymethyl, sulfoethyl), an aralkyl group having 7 to 10 carbon atoms (e.g., benzyl, phenethyl), an alkoxy group having 1 to 6 carbon atoms (e.g., methoxy, ethoxy), an aryl group having 6 to 15 carbon atoms (e.g., phenyl, 4-sulfophenyl, 2,5-disulfophenyl, 4-carboxyphenyl, naphthyl), an alkoxycarbonyl group having 2 to 6 carbon atoms (e.g., methoxycarbonyl, ethoxycarbonyl), an acyl group having 2 to 6 carbon atoms (e.g., acetyl, pivaloyl), a carbamoyl group having 1 to 8 carbon atoms (e.g., carbamoyl, methylcarbamoyl, morpholinocarbamoyl), a sulfamoyl group having 1 to 8 carbon atoms (e.g., methylsulfamoyl), a substituted amino group having 1 to 10 carbon atoms (e.g., dimethylamino, diethylamino, disulfoethylamino, N-ethyl-N'-sulfoethylamino), carboxyl or a salt thereof.

In the formulas (IIA) and (IIIA), each of $W^{13}$, $W^{14}$, $W^{23}$ and $W^{24}$ independently is an atomic group that forms an acidic nucleus ring. The acidic nucleus ring preferably is a four to seven-membered ring, and more preferably is a five or six-membered ring. Since four atoms are shown in the formulas (IIA) and (IIIA), each of $W^{13}$, $W^{14}$, $W^{23}$ and $W^{24}$ represents the other atoms (including substituent groups attached to the atoms) and the bonds between the atoms. Another heterocyclic ring, an aliphatic ring or an aromatic ring (preferably another heterocyclic ring or an aromatic ring) may be condensed with the acidic nucleus ring. $W^{13}$ and $W^{14}$ in the formula (IIA) preferably have an identical chemical structure. $W^{23}$ and $W^{24}$ in the formula (IIIA) also preferably have an identical chemical structure.

The acidic nucleus ring may have a substituent group. Examples of the substituent groups are the same as those of $R^{11}$, $R^{12}$ and $R^{13}$.

In the formula (IIA) and (IIIA), each of $M^{11}$ and $M^{21}$ independently is a cation. The definitions and examples of $M^{11}$ and $M^{21}$ are the same as those of $M^1$ and $M^2$ in the formulas (IIa) and (IIIa).

In the formula (IIA) and (IIIA), each of $Hc^5$ and $Hc^6$ independently is an unsaturated heterocyclic group. The definitions and the substituent groups of $Hc^5$ and $Hc^6$ are the same as those of $Hc^1$ and $Hc^2$ in the formulas (IIa) and (IIIa).

The third embodiment of the oxonol dye is represented by the formula (IIb) or (IIIb).

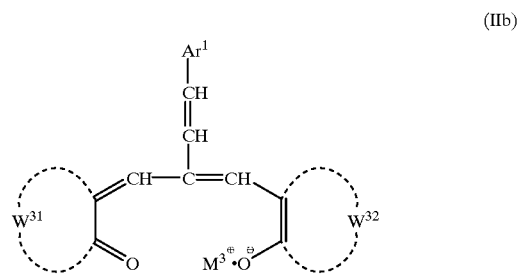
(IIb)

-continued (IIIb)

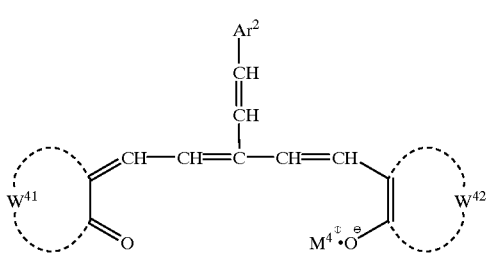

In the formulas (IIb) and (IIIb), each of $W^{31}$, $W^{32}$, $W^{41}$ and $W^{42}$ independently is an atomic group that forms an acidic nucleus ring. The acidic nucleus ring preferably is a four to seven-membered ring, and more preferably is a five or six-membered ring. The hetero atom in the ring preferably is nitrogen, oxygen or sulfur, and more preferably is nitrogen or oxygen. The ring preferably has at least one nitrogen atom as the hetero atom. The acidic nucleus ring is preferably unsaturated. Another heterocyclic ring, an aliphatic ring or an aromatic ring (preferably another heterocyclic ring or an aromatic ring) may be condensed with the acidic nucleus ring. $W^{31}$ and $W^{32}$ in the formula (IIb) preferably have an identical chemical structure. $W^{41}$ and $W^{42}$ in the formula (IIIb) also preferably have an identical chemical structure.

Examples of the acidic nucleus rings include furanone, benzofuranone, pyrrolinone, pyridone, pyrazolone, pyrazolidinedione, isoxazolone, imidazolone, pyrazolopyridone, barbituric acid, rhodanine, hydantoin, thiohydantoin, oxyindole, diazaindanone and coumarin. Benzofuranone, pyridone, pyrazolone, pyrazolidinedione, isoxazolone, imidazolone, pyrazolopyridone, barbituric acid, oxyindole and diazaindanone are preferred, benzofuranone, pyrazolone, pyrazolidinedione and isoxazolone are more preferred.

The acidic nucleus ring may have a substituent group. Examples of the substituent groups are the same as those of the substituent groups of $W^{11}$, $W^{12}$, $W^{21}$ and $W^{22}$ in the formulas (IIa) and (IIIa).

In the formulas (IIb) and (IIIb), each of $M^3$ and $M^4$ independently is a cation. The cation preferably is a monovalent ion. Examples of the cations include proton, an alkali metal ion (e.g., lithium ion, potassium ion, sodium ion) and an organic ion (e.g., tetraalkylammonium ion, pyridinium ion). Proton, potassium ion, sodium ion, triethylammonium ion and pyridinium ion are preferred, and proton, potassium ion and sodium ion are more preferred. In the case that $M^1$ or $M^2$ is proton, the proton and the neighboring oxygen atom form hydroxyl.

In the formulas (IIb) and (IIIb), each of $Ar^1$ and $Ar^2$ independently is an aromatic group. The aromatic group means an aryl group and a substituted aryl group. The aromatic group preferably has 6 to 20 carbon atoms, and more preferably has 6 to 15 carbon atoms. Examples of the aryl group include phenyl and naphthyl. Phenyl is particularly preferred.

Examples of the substituent groups for the substituted aryl groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, an alkoxycarbonyl group having 2 to 10 carbon atoms (e.g., methoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt.

Examples of the substituted aryl groups include 4-substituted amino substituted phenyl (e.g., 4-dimethylaminophenyl, 4-diethylaminophenyl, 4-disulfoethylaminophenyl, 4-(N-ethyl-N'-sulfoethylamino) phenyl), 4-halogen substituted phenyl (e.g., 4-chlorophenyl, 4-fluorophenyl), 4-alkyl substituted phenyl (e.g., 4-methylphenyl) and 2-alkyl substituted-4-substituted amino substituted phenyl (e.g., 2-methyl-4-sulfoethylaminophenyl). 4-substituted amino substituted phenyl and 2-alkyl substituted-4-substituted amino substituted phenyl are preferred.

The oxonol compound is preferably represented by the formula (IIB) or (IIIB).

(IIB)

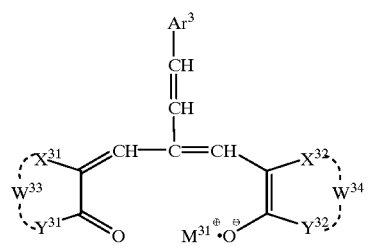

(IIIB)

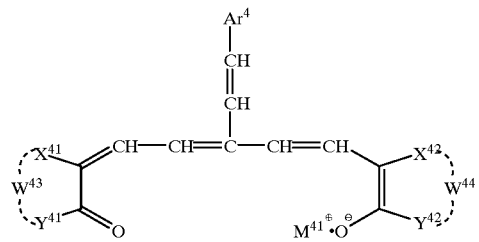

In the formulas (IIB) and (IIIB), each of $X^{31}$, $X^{32}$, $X^{41}$ and $X^{42}$ independently is $-CR^{11}=$, $-CO-$ or $-NR^{12}-$.

In the formulas (IIB) and (IIIB), each of $Y^{31}$, $Y^{32}$, $Y^{41}$ and $Y^{42}$ independently is $-NR^{13}-$, $-N=$ or $-O-$.

The definitions and examples of $R^{11}$, $R^{12}$ and $R^{13}$ are the same as those of $R^{11}$, $R^{12}$ and $R^{13}$ in the formulas (IIA) and (IIIA).

In the formulas (IIB) and (IIIB), each of $W^{33}$, $W^{34}$, $W^{43}$ and $W^{44}$ independently is an atomic group that forms an acidic nucleus ring. The acidic nucleus ring preferably is a four to seven-membered ring, and more preferably is a five or six-membered ring. Since four atoms are shown in the formulas (IIB) and (IIIB), each of $W^{33}$, $W^{34}$, $W^{43}$ and $W^{44}$ represents the other atoms (including substituent groups attached to the atoms) and the bonds between the atoms. Another heterocyclic ring, an aliphatic ring or an aromatic ring (preferably another heterocyclic ring or an aromatic ring) may be condensed with the acidic nucleus ring. $W^{33}$ and $W^{34}$ in the formula (IIB) preferably have an identical chemical structure. $W^{43}$ and $W^{44}$ in the formula (IIIB) also preferably have an identical chemical structure.

The acidic nucleus ring may have a substituent group. Examples of the substituent groups are the same as those of $R^{11}$, $R^{12}$ and $R^{13}$.

In the formulas (IIB) and (IIIB), each of $M^{31}$ and $M^{41}$ independently is a cation. The definitions and examples of $M^{31}$ and $M^{41}$ are the same as those of $M^3$ and $M^4$ in the formulas (IIb) and (IIIb).

In the formulas (IIB) and (IIIB), each of $Ar^3$ and $Ar^4$ independently is an aromatic group. The definitions and the substituent groups of $Ar^3$ and $Ar^4$ are the same as those of $Ar^1$ and $Ar^2$ in the formulas (IIb) and (IIIb). The fourth embodiment of the oxonol dye is represented by the formula (IIc) or (IIIc).

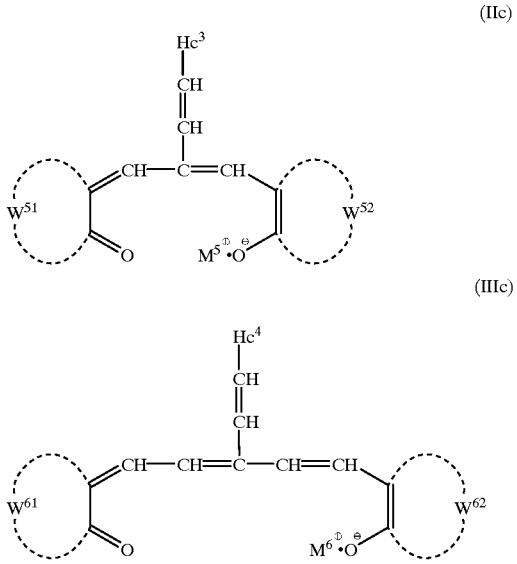

In the formulas (IIc) and (IIIc), each of $W^{51}$, $W^{52}$, $W^{61}$ and $W^{62}$ independently is an atomic group that forms an acidic nucleus ring. The acidic nucleus ring preferably is a four to seven-membered ring, and more preferably is a five or six-membered ring. The hetero atom in the ring preferably is nitrogen, oxygen or sulfur, and more preferably is nitrogen or oxygen. The ring preferably has at least one nitrogen atom as the hetero atom. The heterocyclic ring is preferably unsaturated. Another heterocyclic ring, an aliphatic ring or an aromatic ring (preferably another heterocyclic ring or an aromatic ring) may be condensed with the acidic nucleus ring. $W^{51}$ and $W^{52}$ in the formula (IIc) preferably have an identical chemical structure. $W^{61}$ and $W^{62}$ in the formula (IIIc) also preferably have an identical chemical structure.

Examples of the acidic nucleus rings include furanone, benzofuranone, pyrrolinone, pyridone, pyrazolone, pyrazolidinedione, isoxazolone, imidazolone, pyrazolopyridone, barbituric acid, rhodanine, hydantoin, thiohydantoin, oxyindole, diazaindanone and coumarin. Benzofuranone, pyridone, pyrazolone, pyrazolidinedione, isoxazolone, imidazolone, pyrazolopyridone, barbituric acid, oxyindole and diazaindanone are preferred, benzofuranone, pyrazolone, pyrazolidinedione and isoxazolone are more preferred.

The acidic nucleus ring may have a substituent group. Examples of the substituent groups are the same as those of the substituent groups of $W^{11}$, $W^{12}$, $W^{21}$ and $W^{22}$ in the formulas (IIa) and (IIIa).

In the formulas (IIc) and (IIIc), each of $M^5$ and $M^6$ independently is a cation. The cation preferably is a monovalent ion. Examples of the cations include proton, an alkali metal ion (e.g., lithium ion, potassium ion, sodium ion) and an organic ion (e.g., tetraalkylammonium ion, pyridinium ion). Proton, potassium ion, sodium ion, triethylammonium ion and pyridinium ion are preferred, and proton, potassium ion and sodium ion are more preferred. In the case that $M^1$ or $M^2$ is proton, the proton and the neighboring oxygen atom form hydroxyl.

In the formulas (IIc) and (IIIc), each of $Hc^3$ and $Hc^4$ independently is an unsaturated heterocyclic group. The heterocyclic ring preferably is a four to seven-membered ring, and more preferably is a five or six-membered ring. The hetero atom in the ring preferably is nitrogen, oxygen or sulfur, and more preferably is nitrogen or oxygen. The ring preferably has at least one nitrogen atom as the hetero atom. Another heterocyclic ring, an aliphatic ring or an aromatic ring (preferably another heterocyclic ring or an aromatic ring) may be condensed with the heterocyclic ring.

Examples of the unsaturated heterocyclic groups include pyridyl, quinolyl, pyridazinyl, pyrimidinyl, pyrazyl, pyrrolyl, indolyl, pyrazolyl, isoxazolyl, indazolyl, imidazolyl, triazolyl, tetrazolyl, oxazolyl, furanyl and thienyl. The unsaturated heterocyclic group preferably is 4-pyridyl, 2-pyridyl, imidazolyl, triazolyl, tetrazolyl, oxazolyl or furanyl, more preferably is 4-pyridyl, 2-pyridyl or furanyl, and most preferably is furanyl.

The unsaturated heterocyclic group may have a substituent group. Examples of the substituent groups are the same as those of the substituent groups for $Hc^1$ and $Hc^2$ in the formulas (IIa) and (IIIa).

The oxonol compound is preferably represented by the formula (IIC) or (IIIC).

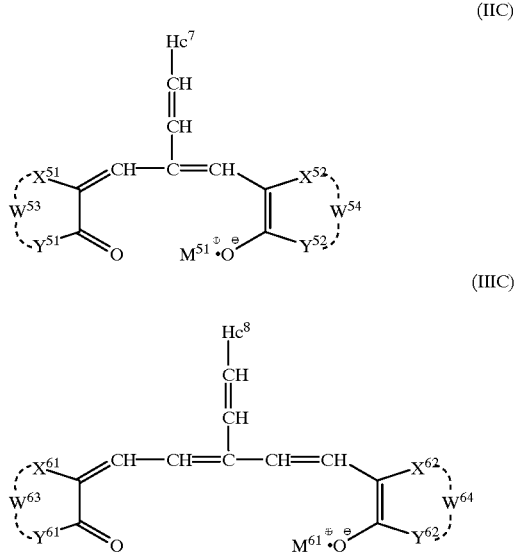

In the formulas (IIC) and (IIIC), each of $X^{51}$, $X^{52}$, $X^{61}$ and $X^{62}$ independently is $-CR^{11}=$, $-CO-$ or $-NR^{12}-$.

In the formulas (IIC) and (IIIC), each of $Y^{51}$, $Y^{52}$, $Y^{61}$ and $Y^{62}$ independently is $-NR^{13}-$, $-N=$ or $-O-$.

The definitions and examples of $R^{11}$, $R^{12}$ and $R^{13}$ are the same as those of $R^{11}$, $R^{12}$ and $R^{13}$ in the formulas (IIA) and (IIIA).

In the formulas (IIC) and (IIIC), each of $W^{53}$, $W^{54}$, $W^{63}$ and $W^{64}$ independently is an atomic group that forms an acidic nucleus ring. The acidic nucleus ring preferably is a four to seven-membered ring, and more preferably is a five or six-membered ring. Since four atoms are shown in the formulas (IIC) and (IIIC), each of $W^{53}$, $W^{54}$, $W^{63}$ and $W^{64}$ represents the other atoms (including substituent groups attached to the atoms) and the bonds between the atoms. Another heterocyclic ring, an aliphatic ring or an aromatic ring (preferably another heterocyclic ring or an aromatic ring) may be condensed with the acidic nucleus ring. $W^{53}$ and $W^{54}$ in the formula (IIB) preferably have an identical chemical structure. $W^{63}$ and $W^{64}$ in the formula (IIIC) also preferably have an identical chemical structure.

The acidic nucleus ring may have a substituent group. Examples of the substituent groups are the same as those of $R^{11}$, $R^{12}$ and $R^{13}$.

In the formulas (IIC) and (IIIC), each of $M^{51}$ and $M^{61}$ independently is a cation. The definitions and examples of $M^{51}$ and $M^{61}$ are the same as those of $M^5$ and $M^6$ in the formulas (IIc) and (IIIc).

In the formulas (IIC) and (IIIC), each of $Hc^7$ and $Hc^8$ independently is an unsaturated heterocyclic group. The definitions and the substituent groups of $Hc^7$ and $Hc^8$ are the same as those of $Hc^3$ and $Hc^4$ in the formulas (IIc) and (IIIc).

In view of the substituent group at the meso-position, the second embodiment (compounds represented by the formulas of a or A) and the third embodiment (compounds represented by the formulas of b or B) are preferred to the fourth embodiment (compounds represented by the formulas of c or C), and the second embodiment is particularly preferred. In view of the length of the methine chain, the compounds represented by the formulas of III is preferred to the compounds represented by the formulas II.

Examples of the oxonol compounds (the second, third and fourth embodiments of the present invention) represented by the formulas (IIa), (IIb), (IIc), (IIIa), (IIIb) and (IIIc) are shown below.

IIa-1

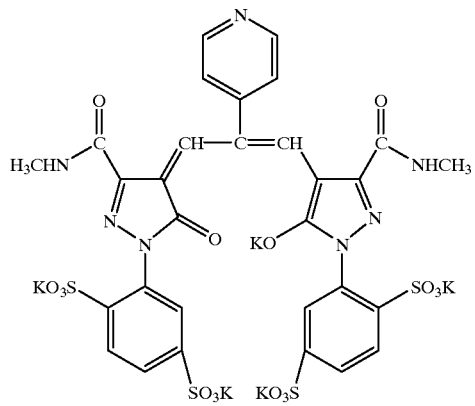

IIa-2

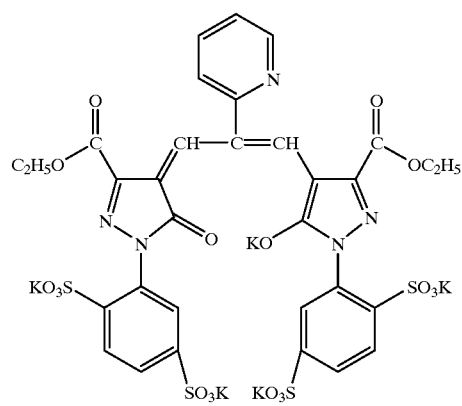

IIa-3

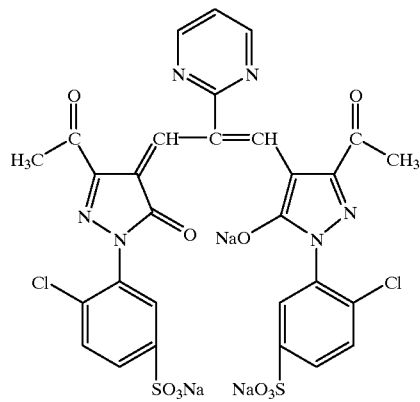

IIa-4

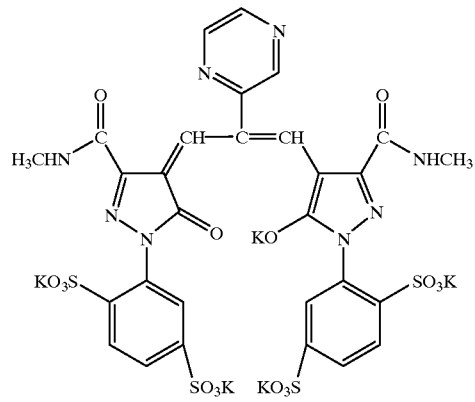

IIa-5

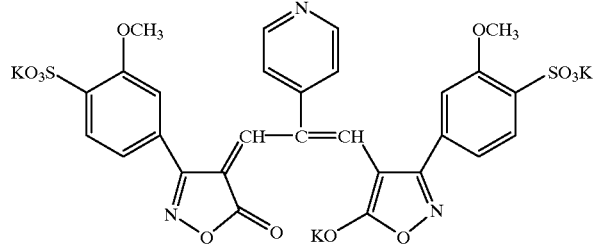

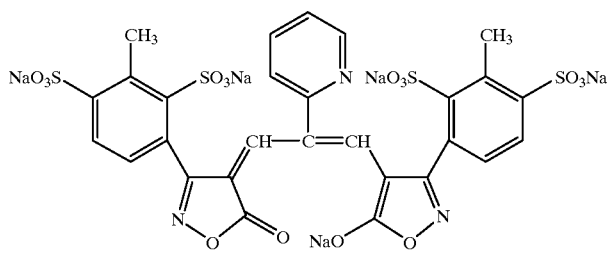
IIa-6
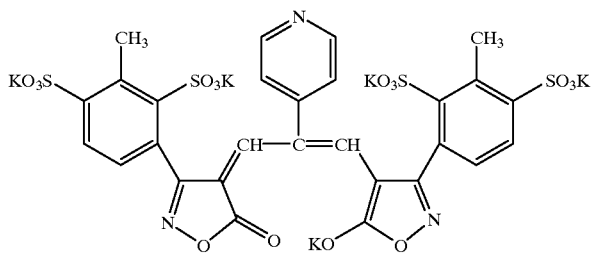
IIa-7
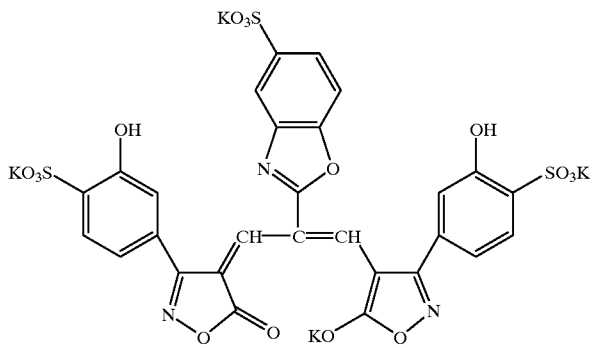
IIa-8
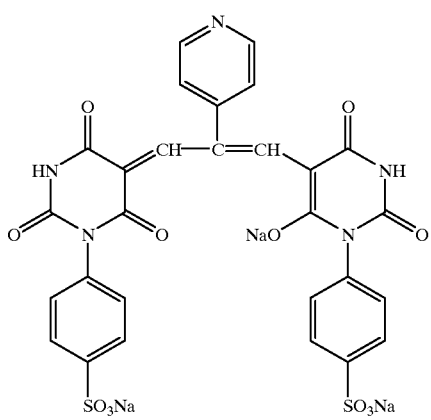
IIa-9
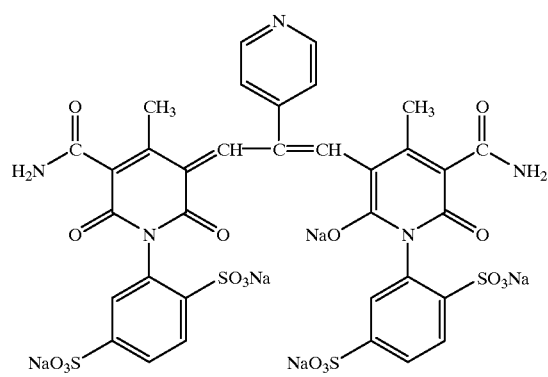
IIa-10

-continued
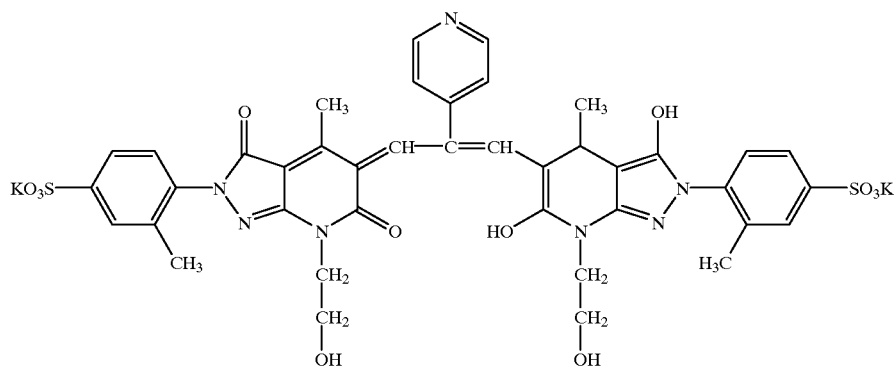
IIa-11
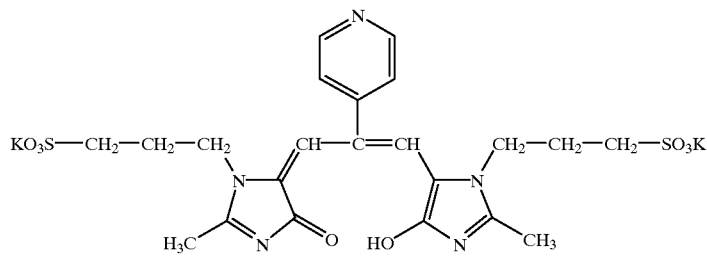
IIa-12
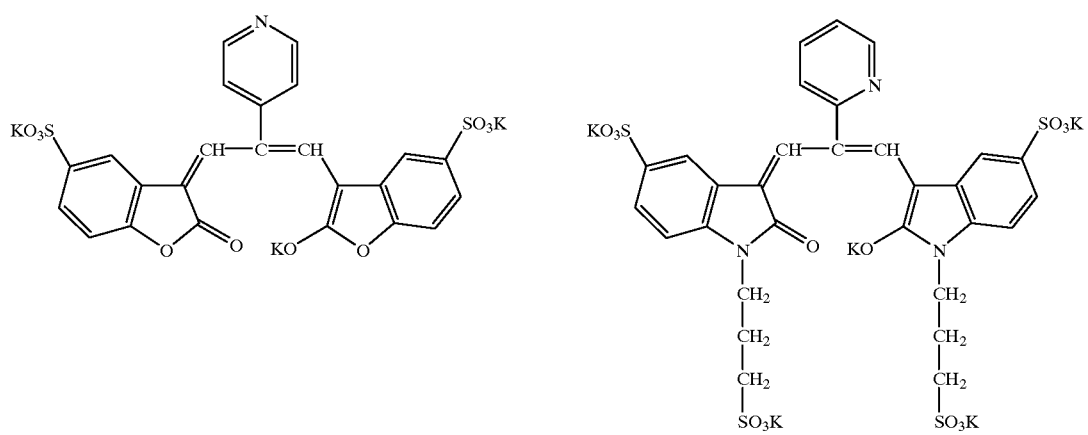
IIa-13    IIa-14
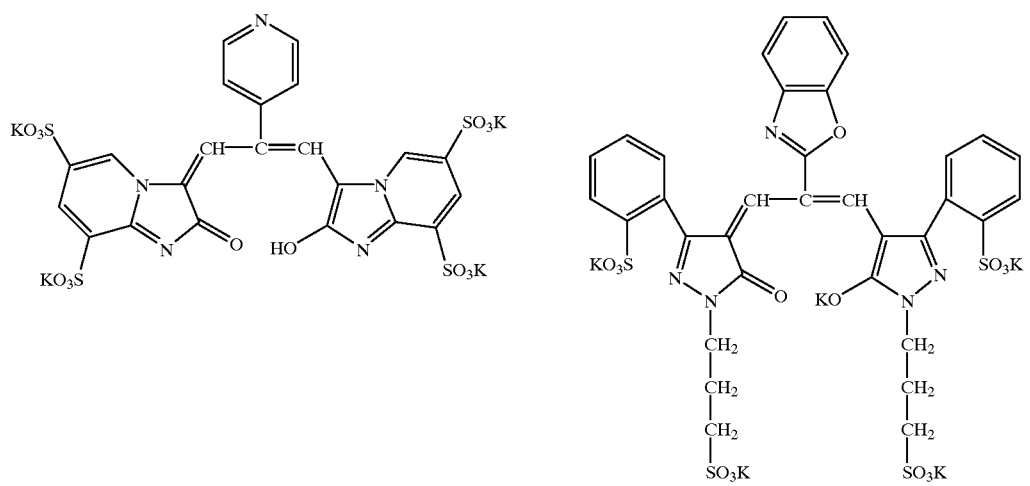
IIa-15    IIa-16

IIb-1
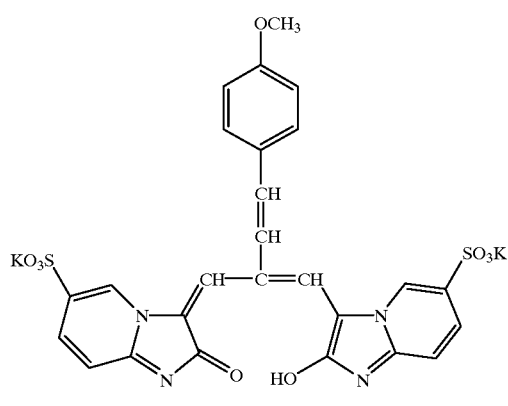
IIb-2
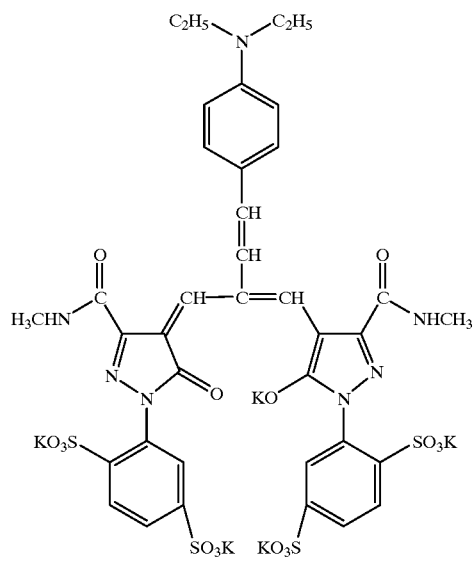
IIb-3
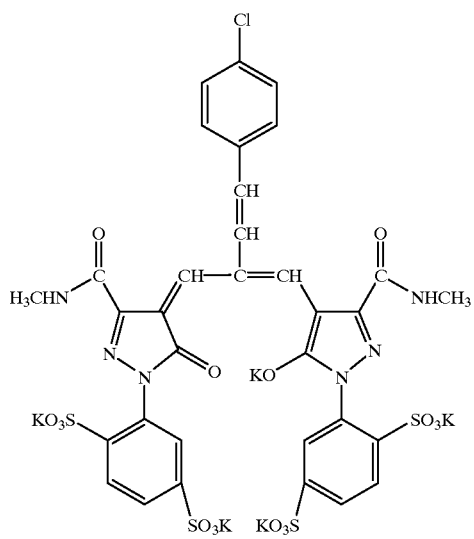
IIb-4
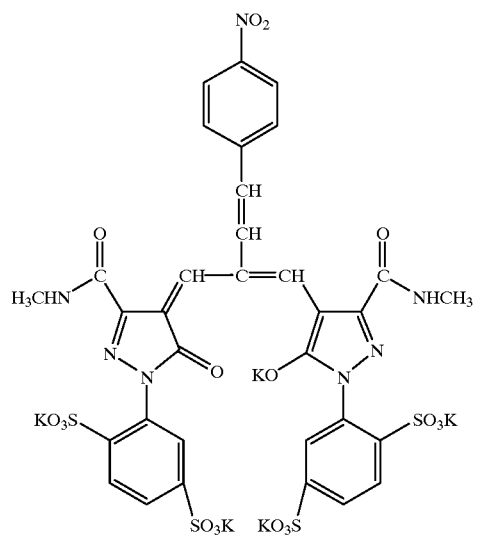

-continued
IIb-5
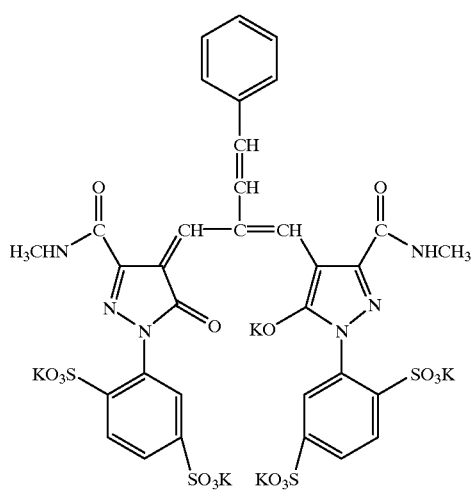
IIb-6
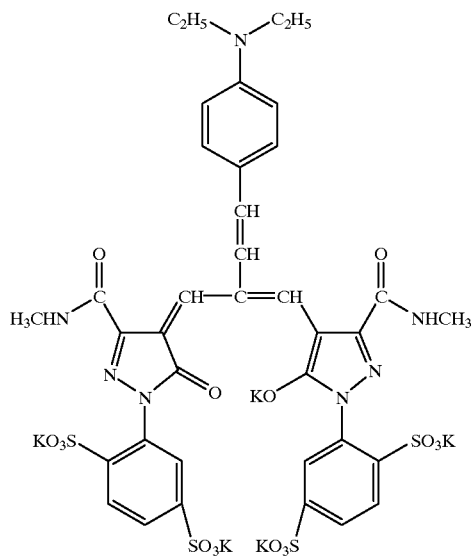
IIb-7
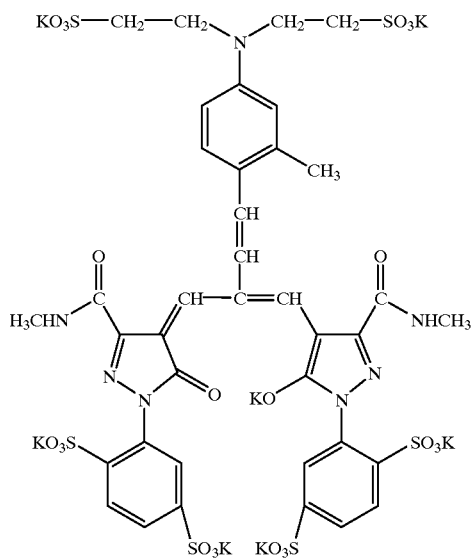
IIb-8
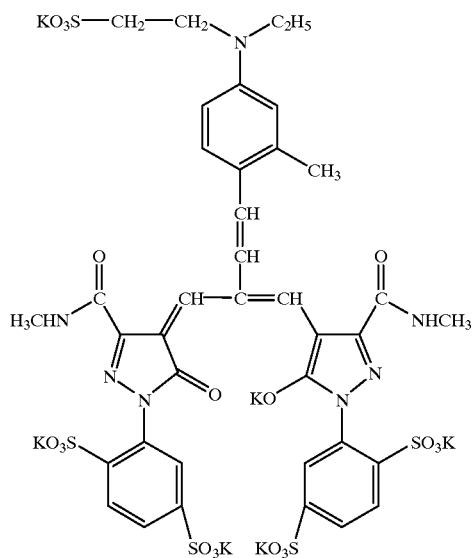
IIc-1
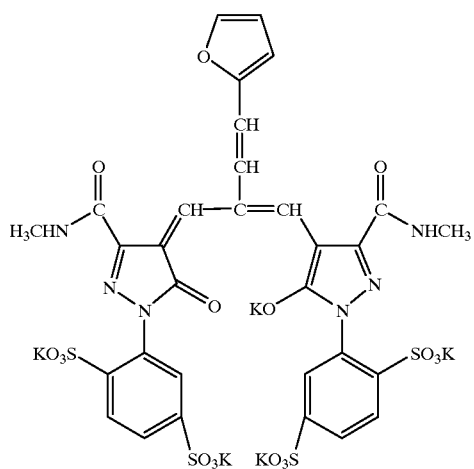
IIc-2
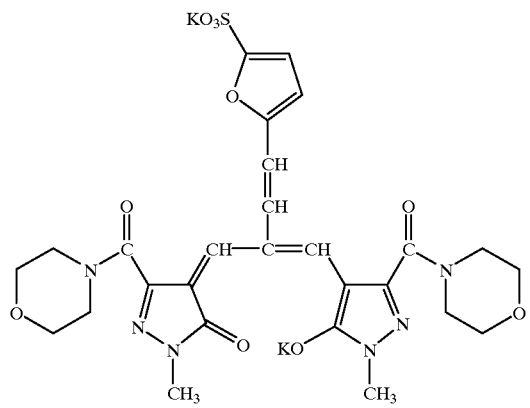

-continued
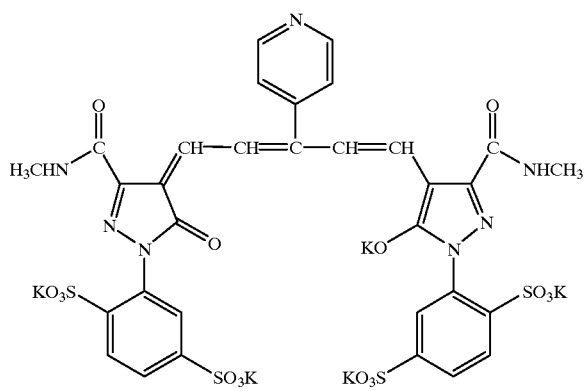
IIIa-1
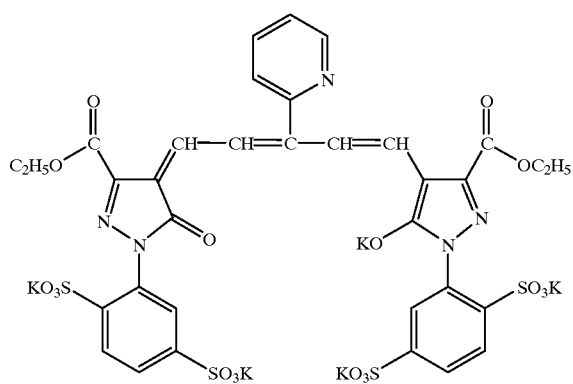
IIIa-2
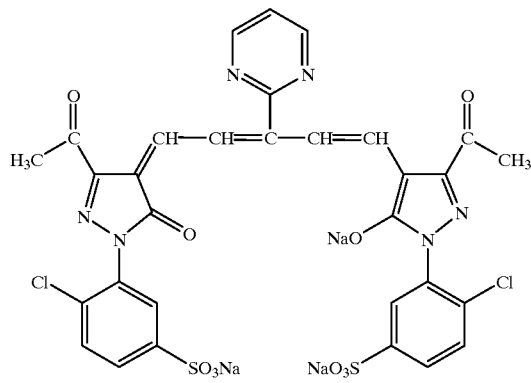
IIIa-3
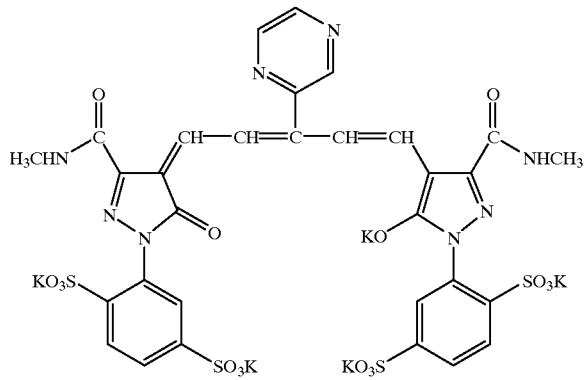
IIIa-4

-continued
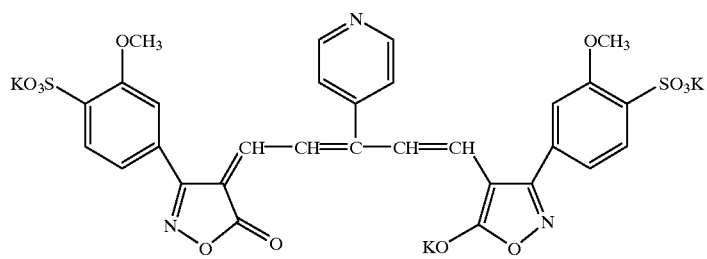
IIIa-5
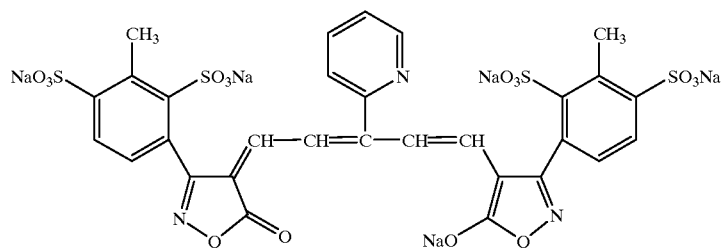
IIIa-6
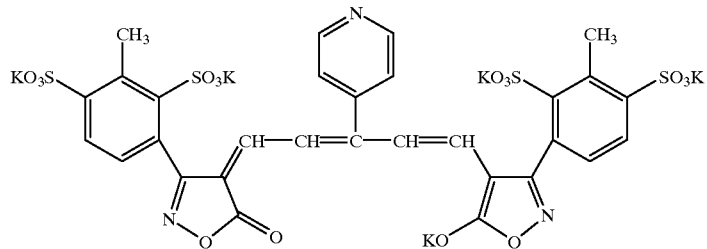
IIIa-7
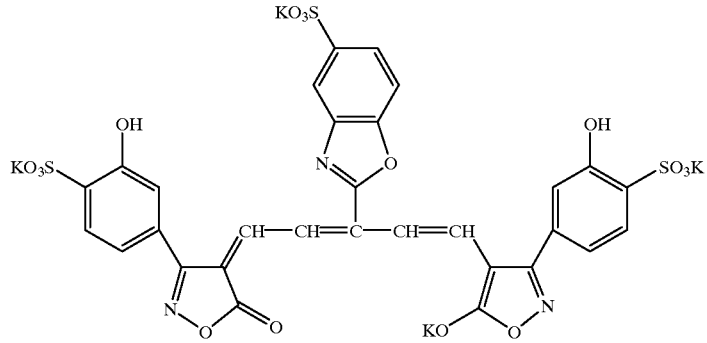
IIIa-8
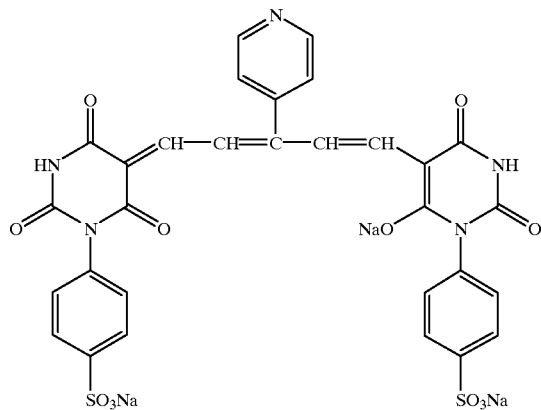
IIIa-9

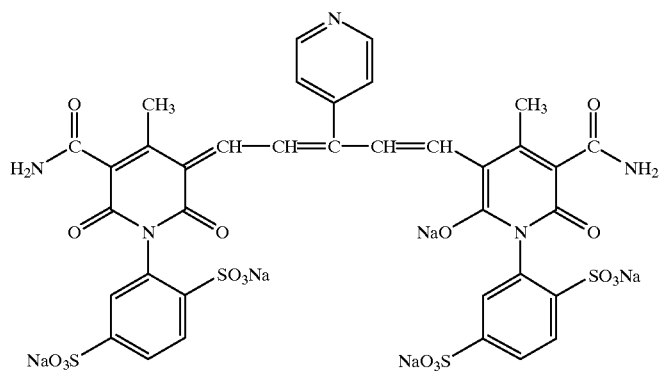
IIIa-10
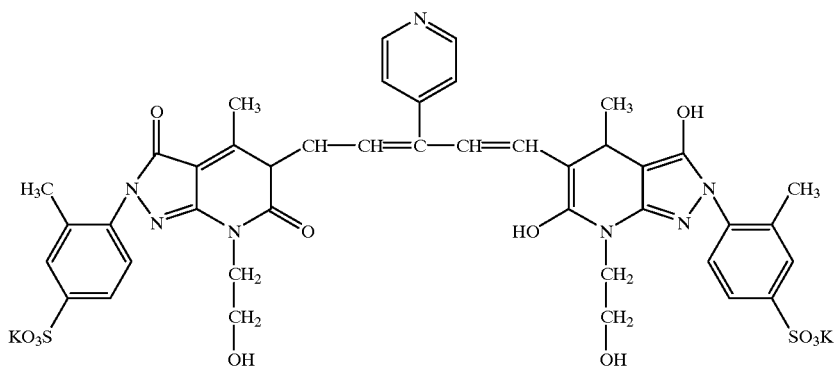
IIIa-11
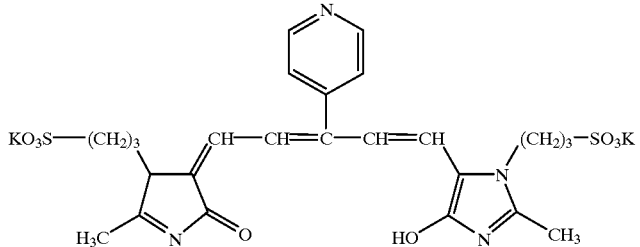
IIIa-12
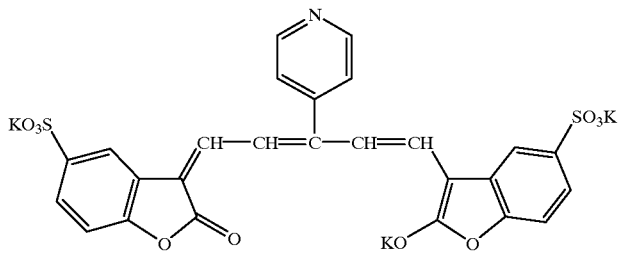
IIIa-13

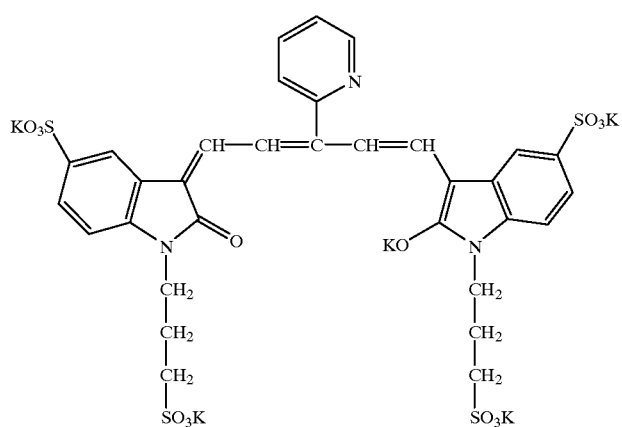
IIIa-14
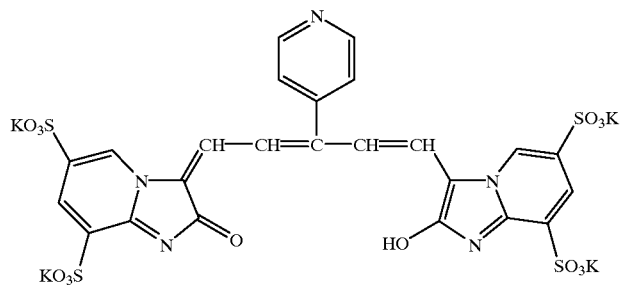
IIIa-15
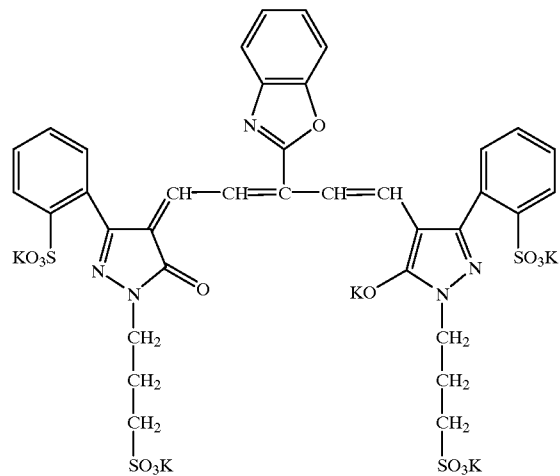
IIIa-16
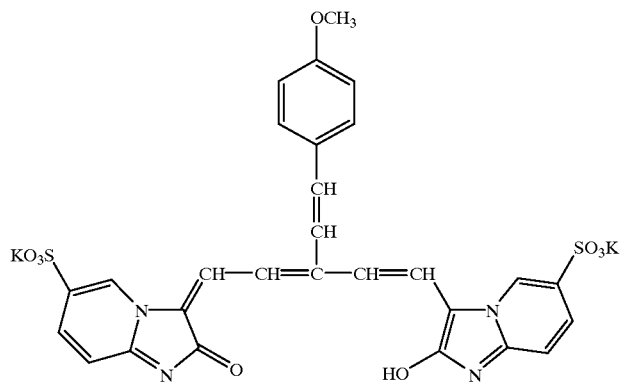
IIIb-1

IIIb-2
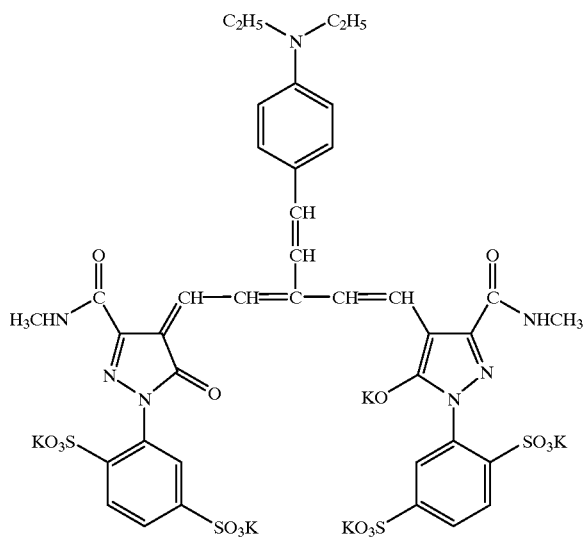
IIIb-3
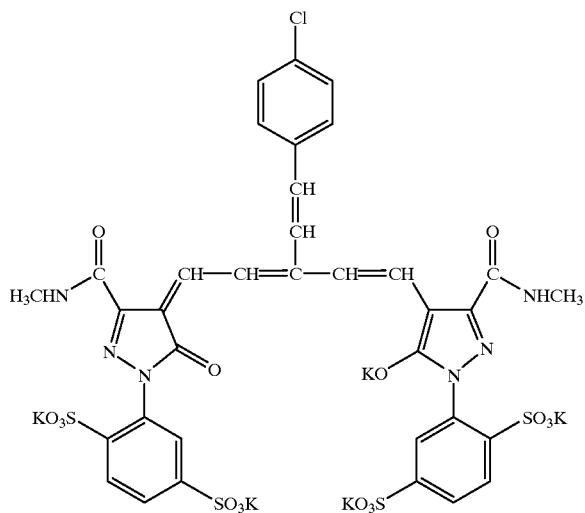
IIIb-4
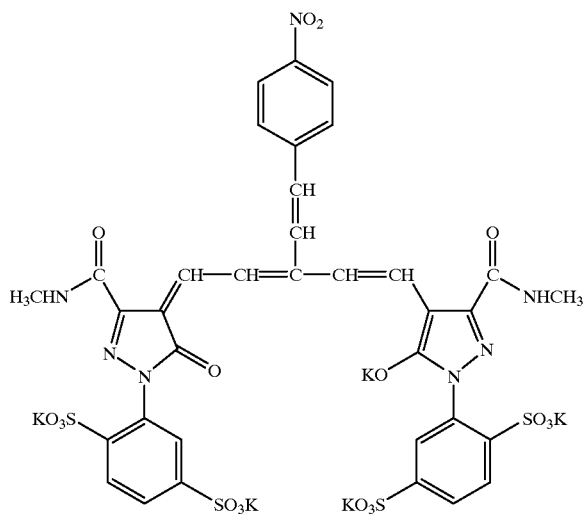

IIIb-5
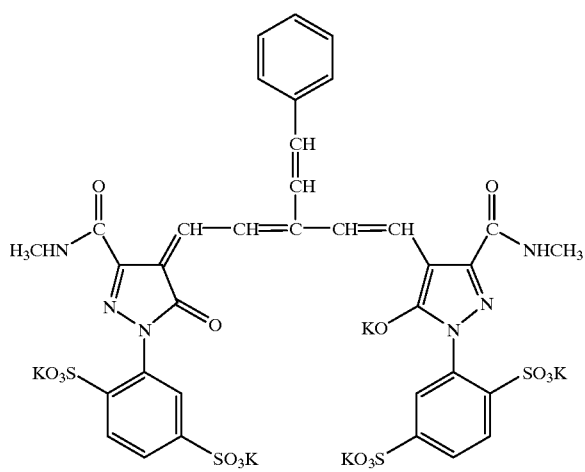
IIIb-6
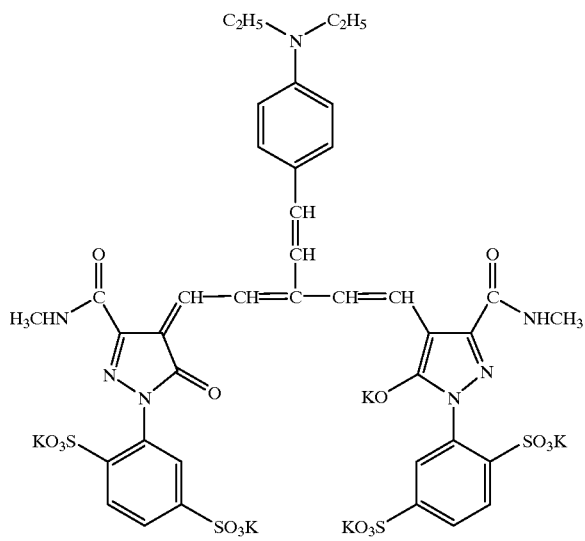
IIIb-7
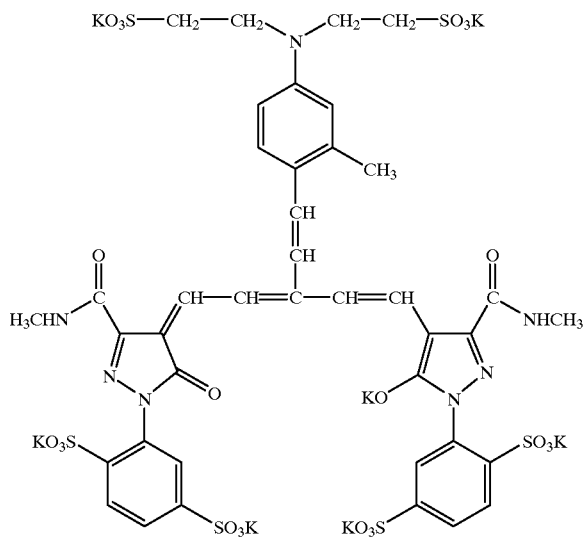

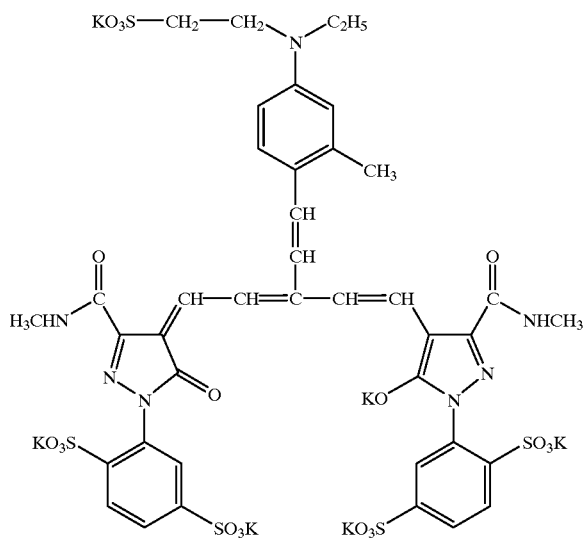

IIIb-8

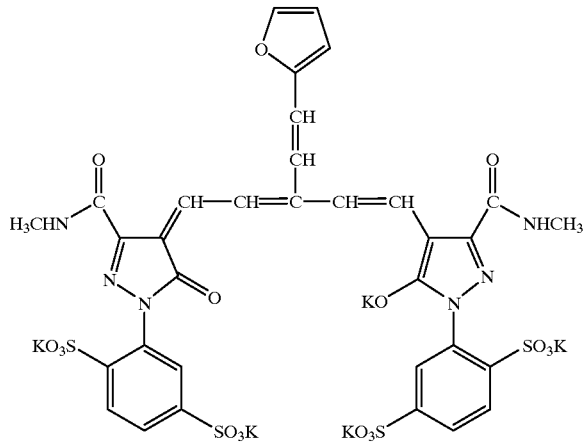

IIIc-1

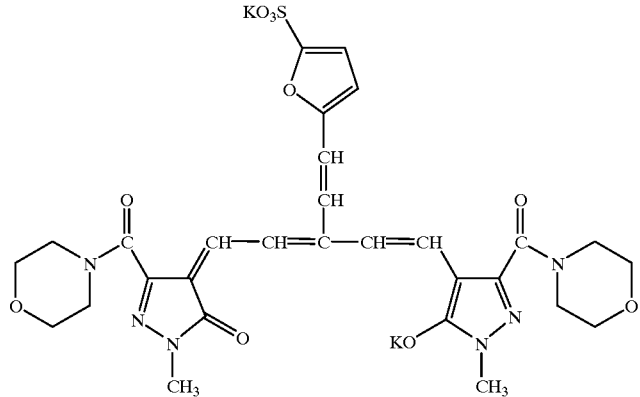

IIIc-2

The oxonol compounds of the present invention can be synthesized by a known process, which is described in F. M. Hamer, Heterocyclic Compounds-Cyanine dyes and Related Compounds (John Wiley and Sons, New York, 1964), pages 244 to 247 and 463 to 482. For example, an oxonol compound can be synthesized by a reaction of a methine source (e.g., oxoesters, acetals, amidines or quarternary pyridinium salts) with an acidic nucleus having an active methylene group. The amount of the methine source is preferably in the range of 20 to 200 mol % of the acidic nucleus, and more preferably in the range of 30 to 100 mol %, and most preferably in the range of 40 to 60 mol %.

The reaction for the synthesis of an oxonol compound requires a base. An organic base is preferred to an inorganic base. An organic base of a weak nucleophilicity is particularly preferred. Examples of the organic bases include triethylamine, 1,8-diazabicycloundecene and potassium t-butoxide. The amount of the base is preferably in the range of 1 to 20 times based on the amount of the acidic nucleus, more preferably in the range of 1 to 10 times, and most preferably in the range of 1 top 6 times.

The synthesis reaction is conducted in an inactive solvent. Examples of the solvents include dimethylformamide, dimethylacetamide, dimethylsulfoxide, acetonitrile, ethyl acetate, sulfolane, tetrahydrofuran and toluene. Dimethylformamide and dimethylsulfoxide are preferred, and dimethylformamide is most preferred. The reaction temperature is preferably in the range of −20 to 150° C., more preferably in the range of 0 to 120° C., and most preferably in the range of 0 to 100° C.

An oxonol compound represented by the formula (VI) can advantageously be synthesized by a reaction of an α-ketomethylene compound represented by the formula (IV) with a pyridinium compound represented by the formula (V).

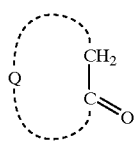

(IV)

In the formula (IV), Q is an atomic group that forms a carbon ring or a heterocyclic ring.

The α-ketomethylene compound represented by the formula (IV) is described in F. M. Hamer, Heterocyclic Compounds-Cyanine dyes and Related Compounds (John Wiley and Sons, New York, 1964), pages 469 to 494 and 595 to 604. Examples of the α-ketomethylene compounds include 2-pyrazoline-5-one, barbituric acid, 2-thiobarbituric acid, pyrazolidine-3,5-dione, 2-pyridone, 2,6-dihydroxypyridine, pyrazolo[3,4-b]pyridine-3,6-dione, 2-isoxazoline-5-one, indan-1,3-dione, rhodanine and hydantoin. A preferred α-ketomethylene compound is a 2-pyrazoline-5-one represented by the formula (IVa).

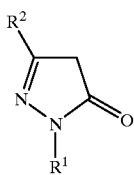

(IVa)

In the formula (IVa), $R^1$ is an aryl group or an alkyl group.

In the formula (IVa), $R^2$ is —$COOR^3$, —$CONR^3R^4$, —$COR^5$, —$NR^3R^4$, —$NR^3CONR^3R^4$, —$OR^3$, —$SO_2R^5$, —$NR^3COR^5$, —$NR^3SO_2R^5$, an alkyl group, an aryl group or cyano. Each of $R^3$ and $R^4$ independently is hydrogen, an alkyl group or an aryl group. $R^3$ and $R^4$ may be combined to form a five or six-membered ring. $R^5$ is an alkyl group or an aryl group. The 2-pyrazoline-5-one represented by the formula (IVa) preferably has at least one sulfo or carboxyl as a substituent group in the molecule.

The alkyl group preferably has 1 to 20 carbon atoms. Examples of the alkyl groups include methyl, ethyl, n-propyl, n-butyl, isopropyl, n-hexyl and n-octadecyl. The alkyl group may have a substituent group. Examples of the substituent groups include hydroxyl, carboxyl, sulfo, cyano, nitro, a halogen atom (F, Cl, Br, I), an alkoxy group having 1 to 20 carbon atoms (e.g., methoxy, ethoxy, isopropoxy, n-butoxy, n-dodecyloxy), an alkoxycarbonyl group having 2 to 20 carbon atoms (e.g., methoxycarbonyl, ethoxycarbonyl), an aryloxycarbonyl group having 7 to 20 carbon atoms (e.g., phenoxycarbonyl), an aryl group having 6 to 10 carbon atoms (e.g., phenyl, naphthyl, 2-sulfophenyl, 2,4-disulfophenyl), amino and a substituted amino group having 1 to 20 carbon atoms (e.g., methylamino, dimethylamino, diethylamino, dioctylamino, phenylamino).

The aryl group preferably has 6 to 10 carbon atoms. Examples of the aryl groups include phenyl and naphthyl. The aryl group may have a substituent group. Examples of the substituent groups include an alkyl group having 1 to 6 carbon atoms (e.g., methyl, ethyl, t-butyl, t-amyl, n-butyl) and the above-mentioned substituent groups of the alkyl group.

Examples of the five or six-membered rings formed from $R^3$ and $R^4$ include a pyrrolidine ring, a piperidine ring and a morpholine ring.

In the formula (IVa), $R^1$ preferably is an aryl group or an aralkyl group. The aryl group or the aralkyl group more preferably has at least two sulfo. Examples of the disulfoaryl or disulfoaralkyl groups include 2,4-disulfophenyl, 2,4-disulfobenzyl, 2,5-disulfophenyl, 3,5-disulfophenyl, 2,4-disulfo-6-methylphenyl, 5,7-disulfo-2-naphthyl, 3,6-disulfo-1-naphthyl, 3,6-disulfo-1-naphthyl and 6,8-disulfo-2-naphthyl. $R^1$ most preferably is an aryl -group having at least two sulfo.

In the formula (IVa), $R^2$ preferably is —$COOR^3$, —$CONR^3R^4$, —$COR^5$ or cyano.

The α-ketomethylene compound (an active methylene compound) represented by the formula (IV) can be synthesized by a known process, which is described in F. M. Hamer, Heterocyclic Compounds-Cyanine dyes and Related Compounds (John Wiley and Sons, New York, 1964), pages 469 to 494 and 595 to 604.

Examples of the α-ketomethylene compounds represented by the formula (IV) are shown below.

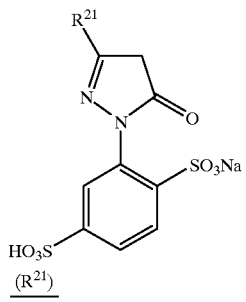

($R^{21}$)

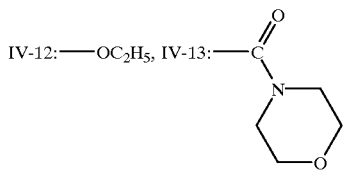

IV-1:——$CH_3$, IV-2:——CN, IV-3:——COOH,
IV-4:——$CO_2C_2H_5$, IV-5:——$CONHCH_3$,
IV-6:——$CON(CH_3)_2$, IV-7:——$CONH(CH_2)_2SO_3H$,
IV-8:——$CONH(CH_2)_2OH$, IV-9:——$COCH_3$,
IV-10:——$NHCOCH_3$, IV-11:——$NH_2$,

IV-12:——$OC_2H_5$, IV-13:——

IV-14 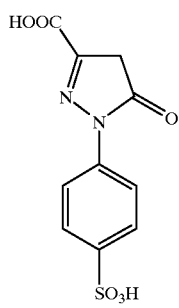
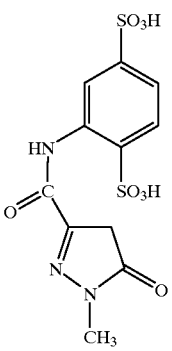 IV-19
IV-15 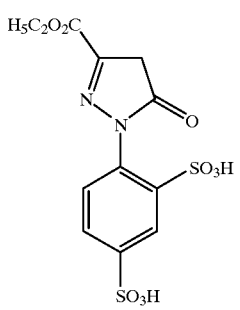
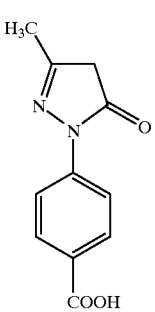 IV-20
IV-16 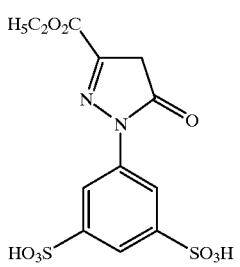
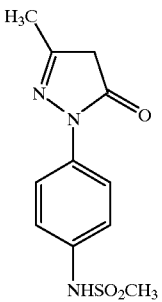 IV-21
IV-17 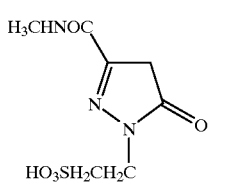
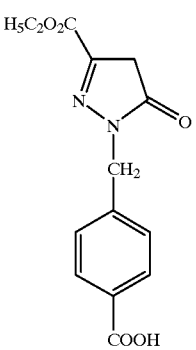 IV-22
IV-18 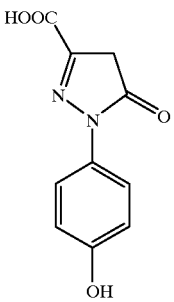 IV-23

IV-24 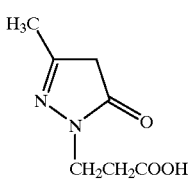
IV-25 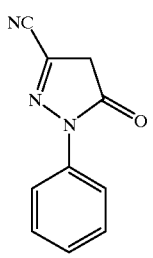
IV-26 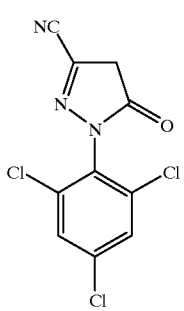
IV-27 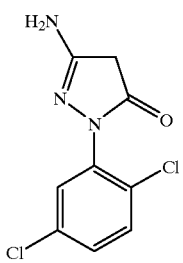
IV-28 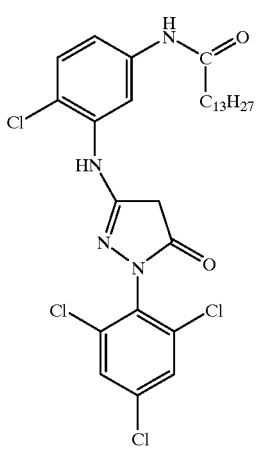
IV-29 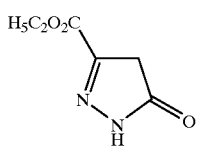
IV-30 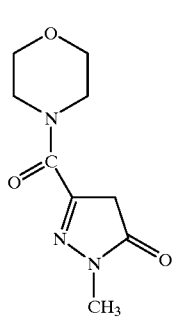
IV-31 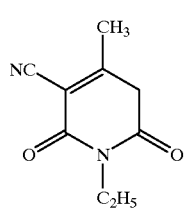
IV-32 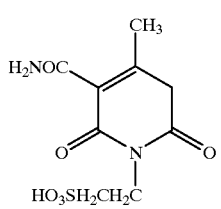
IV-33 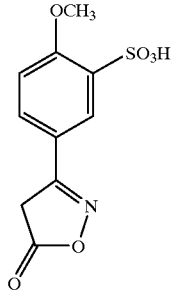
IV-34 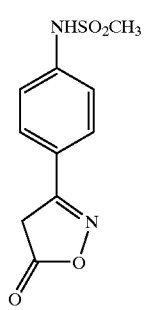
IV-35 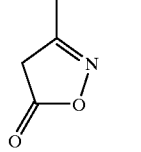

-continued

IV-36
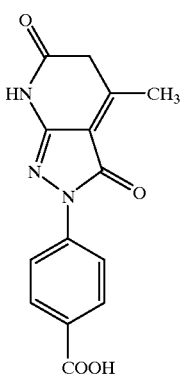

IV-37
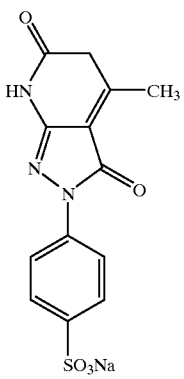

IV-38
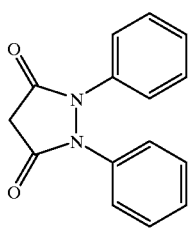

IV-39
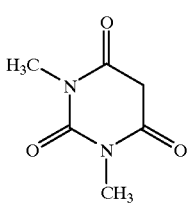

IV-40
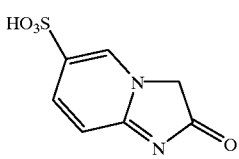

IV-41
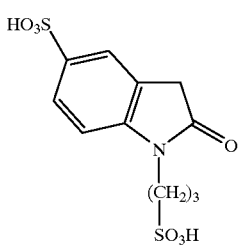

-continued

IV-42
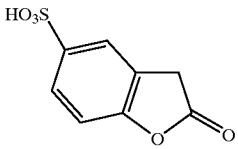

IV-43
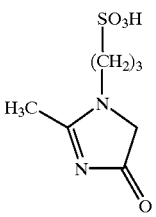

The above-mentioned α-ketomethylene compound represented by the formula (IV) is reacted with a pyridinium compound represented by the formula (V). The process is characterized in the specific pyridinium salt represented by the formula (V), in which the pyridinium is substituted with a saturated or unsaturated heterocyclic group at the 1-position.

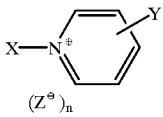

(V)

In the formula (V), X is a heterocyclic group. The heterocyclic group preferably has a four to seven-membered heterocyclic ring, and more preferably is a five or six-membered heterocyclic ring. The hetero atom in the heterocyclic group preferably is nitrogen, oxygen, sulfur or phosphor, and more preferably is nitrogen, oxygen or sulfur. Another heterocyclic ring, an aliphatic ring or an aromatic ring (preferably another heterocyclic ring or an aromatic ring) may be condensed with the heterocyclic ring of X.

X preferably is a heterocyclic group represented by the formula (Xa).

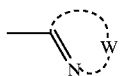

(Xa)

In the formula (Xa), W is an atomic group that forms a heterocyclic ring. Since two atoms are shown in the formula (Xa), W represents the other atoms (including substituent groups attached to the atoms) and the bonds between the atoms.

Examples of the heterocyclic groups of X include oxazole-2-yl, oxazoline-2-yl, thiazole-2-yl, thiazoline-2-yl, benzoxazoline-2-yl, benzothiazole-2-yl, 2-pyridyl, 4-pyridyl, 2-quinolyl, 2-pyrimidyl, 2-triazyl and uracil-2-yl. Benzoxazoline-2-yl, benzothiazole-2-yl, 2-pyridyl, 4-pyridyl, 2-quinolyl, 2-pyrimidyl and 2-triazyl are preferred, and benzoxazoline-2-yl, benzothiazole-2-yl and 2-triazyl are more preferred.

The heterocyclic group may have a substituent group. Examples of the substituent groups include hydroxyl, carboxyl, sulfo, cyano, nitro, a halogen atom (F, Cl, Br, I), an alkoxy group having 1 to 20 carbon atoms (e.g., methoxy, ethoxy, isopropoxy, n-butoxy, n-dodecyloxy), an alkoxycarbonyl group having 2 to 20 carbon atoms (e.g., methoxycarbonyl, ethoxycarbonyl), an aryloxycarbonyl group having 7 to 20 carbon atoms (e.g., phenoxycarbonyl), an aryl group having 6 to 10 carbon atoms (e.g., phenyl, naphthyl, 2-sulfophenyl, 2,4-disulfophenyl), amino and a substituted amino group having 1 to 20 carbon atoms (e.g., methylamino, dimethylamino, diethylamino, dioctylamino, phenylamino).

In the formula (V), Y is a substituent group for the pyridinium ring. Y preferably is an amido group, a sulfonamido group, an alkyl group, an aryl group, an alkoxy group, an aryloxy group, an alkylthio group an arylthio group or a heterocyclic group.

The amido group preferably has 1 to 20 carbon atoms. Examples of the amido groups include acetamido, benzamido, o-sulfobenzamido and furylamido.

The sulfonamido group preferably has 1 to 20 carbon atoms. Examples of the sulfonamido group include methanesulfonamido and p-toluenesulfonamido.

The alkyl group preferably has 1 to 20 carbon atoms. Examples of the alkyl groups include methyl, ethyl, n-propyl, n-butyl, isopropyl, n-hexyl and n-octadecyl.

The aryl group preferably has 6 to 10 carbon atoms. examples of the aryl groups include phenyl and naphthyl.

The alkoxy group preferably has 1 to 20 carbon atoms. Examples of the alkoxy groups include methoxy, ethoxy, isopropoxy, n-butoxy and n-dodecyloxy.

The aryloxy group preferably has 6 to 20 carbon atoms. Examples of the aryloxy groups include phenoxy and naphthoxy.

The alkylthio group preferably has 1 to 10 carbon atoms. Examples of the alkylthio groups include methylthio and ethylthio.

The arylthio group preferably has 6 to 20 carbon atoms. Examples of the arylthio groups include phenylthio and naphthylthio.

The heterocyclic group preferably has a four to seven-membered heterocyclic ring, and more preferably is a five or six-membered heterocyclic ring. The hetero atom in the heterocyclic group preferably is nitrogen, oxygen, sulfur or phosphor, and more preferably is nitrogen, oxygen or sulfur. Another heterocyclic ring, an aliphatic ring or an aromatic ring (preferably another heterocyclic ring or an aromatic ring) may be condensed with the heterocyclic ring.

In the formula (V), Y preferably is a heterocyclic group, and more preferably is 4-pyridyl or a heterocyclic group represented by the formula (Ya)

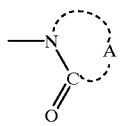

(Ya)

In the formula (Ya), A is an atomic group that forms a cyclic amide ring. Since two atoms are shown in the formula (Ya), A represents the other atoms (including substituent groups attached to the atoms) and the bonds between the atoms.

Examples of the heterocyclic groups of Y include 2-pyrrolidone-1-yl, 2,4-dioxyimidazolidine-3-yl, 2,4-dioxyoxazolidine- 3-yl, 2,5-dioxypyrazoline-1-yl, succinimido, phthalimido, maleimido, 2,4,6-pyperidinetrione-1-yl and perhydroazecine-2,10-dione-1-yl. Y preferably is 2-pyrrolidone-1-yl, 2,4-dioxyimidazolidine-3-yl, 2,4-dioxyoxazolidine-3-yl, succinimido, phthalimido and maleimido, and more preferably is 2-pyrrolidone-1-yl, 2,4-dioxyimidazolidine-3-yl, 2,4-dioxyoxazolidine-3-yl and succinimido.

The heterocyclic group may have a substituent group. Examples of the substituent groups include an alkyl group having 1 to 20 carbon atoms (e.g., methyl, ethyl, propyl, carboxymethyl, sulfoethyl), an aralkyl group having 7 to 20 carbon atoms (e.g., benzyl, phenethyl), an alkoxy group having 1 to 8 carbon atoms (e.g., methoxy, ethoxy), an aryl group having 6 to 20 carbon atoms (e.g., phenyl, 4-sulfophenyl, 2,5-disulfophenyl, 4-carboxyphenyl, naphthyl), an aryloxy group having 6 to 20 carbon atoms (e.g., phenoxy, naphthoxy), a halogen atom (e.g., fluorine, chlorine, bromine, iodine), carboxyl, an alkoxycarbonyl group having 2 to 10 carbon atoms (e.g., methoxycarbonyl, ethoxycarbonyl), cyano, an acyl group having 2 to 10 carbon atoms (e.g., acetyl, pivaloyl), a carbamoyl group having 1 to 10 carbon atoms (e.g., carbamoyl, methylcarbamoyl, morpholinocarbamoyl), a substituted amino group having 1 to 20 carbon atoms (e.g., dimethylamino, diethylamino, disulfonylamino, N-ethyl-N'-sulfoethylamino), sulfo and oxo. Carboxyl and sulfo can be in the form of a salt.

In the formula (V), Z is an anion and n is an integer required for neutralizing the molecule. In the case that an internal salt is formed, n is 0. Various organic or inorganic anions can be used as Z. Examples of the anions include halide ions (fluoride ion, chloride ion, bromide ion, iodide ion), a substituted arylsulfonate ion (e.g., p-toluenesulfonate ion, p-chlorobenzenesulfonate ion), an aryldisulfonate ion (e.g., 1,3-benzenedisulfonate ion, 1,5-naphthalenedisulfonate ion, 2,6-naphthalenedisulfonate ion) and an alkylsulfate ion (e.g., methylsulfate ion). Z preferably is chloride ion, bromide ion or p-toluenesulfonate ion, and more preferably is chloride ion or p-toluenesulfonate ion.

The pyridinium compound is preferably represented by the formula (Va).

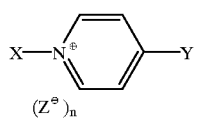

(Va)

In the formula (Va), X is a heterocyclic group, Y is a substituent group for the pyridinium ring, Z is an anion, and n is an integer required for neutralizing the molecule. The definitions and substituent groups of X, Y and Z are the same as those of X, Y and Z in the formula (V).

After synthesizing an oxonol compound by using the pyridinium compound represented by the formula (Va), Y in the formula (Va) is attached to the meso-position of the methine chain in the synthesized oxonol compound.

In the synthesis of the oxonol compound represented by the formulas (I), (IIIa), (IIIb) or (IIIc), Y in the formula (Va) is the heterocyclic group formed by Z in the formula (I), Hc² in the formula (IIIa), —CH=CH-Ar² in the formula (IIIb) or —CH=CH-Hc⁴ in the formula (IIIc).

The pyridinium compound represented by the formula (V) can be synthesized according to the following reaction formula.

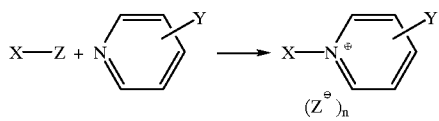

In the reaction formula, X is a heterocyclic group, Y is a substituent group for the pyridinium ring, Z is an anion, and n is an integer required for neutralizing the molecule. The definitions and substituent groups of X, Y and Z are the same as those of X, Y and Z in the formula (V).

The reaction can be conducted in a solvent. Examples of the solvents include an alcohol (e.g., methanol, ethanol, isopropanol, ethylene glycol), an amide (e.g., dimethylformamide, dimethylacetamide, acetamide, N-methylpyrrolidone), a nitrile (e.g., acetonitrile, n-butyronitrile), an ether (e.g., ethylene glycol monomethyl ether, ethylene glycol monoethyl ether, tetrahydrofuran), dimethylsulfoxide, sulfolane, an unsaturated hydrocarbon (e.g., toluene, xylene, benzene), a saturated hydrocarbon (e.g., hexane, octane), a ketone (e.g., acetone, methyl ethyl ketone) and an ester (e.g., ethyl acetate, methyl acetate and ethyl propionate).

The amount of the quaternizing agent (X-Z) preferably is the same or an excess mole of the pyridine substituted with Y. The amount is preferably in the range of the same mole to the 10 times mole, and most preferably in the range of the same mole to the 5 times mole.

The reaction temperature for the synthesis of the pyridinium compound represented by the formula (V) is preferably in the range 0 to 250° C., more preferably in the range of 10 to 200° C. and most preferably in the range of 50 to 180° C.

Examples of the pyridinium compounds represented by the formula (V) are shown below.

V-1
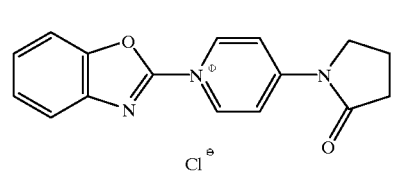

V-2
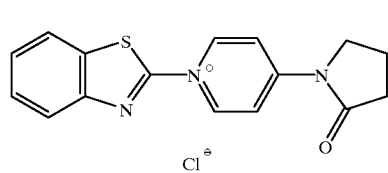

V-3
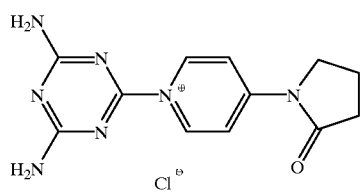

V-4
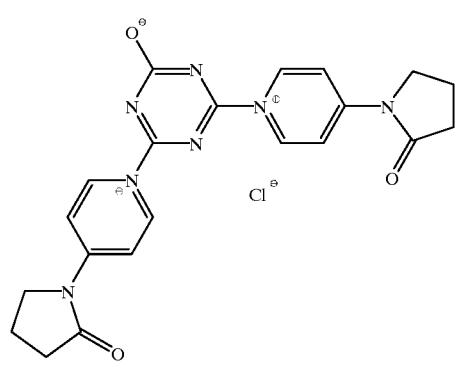

V-5
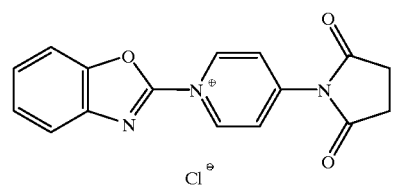

V-6
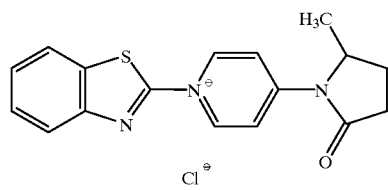

V-7
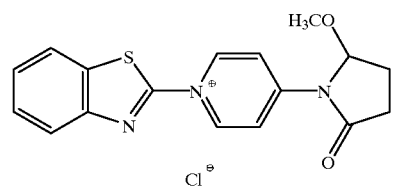

V-8
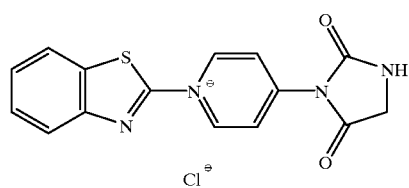

V-9
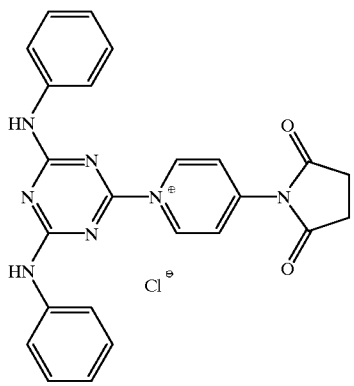
V-10
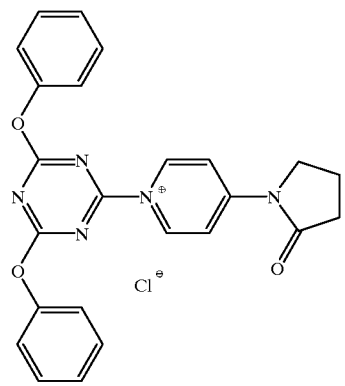
V-11
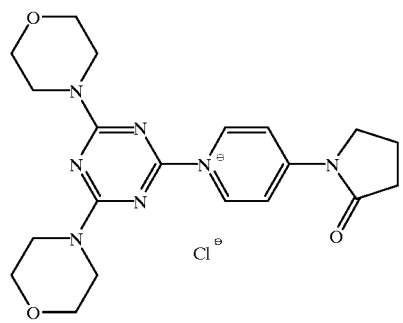
V-12
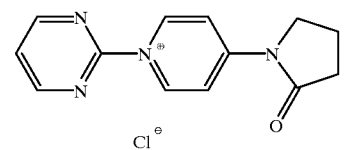
V-13
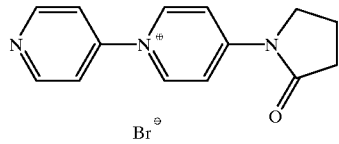
V-14
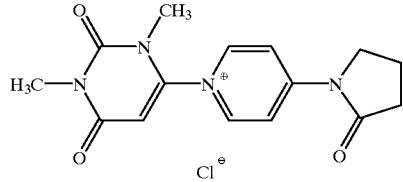
V-15
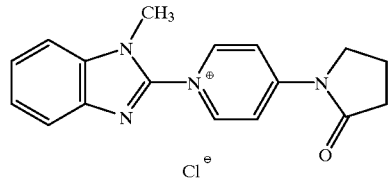
V-16
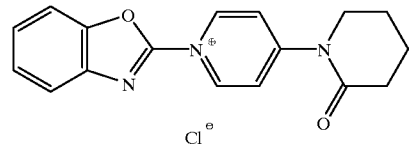
V-17
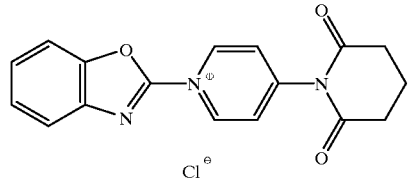
V-18
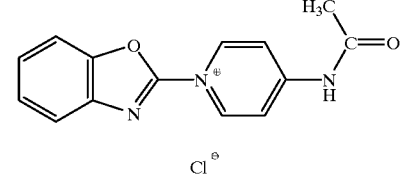
V-19
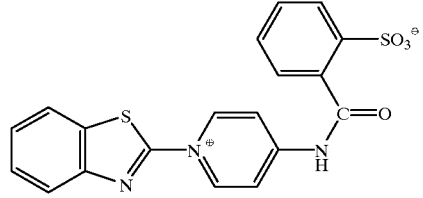
V-20
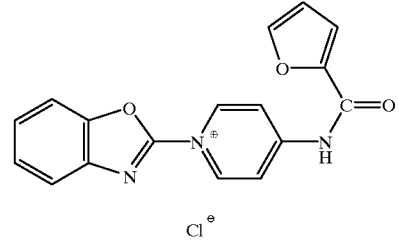

V-21 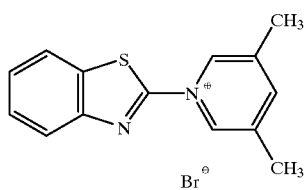
V-22 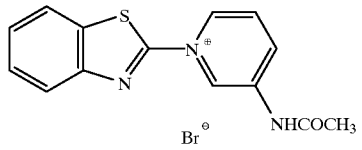
V-23 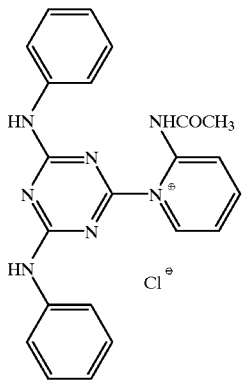
V-24 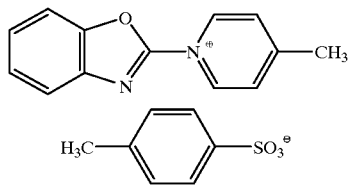
V-25 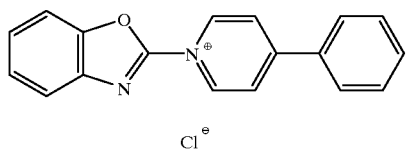
V-26 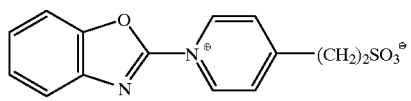
V-27 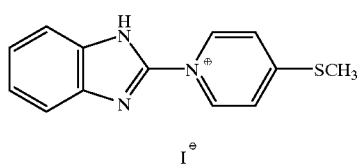
V-28 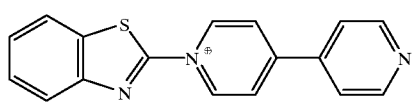
V-29 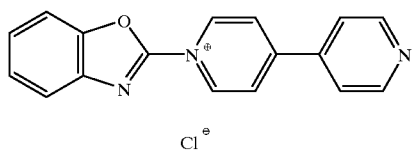
V-30 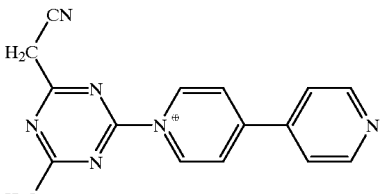
V-31 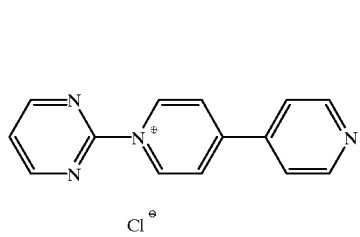
V-32 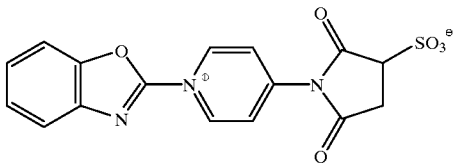
V-33 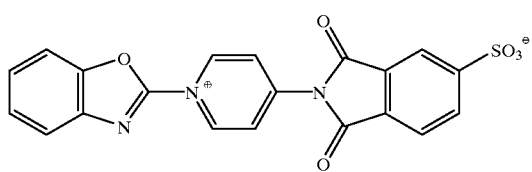
The α-ketomethylene compound represented by the formula (IV) reacted with the above-mentioned pyridinium compound represented by the formula (V) to form the oxonol compound represented by the formula (VI).

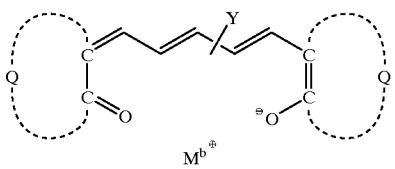

(VI)

In the formula (VI), Q is an atomic group that forms a carbon ring or a heterocyclic ring, Y is a substituent group for the methine chain, and $M^b$ is a cation. The methine chain in the formula (VI) is not only of trans-type but also of cis-type. The trans-type and cis-type are the tautomers in the methine chain.

The definitions and the substituent groups of Q and Y are the same as those of Q and Y in the formulas (IV) and (V).

The cation of $M^b$ preferably is a monovalent ion. Examples of the cations include proton, an alkali metal ion (e.g., lithium ion, potassium ion, sodium ion) and an organic ion (e.g., tetraalkylammonium ion, pyridinium ion). Proton, potassium ion, sodium ion, trimethylammonium ion, triethylammonium ion and pyridinium ion are preferred, proton, potassium ion, sodium ion and triethylammonium ion are more preferred, and proton and potassium ion are most preferred. In the case that $M^b$ is proton, the proton with the neighboring oxygen atom forms hydroxyl.

The reaction of the α-ketomethylene compound with the pyridinium compound can be conducted in a solvent. Examples of the solvents include an alcohol (e.g., methanol, ethanol, isopropanol, ethylene glycol), an amide (e.g., dimethylformamide, dimethylacetamide, acetamide, N-methylpyrrolidone), a nitrite (e.g., acetonitrile, n-butyronitrile), an ether (e.g., ethylene glycol monomethyl ether, ethylene glycol monoethyl ether, tetrahydrofuran), dimethylsulfoxide, sulfolane, water and a mixture thereof. In the case that a mixture of an organic solvent and water is used, the volume ratio of the organic solvent to water is preferably in the range of 1 to 100. A non-protonic polar solvent (e.g., dimethylformamide, dimethylacetamide, N-methylpyrrolidone, acetonitrile, dimethylsulfoxide) is preferably used to synthesize a pentamethine oxonol compound.

The reaction temperature is preferably in the range of 0 to the boiling point of the solvent, more preferably in the range of 0 to 10° C., and most preferably in the range of 10 to 80° C.

The molar ratio of the α-ketomethylene compound represented by the formula (IV) to the pyridinium compound represented by the formula (V) preferably is in the range of 0.5 to 3.0, and more preferably is about 2.

The reaction for the synthesis of an oxonol compound requires a base. An organic base is preferred to an inorganic base. An organic base of a weak nucleophilicity is particularly preferred. Examples of the organic bases include triethylamine, 1,8-diazabicycloundecene and potassium t-butoxide. The amount of the base is preferably in the range of the same or an excess mole of the pyridinium compound represented by the formula (V), more preferably in the range of 1.5 to 20 times mole based on the amount of the pyridinium compound, and most preferably in the range of 1.5 to 10 times.

The oxonol compound of the present invention can be used as a dye in a silver halide photographic material to improve the sharpness and the color resolution of the photographic material. In more detail, the oxonol compound of the invention can be used as a filter dye, an antiirradiation dye or an antihalation dye in a silver halide photographic material.

The oxonol compound of the invention is added to a silver halide emulsion layer or a non-light-sensitive layer (e.g., a protective layer, an intermediate layer, an antihalation layer, a backing layer, an ultraviolet absorbing layer, a color stain inhibiting layer) of a silver halide photographic material. The compound can be added to two or more layers. The compound is preferably added to a nonlight-sensitive layer rather than a silver halide emulsion layer. A dye is dispersed in a layer in the form of a molecular dispersion, or solid particles of a dye are dispersed in a layer. The molecular dispersion is preferred. The molecular dispersion means that a dye is so uniformly dispersed in a layer that particles of the dye are not observed with a transmission electron microscope (TEM) of 100,000 magnifications.

The molecular dispersion of the oxonol compound in a silver halide emulsion layer or a non-light-sensitive layer can be obtained by dissolving the compound in a solvent and adding the obtained solution to a coating solution of the layer. Examples of the solvents include water, methanol, ethanol, propanol, methylcellosolve, a halogenated alcohol (described in Japanese Patent Provisional Publication No. 48(1973)-9715 and U.S. Pat. No. 3,756,830), acetone, N,N-dimethylformamide, pyridine and a mixture thereof. Water, methanol and a mixture of water and methanol are particularly preferred.

The amount of the oxonol compound in a silver halide light-sensitive material is preferably so adjusted that the optical density is in the range of 0.05 to 3.0. The amount is preferably in the range of 0.5 to 1,000 mg per 1 $m^2$ of the silver halide photographic material, more preferably in the range of 1 to 500 mg, and most preferably in the range of 5 to 200 mg.

The oxonol compounds can be used in various light-sensitive materials. The light-sensitive materials include an optical image recording medium (optical disc). The oxonol compound can be used in place of a conventional dye contained in the optical disc. The oxonol compound is preferably added to a light-sensitive layer of the optical disc. The optical disc further has a non-light-sensitive layer, such as a reflective layer or a protective layer.

The oxonol compounds are particularly effective in color or black and white silver halide photographic materials.

The photographic materials include a color positive light-sensitive material, a color paper light-sensitive material, a color negative light-sensitive material, a color reversal light-sensitive material (including a coupler in emulsion type and a coupler in developer type), a direct positive silver halide photographic material, a photographic material for a printing plate (e.g., a lith film, a lith dupe film), a light-sensitive material for a cathode ray tube display, an X-ray recording light-sensitive material (particularly, a direct or indirect screen photographic material), a light-sensitive material for a silver salt diffusion transfer process, a light-sensitive material for a dye diffusion transfer process, a light-sensitive material for a silver dye bleaching process and a heat development light-sensitive material.

Silver halide used in the photographic material include silver bromide, silver iodobromide, silver iodochloride, silver chlorobromide and silver chloride. Silver high chloride (having a high chloride content) is preferred. Japanese Patent Provisional Publication No. 2(1990)-42 describes a light-sensitive material and a process for silver high chloride. Japanese Patent Provisional Publication No. 63(1988)-264743 describes a light-sensitive material and a process for silver chlorobromide.

The silver halide grains can be in the form of a regular (such as cubic, tetradecahedral, rhombic dodecahedral) crystal or an irregular (such as spherical, tabular) crystal. The silver halide grains can also be in the form of a complex crystal. Further, silver halide comprises a mixture of various crystals.

The silver halide grain can be made of different internal and external phases. The grain can also be made of a uniform phase. A latent image of silver halide can be formed mainly in the surface of the grain (for example, grains in a negative silver halide emulsion) or in the inside of the grain (for example, grains in an internal latent image type silver halide emulsion). A pre-fogged silver halide grain (for example grains in a direct positive silver halide emulsion) can also be used.

A silver halide emulsion can be prepared according to a known process, which is described in P. Glafkides, Chimie et Physique Photographique (Paul Montel, 1967), G. F. Duffin, Photographic Emulsion Chemistry (The Focal Press, 1966), or V. L. Zelikman et al., Making and Coating Photographic Emulsion (The Focal Press, 1964).

A silver halide solvent can be used at the stage of silver halide grain formation to control the grain growth. Examples of the silver halide solvents include ammonia, potassium thiocyanate, ammonium thiocyanate, a thioether compound (described in U.S. Pat. Nos. 3,271,157, 3,574,628, 3,704,130, 4,297,439 and 4,276,374), a thione compound (described in Japanese Patent Provisional Publication Nos. 53(1978)-82408, 53(1978)-144319 and 55(1980)-77737) and an amine compound (described in Japanese Patent Provisional Publication No. 54(1979)-100717).

Silver halide grain formation or physical ripening can be conducted in the presence of a cadmium salt, a zinc salt, a thallium salt, an iridium salt or a complex salt thereof, a rhodium salt or a complex salt thereof, or an iron salt or a complex salt thereof.

An internal latent image type silver halide emulsion is described in U.S. Pat. Nos. 2,592,250, 3,206,313, 3,447,927, 3,761,276 and 3,935,014. The internal latent image type emulsions include a conversion type silver halide emulsion, a core/shell type silver halide emulsion and a silver halide emulsion doped with a hetero metal atom.

A silver halide emulsion is usually subjected to a chemical sensitization. The chemical sensitization is described in H. Frieser, Die Grundlagen der Photographischen Prozesse mit Silverhalogeniden (Akademische Verlaggesellschaft, 1968), pages 675 to 734.

The chemical sensitization is classified into a chalcogen (sulfur, selenium, tellurium) sensitization, a reduction sensitization and a noble metal sensitization. The sulfur sensitization is conducted by using an active gelatin or a sulfur compound reactive to silver (e.g., a thiosulfate salt, thiourea, a mercapto compound, rhodanate) as a sensitizer. The reduction sensitization is conducted by using a reducing substance (e.g., a tin(II) salt, an amine, a hydrazine derivative, a formamidinesulfinic acid, a silane compound) as a sensitizer. The noble metal sensitization is conducted by using a noble metal compound (for example, complex salts of gold, or a metal of the VIII group in the periodic table such as Pt, Ir, Pd) as a sensitizer.

A silver halide photographic material can contain various compounds as an antifogging agent or a stabilizer to prevent a fog or to stabilize the photographic function at the preparation, storage or process of the material. The compounds include a heterocyclic compound, a heterocyclic mercapto compound, a thioketone compound (e.g., oxazolinethione), a benzenethiosulfonic acid, a benzenesulfinic acid and an acetylene compound (described in Japanese Patent Provisional Publication No. 62(1987)-87957). Examples of the heterocyclic compounds include thiazoles (e.g., a benzothiazolium salt and a ring opening derivative thereof), nitroindazoles, triazoles, benzotriazoles, benzimidazoles (particularly, nitro- or halogenated substituted derivatives) and azaindenes (such as tetrazaindenes, particularly 4-hydroxy substituted (1,3,3a,7)tetrazaindenes). The benzothiazolium salts are described in U.S. Pat. Nos. 3,954,478, 4,942,721 and Japanese Patent Provisional Publication No. 59(1984)-191032. The ring opening derivatives of the benzothiazolium salts are described in Japanese Patent Publication No. 59(1984)-26731. Examples of the heterocyclic mercapto compounds include mercaptothiazoles, mercaptobenzothiazoles, mercaptobenzimidazoles, mercaptothiadiazoles, mercaptotetrazoles (particularly, 1-phenyl-5-mercaptotetrazole) and mercaptopyrimidines. A water soluble group such as carboxyl or sulfo may be attached to the heterocyclic mercapto compounds.

A silver halide photographic material can contain a color coupler (cyan coupler, magenta coupler, yellow coupler).

The color coupler can be colored by an oxidation coupling reaction with an aromatic primary amine developer (e.g., a phenylenediamine derivative, an aminophenol derivative) at a color development process.

Examples of the magenta couplers include a 5-pyrazolone coupler, a pyrazolobenzimidazole coupler, a cyanoacetylcoumarone coupler and a ring opening acylacetonitrile coupler. Examples of the yellow couplers include an acylacetamide coupler (e.g., benzoylacetanilides, pivaloylacetanilides). Examples of the cyan couplers include a naphthol coupler and a phenol coupler. The color coupler preferably is a nondiffusion compound having a ballast hydrophobic group in its molecule. The couplers include two equivalent couplers and four equivalent couplers (equivalent to silver halide).

A silver halide photographic material can also contain a colored coupler or a development inhibitor releasing (DIR) coupler. The colored coupler is used to correct the color in an image. The DIR coupler can release a development inhibitor at a development process. A silver halide photographic material can further contain a non-coloring DIR coupling compound, which forms a colorless product by a coupling reaction, which further releases a development inhibitor.

A silver halide photographic material can further contain a compound having a function of increasing a sensitivity, increasing a contrast or accelerating development. Examples of the additives having the function include a polyalkylene oxide and a derivative thereof (e.g., ether, ester, amine), a thioether compound, a thiomorpholine compound, a quarternary ammonium salt, a urethane derivative, a urea derivative, an indazole derivative and 3-pyrazolidone.

A silver halide photographic material can further contain a dye other than the oxonol compound of the present invention. Examples of the photographic dyes include oxonol dyes having a pyrazolone nucleus or a barbituric acid nucleus (described in British Patent Nos. 506,385, 1,177, 429, 1,322,884, 1,338,799, 1,385,371, 1,433,102, 1,467,214, 1,553,516, U.S. Pat. Nos. 3,247,127, 3,469,985, 4,078,933, Japanese Patent Provisional Publication Nos. 48(1973)-85130, 49(1974)-114420, 52(1977)-117123, 55(1980)-

161233, 59(1984)-111640 and Japanese Patent Publication Nos. 39(1964)-22069, 43(1968)-13168, 62(1987)-273527), other oxonol dyes (described in U.S. Pat. Nos. 2,533,472, 3,379,533, British Patent No. 1,278621 and Japanese Patent Provisional Publication Nos. 1(1989)-134447, 1(1989)-183652), azo dyes (described in British Patent Nos. 575,691, 599,623, 680,631, 786,907, 907,125, 1,045,609, U.S. Pat. No. 4,255,326 and Japanese Patent Provisional Publication No. 59(1984)-211043), azomethine dyes (described in Japanese Patent Provisional Publication Nos. 50(1975)-100116, 54(1979)-118247 and British Patent Nos. 750,031, 2,014, 598), anthraquinone dyes (described in U.S. Pat. No. 2,865, 752), arylidene dyes (described in U.S. Pat. Nos. 2,522,009, 2,538,008 2,688,541, British Patent Nos. 584,609, 1,210, 252, Japanese Patent Provisional Publication Nos. 50(1975)-40625, 51(1976)-3623, 51(1976)-10927, 54(1979)-118247 and Japanese Patent Publication Nos. 48(1973)-3286, 59(1984)-37303), styryl dyes (described in Japanese Patent Publication Nos. 28(1954)-3082, 44(1969)-16594, 59(1984)-28898), triarylmethane dyes (described in British Patent Nos. 446,583, 1,335,422 and Japanese Patent Provisional Publication No. 59(1984)-228250), merocyanine dyes (described in British Patent Nos. 1,075,653, 1,153,341, 1,284,730, 1,475,228, 1,542,807) and cyanine dyes (described in U.S. Pat. Nos. 2,843,486, 3,294,539 and Japanese Patent Provisional Publication No. 1(1989)-291247).

A mordant can be used to prevent the dye from diffusion. The mordant usually is a hydrophilic polymer having an electron charge counter to the dissociated anionic dye. The mordant and the dye is contained in the same layer, and the mordant has a function of localizing the dye in the layer by an interaction between the mordant and the dye molecule. A method of using the mordant is described in U.S. Pat. Nos. 2,548,564, 3,625,694 and 4,124,386.

A photographic layer can be colored with solid particles of a water-insoluble dye. The water-insoluble dyes are described in Japanese Patent Provisional Publication Nos. 55(1980)-155350, 55(1980)-155351, 56(1981)-12639, 63(1988)-27838, 63(1988)-197943 and European Patent No. 15,601.

A photographic layer can also be colored with metal salt particles on which a dye is adsorbed. The metal salt particles are described in U.S. Pat. Nos. 2,719,088, 2,496,841, 2,496, 843 and Japanese Patent Provisional Publication No. 60(1985)-45237.

A silver halide photographic material can contain a surface active agent. The surface active agent have various functions as a coating aid, an antistatic agent, a slipping agent, an emulsifying or dispersing agent, an antiadhesive agent and a photographic improving agent (e.g., a development accelerator, a gradation hardener, a sensitizer).

The other photographic additives include a discoloration inhibitor, an inorganic or organic hardener, a color fogging inhibitor, an ultraviolet absorbent, a mordant, a plasticizer, a latex polymer and a matting agent. The photographic additives are described in detail in Research Disclosure, Vol. 176 (1978, XI), D-17643.

A silver halide photographic material usually contains a hydrophilic polymer as a protective colloid. Gelatin is a representative hydrophilic protective colloid.

Examples of the supports of the photographic materials include a baryta paper, a resin coated paper, a synthetic paper, a cellulose triacetate film, a polyethylene terephthalate film, other plastic films and a glass plate.

A silver halide photographic material is imagewise exposed to light according to a conventional method. Examples of the known light sources include natural light (sun light), a tungsten lamp, a fluorescent lamp, a mercury lamp, a xenon ark lamp, a carbon ark lamp, a xenon flash lamp and a cathode ray tube flying spot. An exposure time of a conventional camera is usually in the range of $10^{-3}$ to 1 second. The exposure time can be shorter than $10^{-4}$ second (for example, $10^{-6}$ to $10^{-4}$ second at the exposure of using a xenon flash lamp or a cathode ray tube) or longer than 1 second. If necessary, the spectrum of the light can be adjusted by using a color filter. The exposure can be conducted by using a laser beam. A photographic material can also be exposed to light emitted from a phosphor excited with an electron beam, X-ray, γ-ray or α-ray.

A silver halide photographic material can be processed according to a conventional processing method by using a conventional processing solution. The processing method and the processing solution are described in Research Disclosure, Vol. 176, pages 28 to 30 (RD-17643). The photographic material is processed to form a silver image (black and white photographic process) or to form a dye image (color photographic process). The processing temperature is usually in the range of 18 to 50° C. However, the photographic material can be processed at a temperature of lower than 18° C. or higher than 50° C.

The oxonol compound of the present invention can be used as a dye contained in a photographic material of a new format, which has a magnetic recording layer.

A polyester (for example, polyester of polyethylene with aromatic dicarboxylate) thin film is preferably used as a support of the photographic material having the magnetic recording layer. The thin film is preferably subjected to a thermal pretreatment. The thickness of the support is preferably in the range of 50 to 300 μm, more preferably in the range of 50 to 200 μm, further preferably in the range of 80 to 115 μm, and most preferably in the range of 85 to 105 μm. The thermal (annealing) treatment is preferably conducted at a temperature of 40° C. to the glass transition temperature of the polyester of the support for 1 to 1,500 hours. The polyester support is described in Japanese Patent Provisional Publication Nos. 6(1994)-35118 and 6(1994)-17528.

The thermally treated polyester support can be further subjected to an ultraviolet irradiation (described in Japanese Patent Publication Nos. 43(1968)-2603, 43(1968)-2604, 45(1970)-3828), a corona discharge treatment (described in Japanese Patent Publication No. 48(1973)-5043 and Japanese Patent Provisional Publication No. 51(1976)-131576) or a glow discharge treatment (described in Japanese Patent Publication Nos. 35(1960)-7578, 46(1971)-43480) to make the surface hydrophilic. The support can be subjected to an undercoating treatment (described in U.S. Pat. No. 2,761, 791). Strong magnetic particles (described in Japanese Patent Provisional Publication Nos. 59(1984)-23505, 4(1992)-195726, 6(1994)-59357) can be coated on an undercoating layer (described in U.S. Pat. No. 2,761,791) of a photographic material.

The magnetic recording layer can be in the form a stripe (as is described in Japanese Patent Provisional Publication Nos. 4(1992)-124642, 4(1992)-124645). A silver halide emulsion (described in Japanese Patent Provisional Publication Nos. 3(1991)-41436, 3(1991)-41437, 4(1992)-166932) can be coated after the photographic material is subjected to an antistatic treatment (described in Japanese Patent Provisional Publication No. 4(1992)-62543).

The photographic material having the magnetic layer can be prepared according to a production management (described in Japanese Patent Publication No. 4(1992)-

86817). The production data can be recorded (as is described in Japanese Patent Publication No. 6(1994)-87146). The photographic can be cut into films having a width narrower than the conventional 135 size before or after the production (as is described in Japanese Patent Provisional Publication No. 4(1992)-125560). The film is then subjected to perforation to form two holes per one format image, which is smaller than the conventional format image.

The prepared film is placed in a cartridge type package (described in Japanese Patent Publication No. 4(1992)-157459), a cartridge (described in Japanese Patent Provisional Publication No. 5(1993)-210202, and U.S. Pat. Nos. 4,834,306, 4,834,366, 5,226,613 and 4,846,418) or a film patrone (described in U.S. Pat. No. 4,221,479).

The tongue of the film is preferably stored in the film cartridge or the patrone to shield light (as is described in U.S. Pat. Nos. 4,848,693 and 5,317,355). A locking mechanism can be attached to the cartridge (as is described in U.S. Pat. No. 5,347,334). A display for the using conditions can also be attached to the cartridge (as is described in U.S. Pat. No. 5,347,334). Further, the cartridge preferably has a mechanism of preventing double exposure. A film is attached to the cartridge preferably by only inserting the film into the cartridge (as is Japanese Patent Provisional Publication No. 6(1994)-85128).

The film cartridge is used in a camera, a developing machine or a lab machine.

The camera preferably has a mechanism using the above-mentioned functions of the film cartridge or patrone. For example, Japanese Patent Provisional Publication Nos. 6(1994)-8886 and 6(1994)-99908 disclose a camera having an easy attachment mechanism for a film. Japanese Patent Provisional Publication Nos. 6(1994)-57398 and 6(1994)-101135 disclose an automatic film winding camera. Japanese Patent Provisional Publication No. 6(1994)-205690 discloses a camera having a mechanism for replacing a film while using the film. Japanese Patent Provisional Publication Nos. 5(1993)-295690 and 5(1993)-283382 disclose a camera having a mechanism for recording information of exposure on a magnetic recording layer. Japanese Patent Provisional Publication No. 6(1996)-101194 discloses a camera having a mechanism of preventing double exposure. Japanese Patent Provisional Publication No. 5(1993)-150577 discloses a display for using conditions.

After the exposure, the films can be developed in an automatic developing machine (described in Japanese Patent Provisional Publication Nos. 6(1994)-222514 and 6(1994)-222545). The recorded magnetic information can be used before or after the development (as is described in Japanese Patent Provisional Publication Nos. 6(1994)-95265 and 4(1992)-123054). The aspect ratio can be determined before or after the development (as is described in Japanese -Patent Provisional Publication No. 5(1993)-19364).

A splice treatment can be used when a motion picture film is processed (as is described in Japanese Patent Provisional Publication No. 5(1993)-119461). An attach or detach treatment can be conducted with or after the development process (as is described in Japanese Patent Provisional Publication No. 6(1994)-148805). After the process, the film information can be converted into a print by a back print or a front print for a color paper (as is described in Japanese Patent Provisional Publication Nos. 2(1990)-184835, 4(1992)-186335, 6(1994)-79968). The print can be returned to customers with an index print and a cartridge for reuse (as is described in Japanese Patent Provisional Publication Nos. 5(1993)-11353 and 5(1993)-232594).

EXAMPLE 1

(1) Synthesis of methine source 1

The methine source 1 was synthesized according to the following reaction formula.

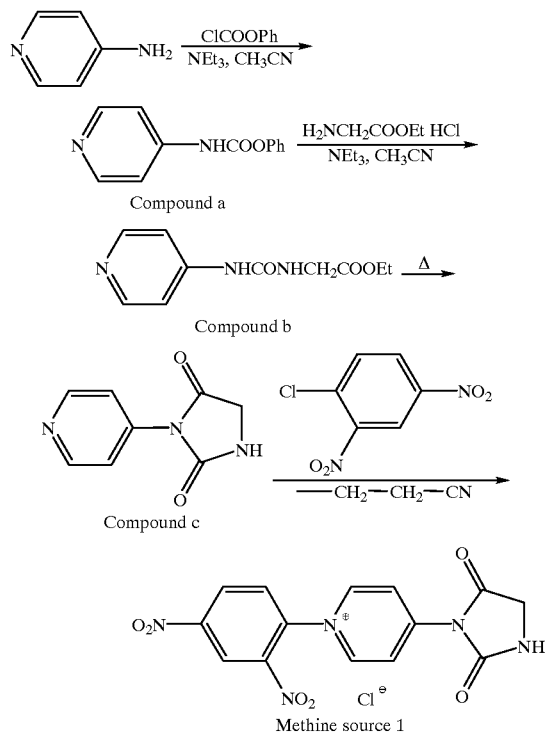

(1-1) Synthesis of compound a

In 400 ml of acetonitrile, 37.4 g (0.4 mol) of aminopyridine was suspended. To the suspension, 56 ml (0.4 mol) of triethylamine was added. To the mixture cooled with ice, 50.2 ml (0.4 mol) of phenyl chloroformate was stepwise (5 steps) added. After the addition, the mixture was stirred at the room temperature for 5 minutes. The reaction solution was poured into 700 ml of water. The precipitated crystals were filtered off to obtain the compound a.

Amount: 74.6 g

Yield: 87%

H-NMR(DMSO-d6), 67 : 8.42(d,2H), 7.10–7.60(m,7H)

(1-2) Synthesis of compound b

To 200 ml of acetonitrile, 21.4 g (0.1 mol) of the compound a, 14.0 g (0.1 mol) of chloride salt of glycine ethyl ester and 14 ml (0.1 mol) of triethylamine. The mixture was refluxed for 2 hours while heating. Acetonitrile was distilled out under a reduced pressure. The organic phase was extracted with ethyl acetate, and condensed to obtain an oil containing the compound b. The oil was not purified, and used at the next stage.

Mass(Posi): 224(M+H)$^+$ (1-3) Synthesis of compound c

The oil containing the compound b was heated at 150° C. for 1 hour to precipitate a solid. After the oil was cooled to the room temperature, 50 ml of acetone was added to the oil. The solid was filtered off, and washed with acetone to needle-like crystals of the compound c.

Amount: 10.4 g

Yield: 50% (calculated from the compound a)

H-NMR(DMSO-d6), 67 : 8.72(d,2H), 8.50(s,1H), 7.58(d, 2H), 4.10(s,2H)

Mass(Posi): 178(M+H)$^+$ (1-4) Synthesis of methine source 1

In 6 ml of n-butyronitrile, 1.8 g (10 mmol) of the compound c and 4.0 g (20 mmol) of 2,4-dinitrochlorobenzene were dissolved. The solution was stirred at 135° C. for 6 hours. The reaction solution was cooled to the room temperature. To the solution, 20 ml of acetone was added. The precipitated crystals were filtered off to obtain the methine source 1.

Amount: 3.0 g
Yield: 79%
H-NMR(DMSO-d6), δ: 9.38(d,2H), 9.19(s,1H), 9.10(d,1H), 8.97(dd,1H), 8.69(d,2H), 8.47(d,1H), 4.20(s,2H)
Mass(Posi): 344(M−Cl)$^+$ (2) Synthesis of methine source 2

The methine source 2 was synthesized according to the following reaction formula.

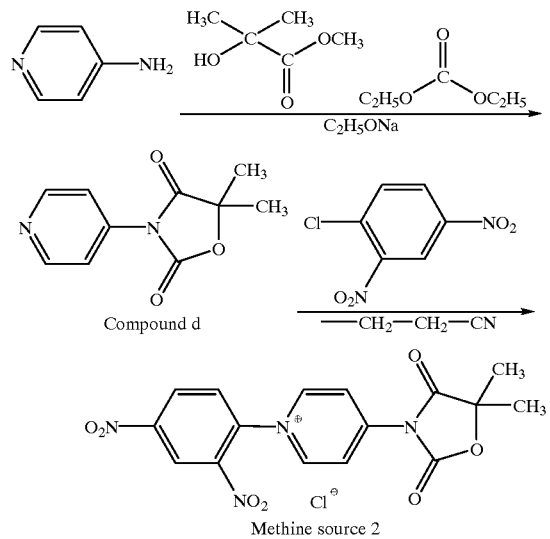

(2-1) Synthesis of compound d

With 36 ml of diethyl carbonate, 9.4 g (0.1 mol) of 4-aminopyridine and 11.8 g (0.1 mol) of methyl 2-hydroxy-2-methylpropionate were mixed. A catalytic amount of sodium ethylate was added to the mixture. The mixture was refluxed for 6 hours while heating to distill out an alcohol. Crystals precipitated in the reaction mixture were filtered off, and recrystallized with a mixture of hexane and ethyl acetate to obtain the compound d.

Amount: 12.8 g
Yield: 62%
Mass(Posi): 207(M+H)$^+$ (2-2) Synthesis of methine source 2

In 6 ml of n-butyronitrile, 2.06 g (10 mmol) of the compound d and 4.0 g (20 mmol) of 2,4-dinitrochlorobenzene were dissolved. The solution was stirred at 135° C. for 12 hours. The reaction solution was cooled to the room temperature. To the solution, 20 ml of acetone was added. The precipitated crystals were filtered off to obtain the methine source 2.

Amount: 2.8 g
Yield: 68%
Mass(Posi): 373(M−Cl)$^+$ (3) Synthesis of methine source 3

The methine source 3 was synthesized according to the following reaction formula.

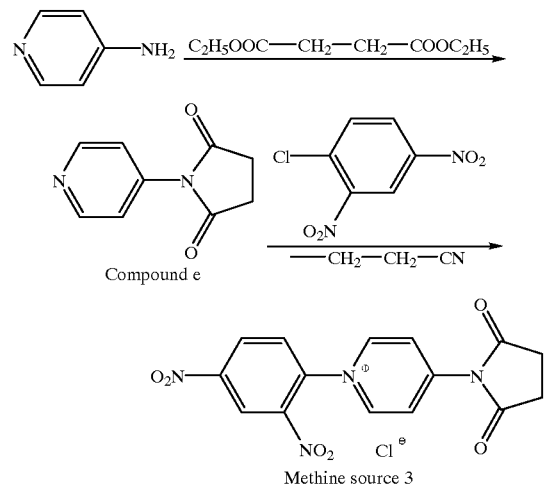

(3-1) Synthesis of compound e

In n-butyronitrile, 9.4 g (0.1 mol) of 4-aminopyridine and 17.4 g (0.1 mol) of diethyl succinate were dissolved. A catalytic amount of p-toluenesulfonic acid was added to the solution. The mixture was refluxed for 4 hours while heating to distill out an alcohol. Crystals precipitated in the reaction mixture were filtered off, and recrystallized with a mixture of hexane and ethyl acetate to obtain the compound e.

Amount: 14.1 g
Yield: 80%
Mass(Posi): 177(M+H)$^+$ (3-2) Synthesis of methine source 3

In 6 ml of n-butyronitrile, 1.76 g (10 mmol) of the compound e and 4.0 g (20 mmol) of 2,4-dinitrochlorobenzene were dissolved. The solution was stirred at 115° C. for 6 hours. The reaction solution was cooled to the room temperature. To the solution, 20 ml of acetone was added. The precipitated crystals were filtered off to obtain the methine source 3.

Amount: 3.4 g
Yield: 91%
Mass(Posi): 309(M−Cl)$^+$ (4) Synthesis of methine source 4

The methine source 4 was synthesized according to the following reaction formula.

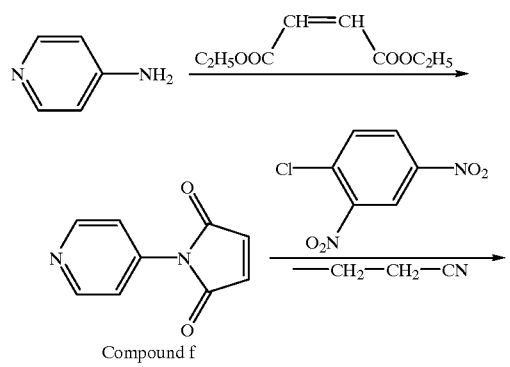

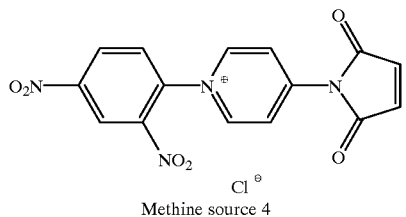

Methine source 4

(4-1) Synthesis of compound f

In n-butyronitrile, 9.4 g (0.1 mol) of 4-aminopyridine and 16.0 g (0.1 mol) of diethyl maleate were dissolved. A catalytic amount of p-toluenesulfonic acid was added to the solution. The mixture was refluxed for 4 hours while heating to distill out an alcohol. Crystals precipitated in the reaction mixture were filtered off, and recrystallized with a mixture of hexane and ethyl acetate to obtain the compound f.

Amount: 13.6 g
Yield: 78%
Mass(Posi): 175(M+H)$^+$ (4-2) Synthesis of methine source 4

In 6 ml of n-butyronitrile, 1.74 g (10 mmol) of the compound f and 4.0 g (20 mmol) of 2,4-dinitrochlorobenzene were dissolved. The solution was stirred at 115° C. for 6 hours. The reaction solution was cooled to the room temperature. To the solution, 20 ml of acetone was added. The precipitated crystals were filtered off to obtain the methine source 4.

Amount: 3.3 g
Yield: 88%
Mass(Posi): 341(M−Cl)$^+$ (5) Synthesis of methine source 5

The methine source 5 was synthesized according to the following reaction formula.

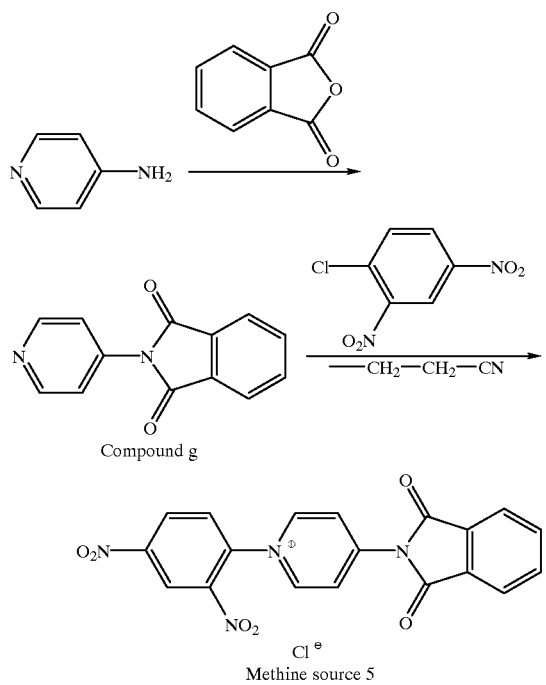

(5-1) Synthesis of compound g

In 10 ml of dimethylacetamide, 9.4 g (0.1 mol) of 4-aminopyridine and 14.8 g (0.1 mol) of phthalic anhydride were dissolved. To the solution, 1.90 g (10 mmol) of p-toluenesulfonic acid was added. The mixture was refluxed for 8 hours while heating. Crystals precipitated in the reaction mixture were filtered off, and recrystallized with a mixture of hexane and ethyl acetate to obtain the compound g.

Amount: 12.5 g
Yield: 56%
Mass(Posi): 225(M+H)$^+$ (5-2) Synthesis of methine source 5

In 6 ml of n-butyronitrile, 2.24 g (10 mmol) of the compound g and 4.0 g (20 mmol) of 2,4-dinitrochlorobenzene were dissolved. The solution was stirred at 115° C. for 6 hours. The reaction solution was cooled to the room temperature. To the solution, 20 ml of acetone was added. The precipitated crystals were filtered off to obtain the methine source 5.

Amount: 3.8 g
Yield: 89%
Mass(Posi): 391(M−Cl)$^+$ (6) Synthesis of compound Ia-1

In 40 ml of dimethylformamide, 4.0 g (10 mmol) of monosodium salt of 1-(2,4-disulfophenyl)-3-methylcarbamoylpyrazolone and 1.9 g (5 mmol) of the methine source 1 were dispersed. To the dispersion, 5.6 ml (40 mmol) of triethylamine was added. The mixture was stirred at the room temperature for 3 days. The reaction mixture was poured into 100 ml of acetone. The mixture was stirred at the room temperature for 30 minutes to precipitate the triethylamine salt of the compound Ia-1. The precipitated crystals were dissolved in 50 ml of methanol. To the solution, 20 ml of methanol solution containing 8 g of potassium acetate was added. The mixture was stirred at the room temperature for 30 minutes to precipitate crude crystals of the compound Ia-1. The crude crystals were dissolved in 20 ml of water. To the solution, 80 ml of methanol was added. After insoluble materials were filtered out, a small amount of acetone was added to the filtrate to precipitate the compound Ia-1 of a high purity.

Amount: 1.8 g
Yield: 33%
Melting point: >300° C.
Absorption maximum in solution: 689 nm (water)
Molar extinction coefficient: 140,000

(7) Synthesis of compound Ia-2

In 100 ml of dimethylsulfoxide and 10 ml of water, 3.9 g (10 mmol) of monosodium salt of 1-(2,4-disulfophenyl)-3-carboxypyrazolone and 1.9 g (5 mmol) of the methine source 1 were dispersed. To the dispersion, 5.6 ml (40 mmol) of triethylamine was added. The mixture was stirred at the room temperature for 2 days. The reaction mixture was poured into 50 ml of acetone. The mixture was stirred at the room temperature for 30 minutes to precipitate the triethylamine salt of the compound Ia-2. The precipitated crystals were dissolved in 50 ml of methanol. To the solution, 20 ml of aqueous solution containing 8 g of potassium acetate was added. The mixture was stirred at the room temperature for 30 minutes to precipitate crude crystals of the compound Ia-2. The crude crystals were dissolved in 20 ml of water. To the solution, 80 ml of methanol was added to precipitate the compound Ia-2.

Amount: 1.2 g
Yield: 21%
Melting point: >300° C.
Absorption maximum in solution: 685 nm (water)
Molar extinction coefficient: 120,000

(8) Synthesis of compound Ia-3

In 40 ml of dimethylformamide, 4.1 g (10 mmol) of monosodium salt of 1-(2,4-disulfophenyl)-3-ethoxycarbonylpyrazolone and 2.0 g (5 mmol) of 1-(2,4-dinitrophenyl)-4-(1-methyl-2,4-dioxyimidazolidine-3-yl) pyridinium chloride were dispersed. To the dispersion, 5.6 ml (40 mmol) of triethylamine was added. The mixture was stirred at the room temperature for 2 days. The reaction mixture was poured into 500 ml of acetone. The mixture was stirred at the room temperature for 30 minutes to precipitate the triethylamine salt of the compound Ia-3. The precipitated crystals were dissolved in 50 ml of methanol. To the solution, 20 ml of aqueous solution containing 8 g of sodium acetate was added. The mixture was stirred at the room temperature for 30 minutes to precipitate crude crystals of the compound Ia-3. The crude crystals were dissolved in 20 ml of water. To the solution, 80 ml of methanol was added to precipitate the compound Ia-3.

Amount: 2.7 g
Yield: 25%
Melting point: >300° C.
Absorption maximum in solution: 692 nm (water)
Molar extinction coefficient: 120,000

(9) Synthesis of compound Ia-5

In 10 ml of dimethylformamide, 2.9 g (10 mmol) of sodium salt of 3-(4-methoxy-3-sulfophenyl)isoxazolone and 1.9 g (5 mmol) of the methine source 1 were dissolved. To the solution, 2.8 ml (20 mmol) of triethylamine was added. The mixture was stirred at 70° C. for 2 hours. The reaction mixture was cooled to the room temperature, and poured into acetone. The supernatant was removed, and the oily residue was dissolved in methanol. To the solution, 10 ml of methanol solution containing 8.0 g of potassium acetate was added to precipitate crude crystals of the compound Ia-5. The crude crystals were filtered off, and precipitated again with water and methanol to obtain the compound Ia-5.

Amount: 3.7 g
Yield: 45%
Melting point: >300° C.
Absorption maximum in solution: 640 nm (water)
Molar extinction coefficient: 120,000

(10) Synthesis of compound Ia-6

In the synthesis of the compound Ia-5, sodium salt of 3-(4-methoxy-3-sulfophenyl)isoxazolone was replaced with sodium salt of 3-(4-methoxy-3,5-disulfophenyl) isoxazolone, and the methine source 1 was replaced with 1-(2,4-dinitrophenyl)-4-(1-methyl-2,4-dioxyimidazolidine-3-yl)pyridinium chloride. The reactions were conducted in the same manner as in the synthesis of the compound Ia-5. As a result, the compound Ia-6 was obtained.

Amount: 5.1 g
Yield: 48%
Melting point: >300° C.
Absorption maximum in solution: 640 nm (water)
Molar extinction coefficient: 115,000

(11) Synthesis of compound Ia-7

In the synthesis of the compound Ia-5, sodium salt of 3-(4-methoxy-3-sulfophenyl)isoxazolone was replaced with sodium salt of 2,3-bis(4-sulfophenyl)pyrazolidinedione, the methine source 1 was replaced with 1-(2,4-dinitrophenyl)-4-(1-phenyl-2,4-dioxyimidazolidine-3-yl)pyridinium chloride, and potassium acetate was replaced with sodium acetate. The reactions were conducted in the same manner as in the synthesis of the compound Ia-5. As a result, the compound Ia-7 was obtained.

Amount: 6.0 g
Yield: 51%
Melting point: >300° C.
Absorption maximum in solution: 635 nm (water)
Molar extinction coefficient: 125,000

(12) Synthesis of compound Ia-8

In 10 ml of dimethylformamide, 3.0 g (10 mmol) of 1-(4-sulfophenyl)barbituric acid and 2.1 g (5 mmol) of 1-(2,4-dinitrophenyl)-4-(1-acetyl-2,4-dioxyimidazolidine-3-yl)pyridinium chloride were dissolved. To the solution, 2.8 ml (20 mmol) of triethylamine was added. The mixture was stirred at 70° C. for 1 hour. The reaction mixture was cooled to the room temperature, and poured into acetone. The supernatant was removed, and the oily residue was dissolved in methanol. To the solution, 10 ml of methanol solution containing 8.0 g of sodium acetate was added to precipitate crude crystals of the compound Ia-8. The crude crystals were filtered off, and precipitated again with water and methanol to obtain the compound Ia-8.

Amount: 4.6 g
Yield: 55%
Melting point: >300° C.
Absorption maximum in solution: 632 nm (water)
Molar extinction coefficient: 180,000

(13) Synthesis of compound Ia-11

In 20 ml of dimethylformamide, 2.2 g (10 mmol) of 4-sulfobenzofuranone was dissolved. To the solution cooled with ice, 5 ml of 1,8-diazabicycloundecene was added. The mixture was heated for 30 minutes to the internal temperature of 60° C. The reaction mixture was stirred for 1 hour, and cooled to the room temperature. To the mixture, methanol solution containing 3.9 g of potassium acetate was added to precipitate crude crystals of the compound Ia-11. The crude crystals were filtered off, and precipitated again with water and methanol to obtain the compound Ia-11.

Amount: 1.3 g
Yield: 19%
Melting point: >300° C.
Absorption maximum in solution: 695 nm (water)
Molar extinction coefficient: 110,000

(14) Synthesis of compound Ia-14

In 100 ml of dimethylsulfoxide and 100 ml of water, 3.9 g (10 mmol) of monosodium salt of 1-(2,4-disulfophenyl)-3-carboxypyrazolone and 2.0 g (5 mmol) of the methine source 2 were dispersed. To the dispersion, 5.6 ml (40 mmol) of triethylamine was added. The reaction mixture was stirred at the room temperature for 2 days, and poured into 50 ml of acetone. The mixture was stirred at the room temperature for 30 minutes to precipitate triethylamine salt of the compound Ia-14. The obtained crystals were dissolved in 50 ml of the methanol. To the solution, 20 ml of aqueous solution containing 8 g of potassium acetate was added. The mixture was stirred at the room temperature for 30 minutes to precipitate crude crystals of the compound Ia-14. The crude crystals were dissolved in 20 ml of water. To the solution, 80 ml of methanol was added to precipitate the compound Ia-14.

Amount: 2.4 g
Yield: 20%
Melting point: >300° C.
Absorption maximum in solution: 687 nm (water)
Molar extinction coefficient: 125,000

(15) Synthesis of compound Ia-15

In 40 ml of dimethylformamide, 4.1 g (10 mmol) of monosodium salt of 1-(2,4-disulfophenyl)-3-ethoxycarbonylpyrazolone and 1.7 g (5 mmol) of methine source 3 were dispersed. To the dispersion, 5.6 ml (40 mmol) of triethylamine was added. The reaction mixture was stirred at the room temperature for 2 days, and poured into 100 ml of acetone. The mixture was stirred at the room temperature for 30 minutes to precipitate triethylamine salt of the compound Ia-15. The obtained crystals were dissolved in 50 ml of the methanol. To the solution, 20 ml of aqueous solution containing 8 g of sodium acetate was added. The mixture was stirred at the room temperature for 30 minutes to precipitate crude crystals of the compound Ia-15. The crude crystals were dissolved in 20 ml of water. To the solution, 80 ml of methanol was added to precipitate the compound Ia-15.

Amount: 2.3 g
Yield: 22%
Melting point: >300° C.
Absorption maximum in solution: 686 nm (water)
Molar extinction coefficient: 120,000

(16) Synthesis of compound Ia-16

In 20 ml of dimethylformamide, 4.0 g (10 mmol) of monosodium salt of 1-(2,4-disulfophenyl)-3-acetylpyrazolone and 1.9 g (5 mmol) of the methine source 4 were dissolved. To the solution, 5.6 ml (40 mmol) of triethylamine was added. The mixture was stirred at the room temperature for 6 hours. Acetone was added to the reaction mixture to precipitate crude crystals of the compound Ia-16. The crystals were dissolved in a mixture of methanol and water. To the solution, 20 ml of aqueous solution containing 10.0 g of sodium acetate was added to precipitate the compound Ia-16.

Amount: 3.1 g
Yield: 31%
Melting point: >300° C.
Absorption maximum in solution: 682 nm (water)
Molar extinction coefficient: 140,000

(17) Synthesis of compound Ia-17

In 40 ml of dimethylformamide, 4.0 g (10 mmol) of monosodium salt of 1-(2,4-disulfophenyl)-3-methylcarbamoylpyrazolone and 2.2 g (5 mmol) of the methine source 5 were dispersed. To the dispersion, 5.6 ml (40 mmol) of triethylamine was added. The reaction mixture was stirred at the room temperature for 3 days, and poured into 100 ml of acetone. The mixture was stirred at the room temperature for 30 minutes to precipitate triethylamine salt of the compound Ia-17. The obtained crystals were dissolved in 50 ml of methanol. To the solution, 20 ml of methanol solution containing 8 g of potassium acetate. The mixture was stirred at the room temperature for 30 minutes to precipitate crude crystals of the compound Ia-17. The crystals were dissolved in 20 ml of water. To the solution, 80 ml of methanol and 40 ml of isopropanol were added. After insoluble materials were filtered out, a small amount of acetone was added to the filtrate to precipitate the compound Ia-17 of a high purity.

Amount: 3.8 g
Yield: 33%
Melting point: >300° C.
Absorption maximum in solution: 689 rm (water)
Molar extinction coefficient: 115,000

EXAMPLE 2

Preparation of a reflective support

To a low-density polyethylene, 15 wt. % of titanium dioxide was added. To the mixture, 3.0 wt. % (based on the amount of titanium dioxide) of zinc stearate was added. The resulting mixture and ultramarine (DV-1, Daiichi Chemical Industry Co., Ltd.) were kneaded in a Bumbury's mixer. The mixture was shaped into pellets to obtain a master batch. The titanium dioxide particles had a size in the range of 0.15 to 0.35 $\mu$m, which was observed with an electron microscope. The particles were coated with hydrated aluminum oxide. The coating amount (converted to $Al_2O_3$) of the hydrated aluminum oxide was 0.75 wt. % based on the amount of the titanium dioxide.

A base paper having the basis weight of 170 g/m² was subjected to a corona discharge treatment of 10 kVA. The polyethylene pellets were melted at 320° C., and extruded on the base paper by a multi-layer extrusion coating die to form a polyethylene laminate layer having the thickness of 30 $\mu$m. The surface of the polyethylene layer was subjected to a glow discharge treatment.

Formation of photographic layers

Various photographic layers were coated on the reflective support to prepare a color paper having a multi-layered structure. The coating solutions were prepared as follows.

Preparation of coating solution for first layer

In 25 g of Solve-1 (solvent), 25 g of Solve-2 (solvent) and 180 ml of ethyl acetate, 153 g of ExY (yellow coupler), 15.0 g of Cpd-1 (color image stabilizer), 7.5 g of Cpd-2 (color image stabilizer) and 16.0 g of Cpd-3 (color image stabilizer were dissolved. The solution was emulsified and dispersed in 60 ml of 10 wt. % aqueous solution of sodium dodecylbenzenesulfonate and 1,000 ml of 10 wt. % aqueous solution of gelatin containing citric acid in the amount of 10 wt. % to prepare a dispersion A.

Independently, a silver chlorobromide emulsion A was prepared by mixing a large size emulsion A and a small size emulsion A. The large size emulsion A contained cubic grains having the average grain size of 0.88 $\mu$m. The distribution coefficient of the grain size was 0.08. The small size emulsion A had the average grain size of 0.70 pm. The distribution coefficient of the grain size was 0.10. The molar (silver) ratio of the large emulsion to the small emulsion was 3:7. Each of the large and small emulsions contained silver bromide of 0.3 mol %, which was localized on the surface of the grains. Each of blue sensitive sensitizing dyes A, B and C (shown below) was added to the large size emulsion A in the amount of $1.4 \times 10^{-4}$ mol based on 1 mol of silver, and to the small size emulsion A in the amount of $1.7 \times 10^{-4}$ mol.

Sensitizing dye A

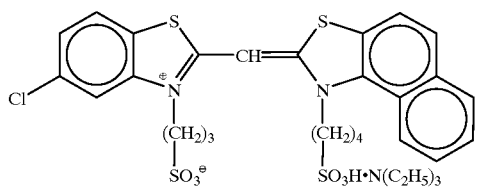

Sensitizing dye B

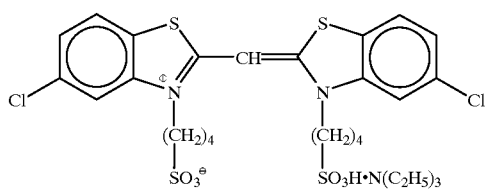

-continued

Sensitizing dye C

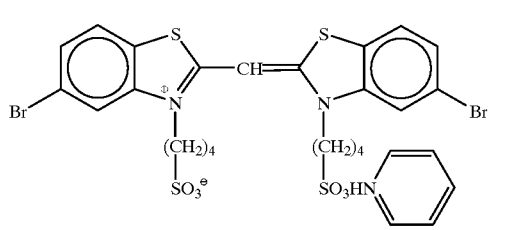

The dispersion A was mixed with the silver chlorobromide emulsion A. The coating solution for the first layer was prepared by using the mixture. The composition of the coating solution is shown below.

Preparation of coating solutions for second to seventh layers

Coating solutions for second to seventh layers were prepared in a similar manner to the preparation of the coating solution for the first layer.

The coating solutions were coated on the support to prepare a silver halide photographic material (color paper) having a layered structure described below. To each of the layers, 25.0 mg/m$^2$ of Cpd-14 (antiseptic) and 50.0 mg/m$^2$ of Cpd-15 (antiseptic) were added.

In the green sensitive emulsion layer (third layer), the following sensitive sensitizing dye D was added to a large size emulsion in the amount of $3.0 \times 10^{-4}$ mol based on 1 mol of silver, and to a small size emulsion in the amount of $3.6 \times 10^{-4}$ mol. Further, the following sensitive sensitizing dye E was added to the large size emulsion in the amount of $4.0 \times 10^{-5}$ mol, and to the small size emulsion in the amount of $7.0 \times 10^{-5}$ mol. Furthermore, the following sensitive sensitizing dye F was added to the large size emulsion in the amount of $2.0 \times 10^{-4}$ mol, and to the small size emulsion in the amount of $2.8 \times 10^{-4}$ mol.

Sensitizing dye D

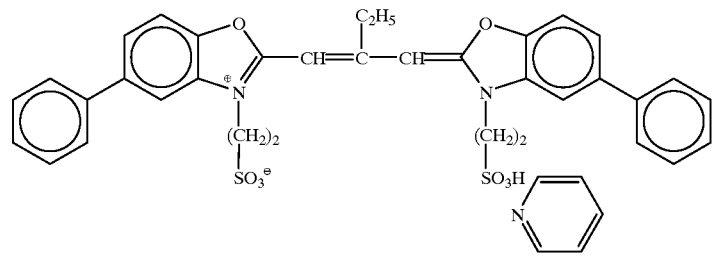

Sensitizing dye E

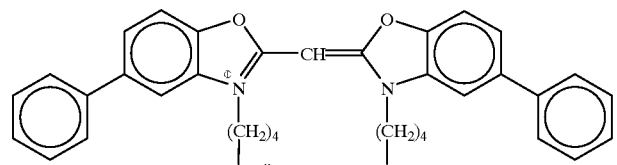

Sensitizing dye F

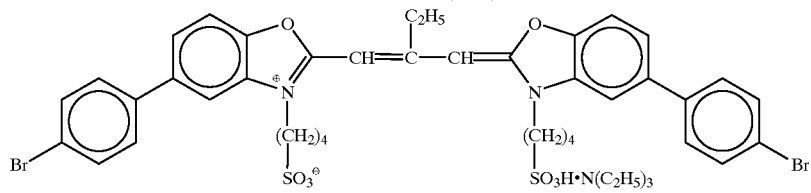

In the red sensitive emulsion layer (fifth layer), the following sensitive sensitizing dye G was added to a large size emulsion in the amount of $5.0 \times 10^{-5}$ mol based on 1 mol of silver, and to a small size emulsion in the amount of $6.0 \times 10^{-5}$ mol. Further, the following sensitive sensitizing dye H was added to the large size emulsion in the amount of $5.0 \times 10^{-5}$ mol, and to the small size emulsion in the amount of $6.0 \times 10^{-5}$ mol.

Sensitizing dye G

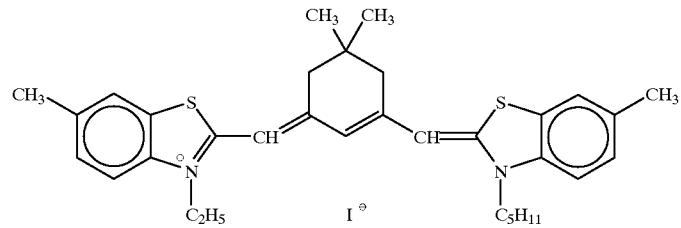

Sensitizing dye H

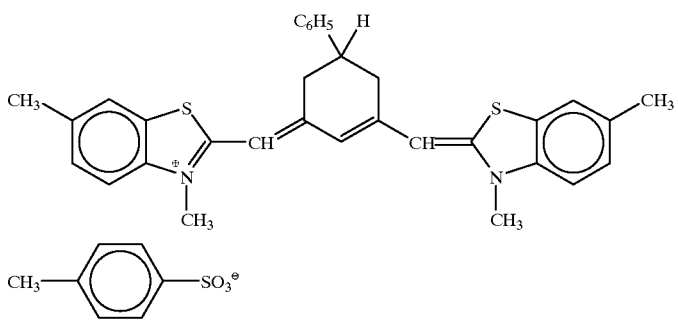

The following compound was added to each of the layers in the amount of $2.6 \times 10^{-3}$ mol based on 1 mol of silver halide.

Compound

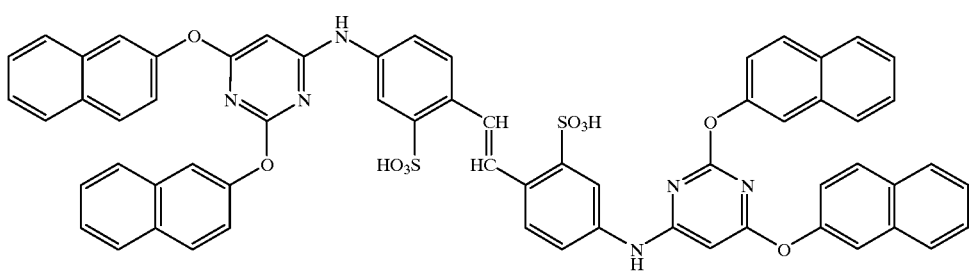

Further, 1-(5-methylureidophenyl)-5-mercaptotetrazole was added to the blue sensitive emulsion layer in the amount of $8.5 \times 10^{-5}$ mol based on 1 mol of silver, to the green sensitive emulsion layer in the amount of $9.0 \times 10^{-4}$ mol, and to the red sensitive emulsion layer in the amount of $2.5 \times 10^{-4}$ mol.

Furthermore, 4-hydroxy-6-methyl-1,3,3a,7-tetrazaindene was added to the blue sensitive emulsion layer in the amount of $1 \times 10^{-5}$ mol based on 1 mol of silver, and to the green sensitive emulsion layer in the amount of $2 \times 10^{-4}$ mol.

Layered structure

The compositions of the layers are shown below. The numerals mean the coating amounts (g/m²), except that the numerals of the silver halide emulsions mean the coating amounts of silver.

Support

Paper laminated with polyethylene having a polyethylene layer on the emulsion side, which contains a white pigment (TiO$_2$) and a blue dye (ultramarine)

| First layer (blue sensitive emulsion layer) | |
|---|---|
| Blue sensitive silver chlorobromide emulsion | 0.27 |
| Gelatin | 1.36 |
| ExY (yellow coupler) | 0.79 |
| Cpd-1 (color image stabilizer) | 0.08 |
| Cpd-2 (color image stabilizer) | 0.04 |
| Cpd-3 (color image stabilizer) | 0.08 |
| Cpd-5 (color image stabilizer) | 0.04 |
| Solv-1 (solvent) | 0.13 |
| Solv-2 (solvent) | 0.13 |
| Second layer (color stain inhibiting layer) | |
| Gelatin | 1.00 |
| Cpd-16 (color stain inhibitor) | 0.08 |
| Solv-1 (solvent) | 0.10 |
| Solv-2 (solvent) | 0.15 |
| Solv-3 (solvent) | 0.25 |
| Solv-8 (solvent) | 0.03 |
| Third layer (green sensitive emulsion layer) | |
| Silver chlorobromide emulsion B-1 | 0.13 |
| Gelatin | 1.45 |
| ExM (magenta coupler) | 0.16 |
| UV-2 (ultraviolet absorbent) | 0.16 |
| Cpd-2 (color image stabilizer) | 0.03 |
| Cpd-5 (color image stabilizer) | 0.10 |
| Cpd-6 (color image stabilizer) | 0.01 |
| Cpd-17 (color image stabilizer) | 0.01 |
| Cpd-8 (color image stabilizer) | 0.08 |
| Cpd-19 (color image stabilizer) | 0.02 |
| Solv-3 (solvent) | 0.13 |
| Solv-8 (solvent) | 0.39 |
| Solv-9 (solvent) | 0.26 |
| Fourth layer (Color stain inhibiting layer) | |
| Gelatin | 0.70 |
| Cpd-16 (color stain inhibitor) | 0.06 |
| Solv-1 (solvent) | 0.07 |
| Solv-2 (solvent) | 0.11 |
| Solv-3 (solvent) | 0.18 |
| Solv-7 (solvent) | 0.02 |
| Fifth layer (red sensitive emulsion layer) | |
| Silver chlorobromide emulsion C-1 | 0.18 |
| Gelatin | 0.85 |

-continued

| | |
|---|---|
| ExC (cyan coupler) | 0.33 |
| UV-4 (ultraviolet absorbent) | 0.18 |
| Cpd-1 (color image stabilizer) | 0.33 |
| Cpd-6 (color image stabilizer) | 0.01 |
| Cpd-8 (color image stabilizer) | 0.01 |
| Cpd-18 (color image stabilizer) | 0.02 |
| Cpd-19 (color image stabilizer) | 0.01 |
| Solv-1 (solvent) | 0.01 |
| Solv-6 (solvent) | 0.22 |
| Sixth layer (ultraviolet absorbing layer) | |
| Gelatin | 0.60 |
| UV-3 (ultraviolet absorbent) | 0.39 |
| Cpd-5 (color image stabilizer) | 0.01 |
| Cpd-17 (color image stabilizer) | 0.05 |
| Solv-10 (solvent) | 0.05 |
| Seventh layer (protective layer) | |
| Gelatin | 1.0 |
| Acryl denatured polyvinyl alcohol copolymer (denatured ratio: 17%) | 1.0 |
| Fluid paraffin | 0.02 |
| Cpd-13 (surface active agent) | 0.01 |

The silver chlorobromide emulsions B-1 and C-1 are described below.

The emulsion B-1 comprised a large size emulsion and a small size emulsion. The large size emulsion contained cubic grains having the average grain size of 0.55 μm. The distribution coefficient of the grain size was 0.08. A small size emulsion had the average grain size of 0.39 μm. The distribution coefficient of the grain size was 0.06. The molar (silver) ratio of the large emulsion to the small emulsion was 1:3. Each of the large and small emulsions contained silver bromide of 0.8 mol %, which was localized on the surface of the grains substantially consisting of silver chloride. Further, 0.1 mg (per 1 mol of silver) of potassium hexachloroiridate(IV) and 1 mg (per 1 mol of silver) of potassium hexacyanoferrate(II) were added to the internal phase and the silver bromide localized phase of the grains.

The emulsion C-1 also comprised a large size emulsion and a small size emulsion. The large size emulsion contained cubic grains having the average grain size of 0.50 μm. The distribution coefficient of the grain size was 0.09. A small size emulsion had the average grain size of 0.41 μm. The distribution coefficient of the grain size was 0.11. The molar (silver) ratio of the large emulsion to the small emulsion was 1:4. Each of the large and small emulsions contained silver bromide of 0.8 mol %, which was localized on the surface of the grains substantially consisting of silver chloride. Further, 0.1 mg (per 1 mol of silver) of potassium hexachloroiridate(IV) and 1 mg (per 1 mol of silver) of potassium hexacyanoferrate(II) were added to the internal phase and the silver bromide localized phase of the grains.

The additives for the layers are shown below.

ExY (yellow coupler)

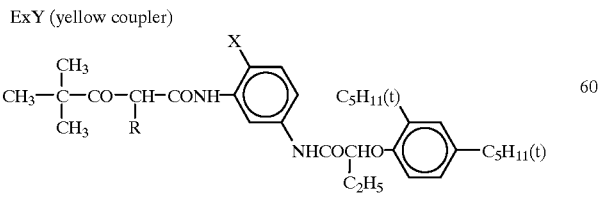

A mixture (molar ratio =1:1) of

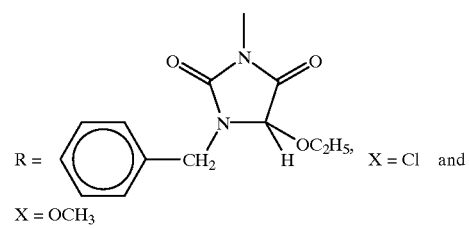

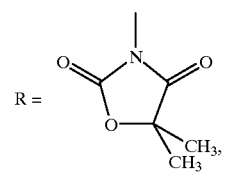

ExM (magenta coupler)
A mixture (molar ratio = 25:75) of

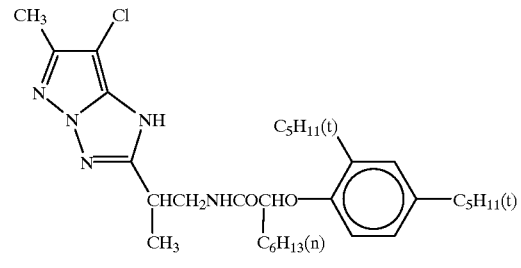

and

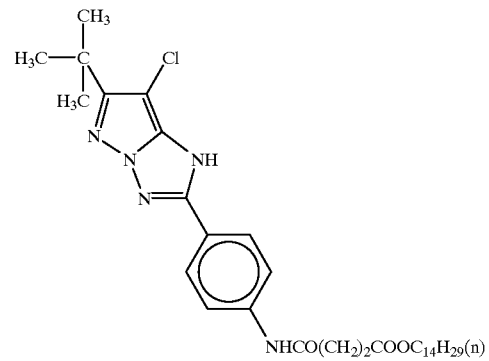

ExC (cyan coupler)
A mixture (molar ratio = 3:7) of

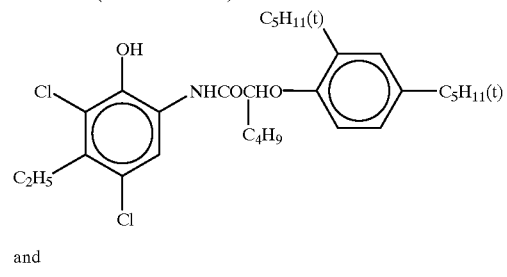

and

-continued
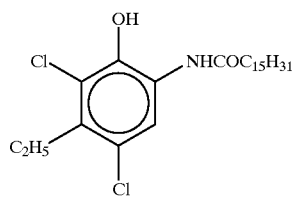
Cpd-1 (color image stabilizer)
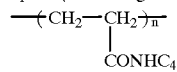
Average molecular weight: 60,000
Cpd-2 (color image stabilizer)
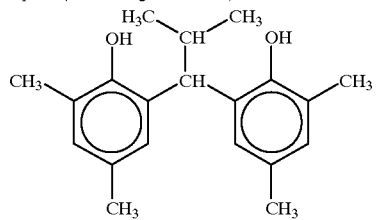
Cpd-3 (color image stabilizer)
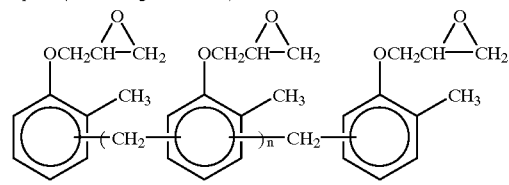
n = 7 to 8 (average)
Cpd-4 (color stain inhibitor)
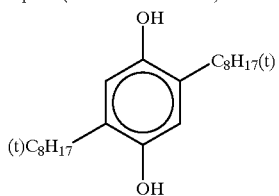
Cpd-5 (color image stabilizer)
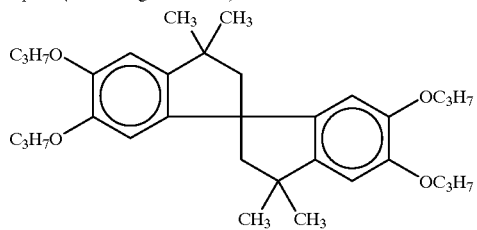
Cpd-6
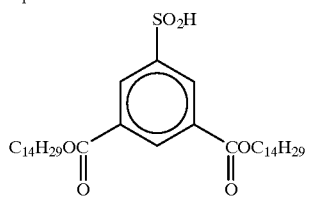
Cpd-7
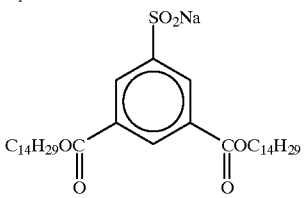
Cpd-8 (color image stabilizer)
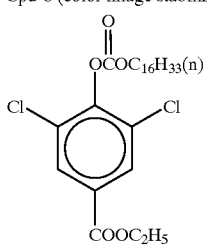
Cpd-9 (color image stabilizer)
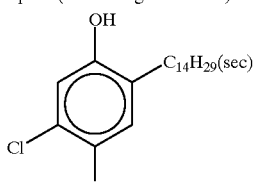
Cpd-10 (color image stabilizer)
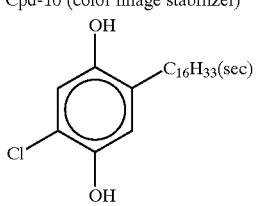
Cpd-11
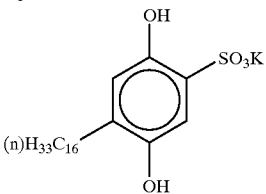
Cpd-12
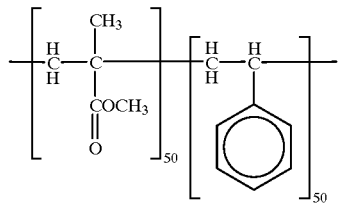
Average molecular weight: 60,000
Cpd-13
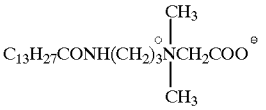

Cpd-14 (antiseptic)
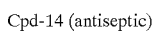
Cpd-15 (antiseptic)
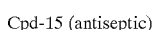
Cpd-16 (color stain inhibitor)
A mixture (weight ratio = 1:1:1) of
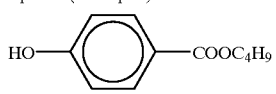
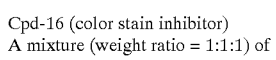
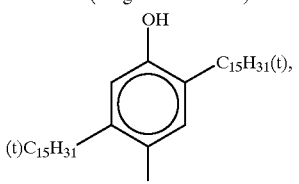
Cpd-17 (color image stabilizer)
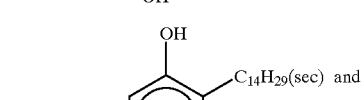
Number average molecular weight: 600
Cpd-18 (color image stabilizer)
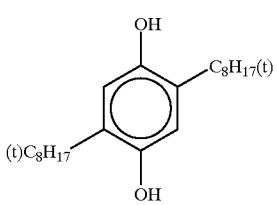
Cpd-19 (color image stabilizer)
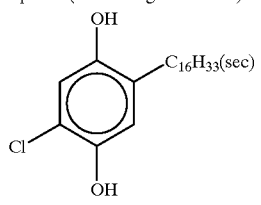
UV-1 (ultraviolet absorbent)
A mixture (weight ratio = 10:5:1:5) of
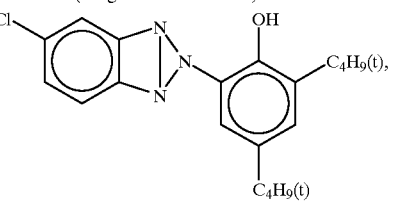
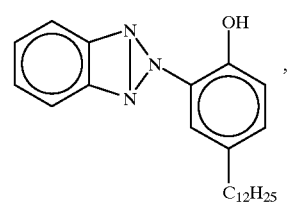
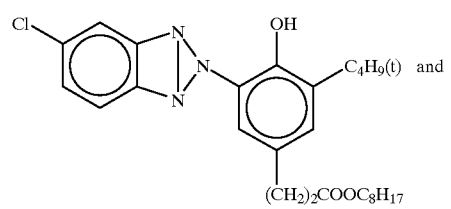
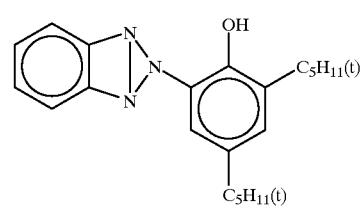
UV-2 (ultraviolet absorbent)
A mixture (weight ratio = 1:2:2) of
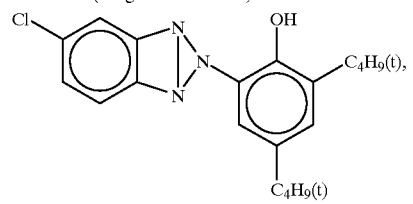
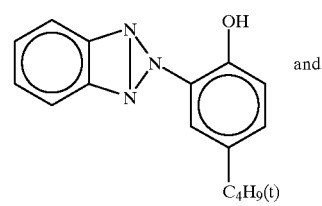
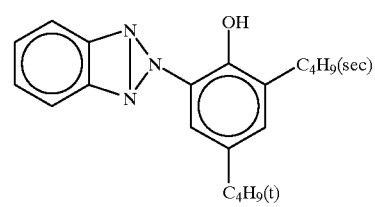

-continued

UV-3 (ultraviolet absorbent)
A mixture (weight ratio = 1:3:1:3) of

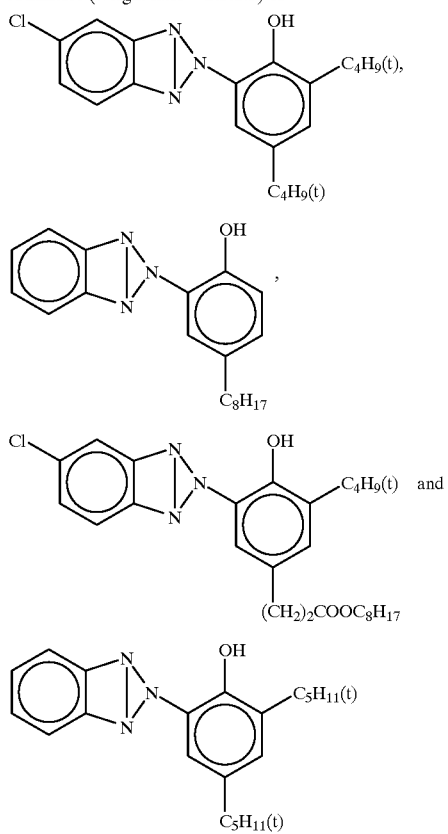

UV-4 (ultraviolet absorbent)
A mixture (weight ratio = 2:3:4) of

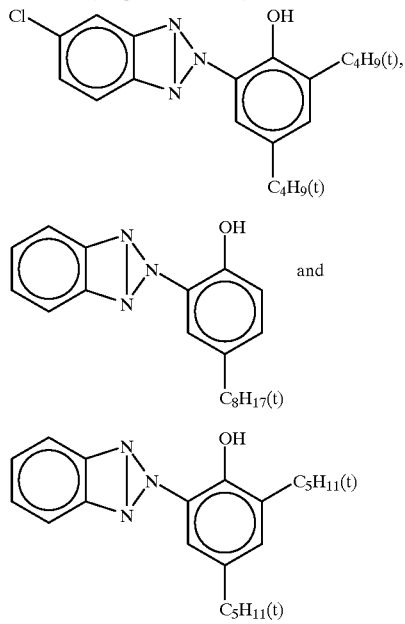

Solv-1 (solvent)
$C_8H_{17}CH\text{—}CH(CH_2)_7COOC_8H_{17}$
           \\_O_/

-continued

Solv-2 (solvent)

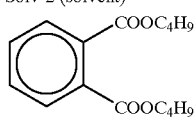

Solv-3 (solvent)

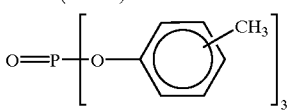

Solv-4 (solvent)

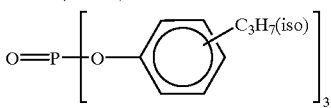

Solv-5 (solvent)

$O=P\text{―}(OCH_2\overset{C_2H_5}{\underset{|}{C}H}C_4H_9(n))_3$

Solv-6 (solvent)

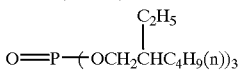

Solv-7 (solvent)

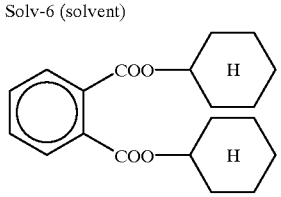

Solv-8 (solvent)
$O=P\text{―}[O\text{―}C_{16}H_{33}(n)]_3$

Solv-9 (solvent)
$\quad COOC_4H_9$
$\quad |$
$\quad (CH_2)_8$
$\quad |$
$\quad COOC_4H_9$ Solv-10 (solvent)
$\quad COOC_8H_{17}$
$\quad |$
$\quad (CH_2)_8$
$\quad |$
$\quad COOC_8H_{17}$ The following antiirradiation dyes C and D were added to the second and fourth layers. The dye C was added to each of the second and fourth layers in the amount of 10 gm/m². The dye D was added to each of the second and fourth layers in the amount of 4 mg/M².

Dye C

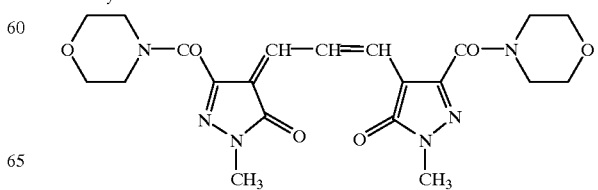

Dye D

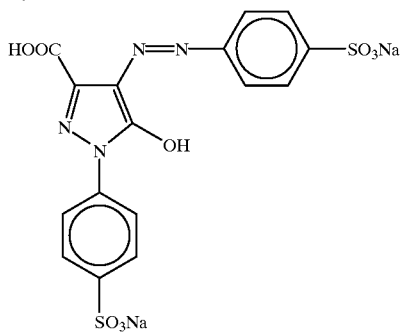

A silver halide photographic material (color paper) 100 was prepared as is described above.

Next, each of the dyes set forth in Table 1 was added to the sixth layer in the amount of 40 mg/m2 to prepare silver halide photographic materials (color papers) 101 to 115.

Evaluation of sensitivity and minimum density

The photographic materials were exposed to light for 1 second through an optical wedge and blue, green and red filters to evaluate the sensitivity. After the photographic materials were subjected to a color development process (conditions and developing solutions are shown below). The reflection densities of yellow, magenta and cyan in the processed paper were measured to obtain a characteristic curve. The photographic sensitivity was determined from the minimum density (Dmin) on the characteristic curve and the exposure for forming the density of 1.0.

Evaluation of sharpness

A rectangle pattern was printed on a glass plate by evaporation. The pattern had a density difference of 0.5 in which the spatial frequency was changed. The pattern was placed on each of the color papers, and the papers were exposed to light through a red filter. The density of the obtained rectangle image was exactly measured by a microdensitometer. The spatial frequency for the density of 0.5 (CTF) was determined as an index of the sharpness. The sharpness is improved with increasing the value of CTF.

Evaluation of stability

The (unexposed) color papers were stored at 0° C. or 40° C. and at the relative humidity of 60% for 4 weeks to evaluate stability (change of photographic sensitivity and degradation of sharpness). The stored color papers were exposed to light and developed in the same manner as is described above.

The change of the photographic sensitivity was evaluated as the difference ($\Delta S = S^2 - S^1$) between the sensitivity of the color paper stored at 0° C. ($S^1$) and the sensitivity of the color paper stored at 40° C. and at the relative humidity of 60% ($S^2$). The stability of the photographic material is preferably improved with decreasing the value of $\Delta S$. The sharpness was evaluated in the same manner as is described above by using the color paper stored at 40° C. and at the relative humidity of 60%.

The developing conditions and developing solutions are described below.

| Process | Temperature | Time |
| --- | --- | --- |
| Color development | 45° C. | 30 seconds |
| Bleach-fix | 40° C. | 15 seconds |
| Rinsing (1) | 35 to 40° C. | 4.2 seconds |
| Rinsing (2) | 35 to 40° C. | 2.6 seconds |
| Rinsing (3) | 35 to 40° C. | 2.6 seconds |
| Rinsing (4) | 35 to 40° C. | 2.6 seconds |
| Rinsing (5) | 35 to 40° C. | 4.2 seconds |
| Drying | 80° C. | 13 seconds |

| Color developing solution | |
| --- | --- |
| Water | 700 ml |
| Sodium triisopropylnaphthalene(β)sulfonate | 0.1 g |
| Ethylenediaminetetraacetic acid | 3.0 g |
| Disodium 1,2-dihydroxybenzene-4,6-disulfonate | 0.5 g |
| Triethanolamine | 12.0 g |
| Potassium chloride | 15.8 g |
| Potassium bromide | 0.04 g |
| Potassium carbonate | 27.0 g |
| Sodium sulfite | 0.1 g |
| Disodium salt of N,N-bis(sulfonatethyl)hydroxylamine | 10.0 g |
| Sulfate salt of N-ethyl-N-(b-methanesulfonamidoethyl)-3-methyl-4-aminoaniline | 7.0 g |
| A brightening agent | 5.0 g |
| Water (to make up to) | 1,000 ml |
| pH (25° C.) | 10.35 |
| Bleach-fix solution | |
| Water | 800 ml |
| Aqueous solution (750 g per liter) of ammonium thiosulfate | 120 ml |
| Ammonium sulfite | 30 g |
| Ammonium salt of iron(III) ethylenediaminetetraacetate | 0.11 mol |
| Ethylenediaminetetraacetic acid | 0.01 mol |
| 3-Carboxyphenylsulfinic acid | 0.1 mol |
| Maleic acid | 0.1 mol |
| pH (at 25° C. adjusted with nitric acid and ammonia water) | 6.5 |
| Rinsing solution | |
| Ion-exchanged water (calcium or magnesium content: not more thant 3 ppm) | |

The results are set forth in Table 1.

TABLE 1

| | | Not stored paper | | Stored paper | |
| --- | --- | --- | --- | --- | --- |
| Sample No. | Dye in sixth layer | Sharpness CTF | Dmin Cyan | Stability ΔS, Cyan | Sharpness CTF |
| 101 | Comp. 1 | 15.5 | 0.09 | 0.35 | 10.5 |
| 102 | Comp. 2 | 14.0 | 0.09 | 0.20 | 12.5 |
| 103 | Comp. 3 | 12.5 | 0.09 | 0.03 | 12.0 |
| 104 | Comp. 4 | 13.0 | 0.10 | 0.03 | 12.5 |
| 105 | Comp. 4* | 14.0 | 0.14 | 0.05 | 13.5 |
| 106 | Ia-1 | 16.0 | 0.08 | 0.01 | 16.0 |
| 107 | Ia-2 | 16.0 | 0.07 | 0.02 | 15.5 |
| 108 | Ia-3 | 16.5 | 0.08 | 0.02 | 16.0 |
| 109 | Ia-14 | 16.0 | 0.08 | 0.01 | 15.5 |
| 110 | Ia-15 | 16.0 | 0.08 | 0.02 | 15.5 |
| 111 | Ib-1 | 16.5 | 0.05 | 0.01 | 16.5 |
| 112 | Ib-4 | 16.0 | 0.05 | 0.01 | 16.0 |
| 113 | Ib-7 | 16.5 | 0.07 | 0.02 | 16.5 |

TABLE 1-continued

| | | Not stored paper | | Stored paper | |
|---|---|---|---|---|---|
| Sample No. | Dye in sixth layer | Sharpness CTF | Dmin Cyan | Stability ΔS, Cyan | Sharpness CTF |
| 114 | Ib-8 | 16.5 | 0.06 | 0.01 | 16.5 |
| 115 | Ib-9 | 16.0 | 0.05 | 0.02 | 16.0 |

(Remark)
Amount of Comp. 4*: 60 mg/m$^2$
(Amount of the others: 40 mg/m$^2$)
Stability: Change of photographic sensitivity Comparative compound 1

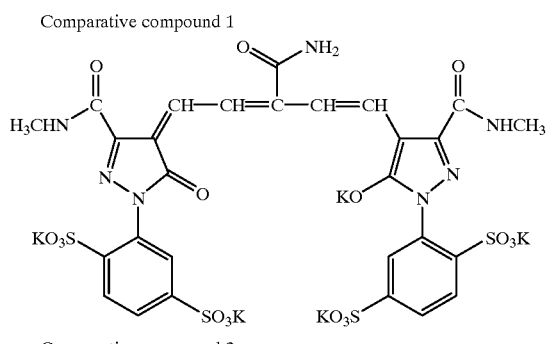

Comparative compound 2

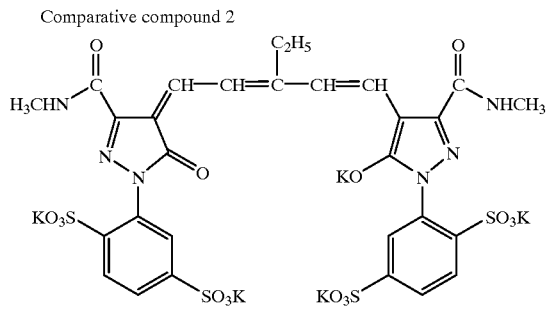

Comparative compound 3

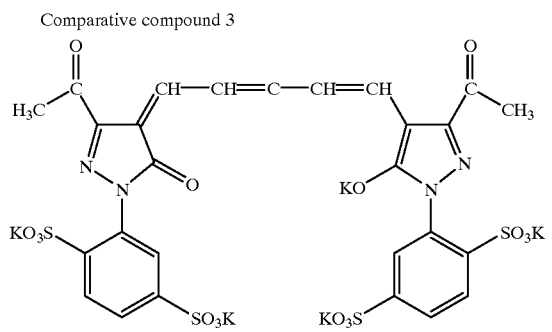

Comparative compound 4

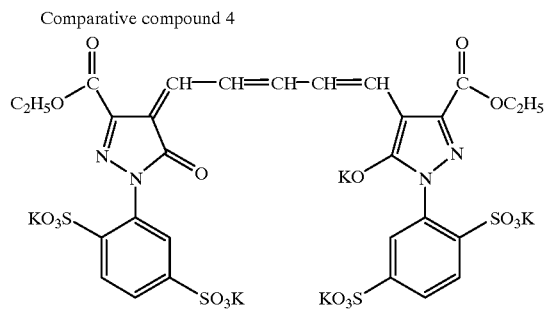

As is evident from the results shown in Table 1, the color papers using the oxonol dyes of the present invention are improved in the sharpness. Further, an image of high sharpness can be obtained even if the color papers were stored under severe conditions.

On the other hand, the comparative color paper (101) forms an image of high sharpness immediately after the preparation, but the sharpness and the sensitivity are degraded after the color paper was stored under severe conditions. The other comparative color papers (102 to 104) have a problem in the sharpness. Where the amount of the dye is increased in the comparative paper (105), the sharpness is improved, but the white background is stained (showing the high Dmin value) because (the large amount of) the dye is not sufficiently removed at the development process.

It is apparent from the above-mentioned results that the silver halide photographic materials of the present invention can form a clear image of high sharpness and low background stain. Further, the sensitivity and the sharpness are not degraded, even if the silver halide photographic materials were stored under severe conditions.

EXAMPLE 3

(31) Synthesis of methine source 11

In 400 ml of butyronitrile, 78.1 g (0.5 mol) of 4,4'-bipyridyl and 106.4 g (0.525 mol) of 2,4-dinitrochlorobenzene were dissolved. The solution was refluxed for 73 hours while heating. The reaction solution was cooled to the room temperature. To the solution, 400 ml of acetone and 20 ml of methanol were added. After black insoluble materials were removed from the solution, the solution was concentrated under a reduced pressure. The obtained oily residue was dissolved in methanol. The solution was cooled to precipitate crystals of the methine source 11.

Amount: 62.3 g

Yield: 35%

H-NMR(DMSO-d6), δ: 9.67(d,1H), 9.15(d,1H), 9.04(d, 2H), 8.95(dd,1H), 8.91(d,2H), 8.27(d,2H), 8.15(d,2H)

Mass(Posi): m/e=323(M−Cl)$^+$, 681(2M−Cl)$^+$

Methine source 11

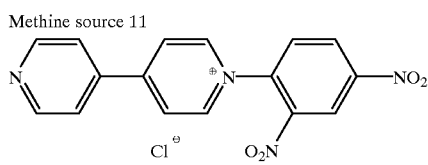

(32) Synthesis of methine source 12

In 35 ml of butyronitrile, 5.0 g (32 mmol) of 2,4'-bipyridyl and 6.5 g (32 mmol) of 2,4-dinitrochlorobenzene were dissolved. The solution was refluxed for 20 hours at 100° C. The reaction solution was cooled to the room temperature. After acetone was added to the solution, the precipitated methine source 11 was filtered off.

Amount: 9.4 g

Yield: 82%

H-NMR(DMSO-d6), δ: 9.55(d,2H), 9.17(d,1H), 9.13(d, 2H), 9.02(dd,1H), 8.95(d,1H), 8.95(d,1H), 8.67(d,1H), 8.52 (d,1H), 8.21(t,1H), 7.78 (dd,1H)

Methine source 12

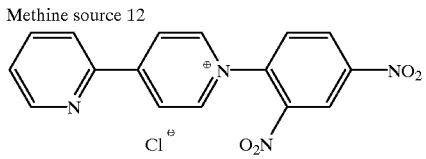

Methine source 15

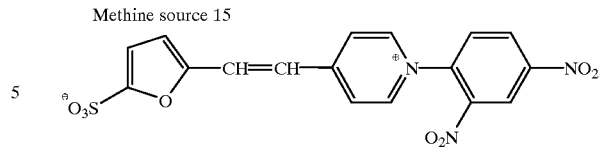

(33) Synthesis of methine source 13

In 20 ml of ethanol, 2.9 g (10 mmol) of N-(2,4-dinitrophenyl)-4-methylpyridinium chloride and 1.8 g (10 mmol) of 4-(N,N-dimethylamino)benzaldehyde were dissolved. The solution was refluxed for 40 minutes while heating. The reaction solution was concentrated under a reduced pressure. The obtained crude crystals were washed with acetone to obtain the methine source 13.

Amount: 4.3 g
Yield: 95%
Mass(Posi): m/e=419(M−Cl)$^+$

Methine source 13

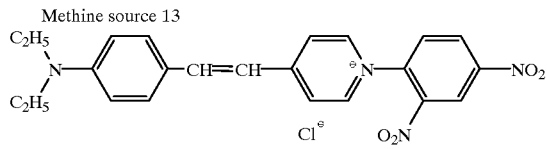

(34) Synthesis of methine source 14

In 400 ml of methanol, 3.5 g (11 mmol) of disodium salt of N-(2,4-dinitrophenyl)-4-methylpyridinium chloride and 1.8 g (10 mmol) of 4-(N,N-disulfoethylamino)-2-benzaldehyde were dispersed. The dispersion was refluxed for 4 hours while heating. After insoluble materials were removed from the reaction solution, the solution was concentrated under a reduced pressure. The obtained crude crystals were washed with acetone to obtain the methine source 14.

Amount: 3.8 g
Yield: 62%
Mass(Nega): m/e=519(M−Na)$^-$

Methine source 14

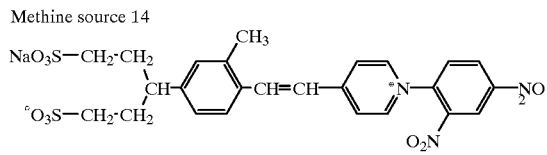

(35) Synthesis of methine source 15

In 10 ml of acetic acid and 1 ml of acetic anhydride, 3.0 g (10 mmol) of N-(2,4-dinitrophenyl)-4-methylpyridinium chloride and 2.0 g (10 mmol) of sodium 5-formyl-2-furansulfonate were dissolved. The solution was refluxed for 2 hours while heating to precipitate crude crystals of the methine source 15. The crude crystals were recrystallized with methanol and acetone to obtain the methine source 15.

Amount: 0.9 g
Yield: 22%
H-NMR(DMSO-d6), δ: 9.25(d,2H), 9.12(d,1H), 8.95(dd, 1H), 8.50(d,2H), 8.42(d,1H), 8.17(d,1H), 7.31(d,1H), 7.00 (d,1H), 6.65(d,1H)

(36) Synthesis of methine source 16

In 10 ml of acetic acid and 1 ml of acetic anhydride, 3.0 g (10 mmol) of N-(2,4-dinitrophenyl)-4-methylpyridinium chloride and 1.5 g (15 mmol) of -furaldehyde were dissolved. The solution was refluxed for 2 hours while heating Ethyl acetate and hexane were added to the reaction solution. After the supernatant was removed, the residue was extracted with 400 ml of chloroform, and dried with sodium sulfate. The residue was further concentrated under a reduced pressure. The obtained oily residue was crystallized with acetone and ethanol to obtain the methine source 16.

Amount: 0.6 g
Yield: 16%
H-NMR(DMSO-d6), δ: 9.17(d,2H), 9.13(d,1H), 8.97(dd, 1H), 8.46(d,2H), 8.41(d,1H), 8.14(d,1H), 8.04(bs,1H), 7.33 (d,1H), 7.08(d,1H), 6.78(dd,1H)
Mass(Posi): m/e=338(M−Cl)$^+$ Methine source 16

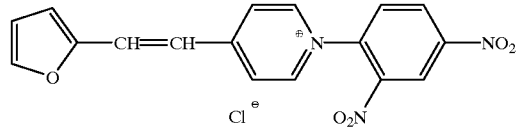

(37) Synthesis of compound IIIa-1

In 75 ml of dimethylformamide, 20.0 g (50 mmol) of monosodium salt of 1-(2,4-disulfophenyl)-3-methylcarbamoylpyrazolone and 8.9 g (25 mmol) of the methine source 11 were dispersed. To the dispersion, 28 ml (200 mmol) of triethylamine was added. The mixture was stirred at 70° C. for 30 minutes. The reaction mixture was cooled to the room temperature, and poured into 500 ml of acetone. The mixture was stirred at the room temperature for 30 minutes to precipitate triethylamine salt of the compound IIIa-1. In 200 ml of methanol, 36 g of the obtained crystals were dissolved. To the solution, 100 ml of methanol solution containing 15 g of potassium acetate was added. The mixture was stirred at the room temperature for 30 minutes to precipitate crude crystals of the compound IIIa-1. The crude crystals were dissolved in 100 ml of water. To the solution, 400 ml of methanol was added to crystallize the compound IIIa-1.

Amount: 10.7 g
Yield: 39%
Melting point: >300° C.
Absorption maximum in solution: 674 nm (water)
Molar extinction coefficient: 140,000

(38) Synthesis of compound IIIa-2

In 75 ml of dimethylformamide, 20.7 g (50 mmol) of monosodium salt of 1-(2,4-disulfophenyl)-3-ethoxycarbonylpyrazolone and 8.9 g (25 mmol) of the methine source 12 were dispersed. To the dispersion, 28 ml (200 mmol) of triethylamine was added. The mixture was stirred at 70° C. for 30 minutes. The reaction mixture was cooled to the room temperature, and poured into 500 ml of acetone. The mixture was stirred at the room temperature for 30 minutes to precipitate triethylamine salt of the compound IIIa-2. In 200 ml of methanol, 30 g of the obtained crystals were dissolved. To the solution, 100 ml of methanol solution containing 15 g of potassium acetate was added. The mixture was stirred at the room temperature for 30 minutes to precipitate crude crystals of the compound IIIa-2. The crude crystals were dissolved in 100 ml of water. To the solution, 400 ml of methanol was added to crystallize the compound IIIa-2.
- Amount: 11.8 g
- Yield: 42%
- Melting point: >300° C.
- Absorption maximum in solution: 667 nm (water)
- Molar extinction coefficient: 120,000

(39) Synthesis of compound IIIa-5

In 10 ml of dimethylformamide, 2.9 g (10 mmol) of sodium salt of 3-(4-methoxy-3-sulfophenyl)isoxazolone and 1.4 g (4 mmol) of the methine source 11 were dissolved. To the solution, 2.8 ml (20 mmol) of triethylamine was added. The mixture was stirred at 70° C. for 2 hours. The reaction mixture was cooled to the room temperature, and poured into acetone. After the supernatant was removed, the oily residue was dissolved in methanol. To the solution, 10 ml of methanol solution containing 1.0 g of potassium acetate was added to precipitate crude crystals of the compound IIIa-5. The crude crystals were filtered off, and precipitated again with water and methanol to obtain the compound IIIa-5.
- Amount: 1.3 g
- Yield: 41%
- Melting point: >300° C.
- Absorption maximum in solution: 630 nm (water)
- Molar extinction coefficient: 120,000

(40) Synthesis of compound IIIa-6

In the synthesis of the compound IIIa-5, sodium salt of 3-(4-methoxy-3-sulfophenyl)isoxazolone was replaced with sodium salt of 3-(4-methoxy-3,5-disulfophenyl) isoxazolone, and the methine source 11 was replaced with the methine source 12. The reactions were conducted in the same manner as in the synthesis of the compound IIIa-5. As a result, the compound IIIa-6 was obtained.
- Amount: 2.0 g
- Yield: 48%
- Melting point: >300° C.
- Absorption maximum in solution: 630 nm (water)
- Molar extinction coefficient: 115,000

(41) Synthesis of compound IIIa-9

In 10 ml of dimethylformamide, 3.0 g (10 mmol) of 1-(4-sulfophenyl)barbituric acid and 1.4 g (4 mmol) of the methine source 11 were dissolved. To the solution, 2.8 ml (20 mmol) of triethylamine was added. The mixture was stirred at 70° C. for 1 hour. The reaction mixture was cooled to the room temperature, and poured into acetone. After the supernatant was removed, the oily residue was dissolved in methanol. To the solution, 10 ml of methanol solution containing 1.0 g of sodium acetate was added to precipitate crude crystals of the compound IIIa-9. The crude crystals were filtered off, and precipitated again with water and methanol to obtain the compound IIIa-9.
- Amount: 2.0 g
- Yield: 67%
- Melting point: >300° C.
- Absorption maximum in solution: 612 nm (water)
- Molar extinction coefficient: 180,000

(42) Synthesis of compound IIIa-14

In 15 ml of dimethylformamide, 4.1 g (10 mmol) of potassium salt of 1-sulfopropyl-5-sulfoxyindole and 1.8 g (5 mmol) of the methine source 12 were dissolved. To the solution, 4.5 ml (30 mmol) of 1,8-diazabicycloundecene was added. The mixture was stirred at 70° C. for 10 minutes. The reaction mixture was cooled to the room temperature to precipitate crude crystals of the compound IIIa-14. The crude crystals were washed with acetone, and dissolved in 20 ml of dimethylformamide. To the solution, methanol solution containing 1.0 g of potassium acetate to obtain the compound IIIa-14.
- Amount: 0.42 g
- Yield: 12%
- Melting point: >300° C.
- Absorption maximum in solution: 681 nm (water)
- Molar extinction coefficient: 120,000

(43) Synthesis of compound IIIc-2

In 20 ml of dimethylformamide, 4.2 g (20 mmol) of 1-methyl-3-morpholinocarbonylpyrazolone and 4.2 g (10 mmol) of the methine source 15 were dissolved. To the solution, 4.2 ml (30 mmol) of triethylamine was added. The mixture was stirred at 0° C. for 6 hours, and poured into acetone. After the supernatant was removed, the oily residue was dissolved in methanol. To the solution, 10 ml of methanol solution containing 1.0 g of potassium acetate was added to precipitate crude crystals of the compound IIIc-2. The crude crystals were filtered off, and precipitated again with water and methanol to the compound IIIc-2.
- Amount: 1.1 g
- Yield: 15%
- Melting point: >300° C.
- Absorption maximum in solution: 668 nm (water)
- Molar extinction coefficient: 130,000

(44) Synthesis of compound IIIb-2

In 10 ml of dimethylformamide, 4.0 g (10 mmol) of monosodium salt of 1-(2,4-disulfophenyl)-3-methylcarbamoylpyrazolone and 2.3 g (5 mmol) of the methine source 13 were dissolved. To the solution, 4.2 ml (30 mmol) of triethylamine was added. The mixture was stirred at 0° C. for 6 hours, and poured into acetone. After the supernatant was removed, the oily residue was dissolved in methanol. To the solution, 20 ml of methanol solution containing 3.0 g of potassium acetate was added to precipitate crude crystals of the compound IIIb-2. The crude crystals were filtered off, and precipitated again with water and methanol to the compound IIIb-2.
- Amount: 1.1 g
- Yield: 15%
- Melting point: >300° C.
- Absorption maximum in solution: 659 nm (water)
- Molar extinction coefficient: 140,000

(45) Synthesis of compound IIIb-7

In 10 ml of dimethylformamide, 4.0 g (10 mmol) of monosodium salt of 1-(2,4-disulfophenyl)-3-methylcarbamoylpyrazolone and 3.0 g (5 mmol) of the methine source 14 were dissolved. To the solution, 4.2 ml (30 mmol) of triethylamine was added. The mixture was stirred at 0° C. for 6 hours. Methanol was added to the mixture to precipitate crude crystals of the compound IIIb-7. The crude crystals were dissolved in methanol and water. To the solution 20 ml of aqueous solution containing 10.0 g of potassium acetate to precipitate the compound IIIb-7.
- Amount: 2.5 g
- Yield: 35%
- Melting point: >300° C.
- Absorption maximum in solution: 658 nm (water)
- Molar extinction coefficient: 140,000

EXAMPLE 4

Silver halide photographic materials 206 to 210 were prepared and evaluated in the same manner as in Example 2, except that the dyes shown in Table 2 were used. The results are set forth in Table 2. In Table 2, the results of the sample Nos. 101 to 105 were set forth again.

TABLE 2

| Sample No. | Dye in sixth layer | Not stored paper | | Stored paper | |
|---|---|---|---|---|---|
| | | Sharpness CTF | Dmin Cyan | Stability ΔS, Cyan | Sharpness CTF |
| 101 | Comp. 1 | 15.5 | 0.09 | 0.35 | 10.5 |
| 102 | Comp. 2 | 14.0 | 0.09 | 0.20 | 12.5 |
| 103 | Comp. 3 | 12.5 | 0.09 | 0.03 | 12.0 |
| 104 | Comp. 4 | 13.0 | 0.10 | 0.03 | 12.5 |
| 105 | Comp. 4* | 14.0 | 0.14 | 0.05 | 13.5 |
| 206 | IIIa-1 | 15.5 | 0.09 | 0.03 | 15.5 |
| 207 | IIIa-2 | 16.0 | 0.09 | 0.02 | 15.5 |
| 208 | IIIa-5 | 15.5 | 0.09 | 0.03 | 15.0 |
| 209 | IIIc-1 | 15.0 | 0.09 | 0.03 | 15.0 |
| 210 | IIIb-7 | 14.5 | 0.09 | 0.02 | 14.5 |

(Remark)
Amount of Comp. 4*: 60 mg/m$^2$
(Amount of the others: 40 mg/m$^2$)
Stability: Change of photographic sensitivity It is apparent from the results shown in Table 2 that the silver halide photographic materials of the present invention can form a clear image of high sharpness and low background stain. Further, the sensitivity and the sharpness are not degraded, even if the silver halide photographic materials were stored under severe conditions.

EXAMPLE 5

(51) Synthesis of pyridine derivatives

The following pyridine derivatives A to I were synthesized.

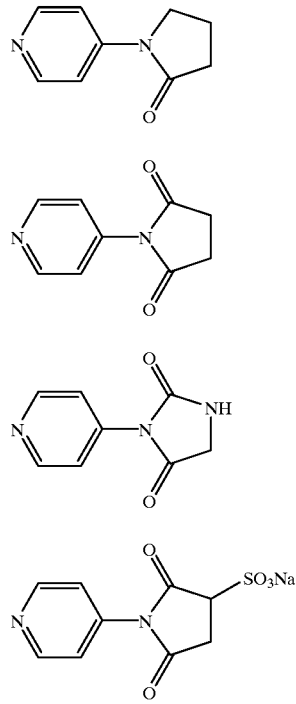

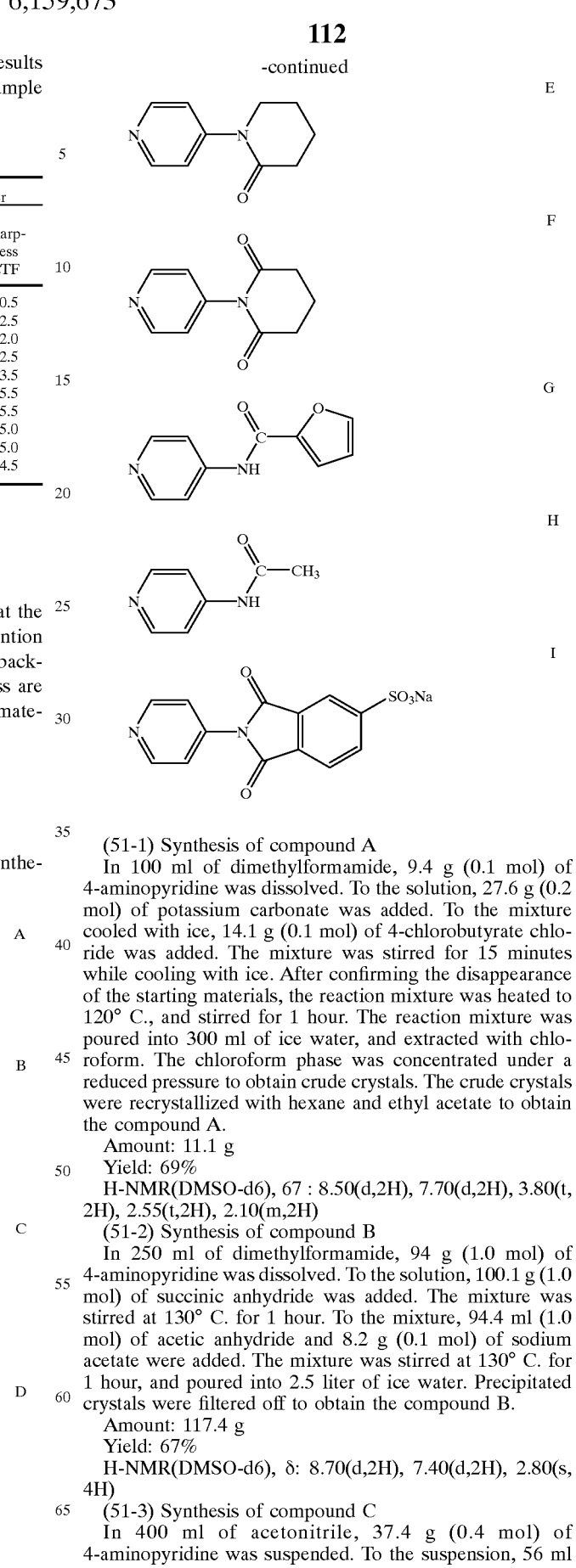

(51-1) Synthesis of compound A

In 100 ml of dimethylformamide, 9.4 g (0.1 mol) of 4-aminopyridine was dissolved. To the solution, 27.6 g (0.2 mol) of potassium carbonate was added. To the mixture cooled with ice, 14.1 g (0.1 mol) of 4-chlorobutyrate chloride was added. The mixture was stirred for 15 minutes while cooling with ice. After confirming the disappearance of the starting materials, the reaction mixture was heated to 120° C., and stirred for 1 hour. The reaction mixture was poured into 300 ml of ice water, and extracted with chloroform. The chloroform phase was concentrated under a reduced pressure to obtain crude crystals. The crude crystals were recrystallized with hexane and ethyl acetate to obtain the compound A.

Amount: 11.1 g
Yield: 69%
H-NMR(DMSO-d6), 67 : 8.50(d,2H), 7.70(d,2H), 3.80(t, 2H), 2.55(t,2H), 2.10(m,2H)

(51-2) Synthesis of compound B

In 250 ml of dimethylformamide, 94 g (1.0 mol) of 4-aminopyridine was dissolved. To the solution, 100.1 g (1.0 mol) of succinic anhydride was added. The mixture was stirred at 130° C. for 1 hour. To the mixture, 94.4 ml (1.0 mol) of acetic anhydride and 8.2 g (0.1 mol) of sodium acetate were added. The mixture was stirred at 130° C. for 1 hour, and poured into 2.5 liter of ice water. Precipitated crystals were filtered off to obtain the compound B.

Amount: 117.4 g
Yield: 67%
H-NMR(DMSO-d6), δ: 8.70(d,2H), 7.40(d,2H), 2.80(s, 4H)

(51-3) Synthesis of compound C

In 400 ml of acetonitrile, 37.4 g (0.4 mol) of 4-aminopyridine was suspended. To the suspension, 56 ml (0.4 mol) of triethylamine was added. To the mixture cooled with ice, 50.2 ml of phenyl chloroformate was stepwise (5 steps) added. The mixture was stirred at the room temperature for 5 minutes. The reaction mixture was poured into 700 ml of water. Precipitated crystals were filtered off.

To 200 ml of acetonitrile, 21.4 g (0.1 mol) of the crystals, 14.0 g (0.1 mol) of hydrochloride of ethyl ester of glycine and 14 ml (0.1 mol) of triethylamine were added. The mixture was refluxed for 2 hours while heating. After acetonitrile was removed by evaporation under a reduced pressure, the mixture was extracted with ethyl acetate. The organic phase was concentrated to obtain an oil.

The oil was heated at 150° C. for 1 hour to precipitate a solid. The oil was cooled to the room temperature. To the oil, 50 ml of acetone was added. The solid was filtered off, and washed with acetone to obtain needle-like crystals of the compound C.

Amount: 10.4 g
Yield: 59%
H-NMR(DMSO-d6), δ: 8.70(d,2H), 8.50(s,1H), 7.58(d, 2H), 4.10(s,2H)

(51-4) Synthesis of compound D

In 100 ml of dimethylformamide, 9.4 g (0.1 mol) of 4-aminopyridine was dissolved. To the solution, 24.0 g (0.12 mol) of sodium 3-sulfosuccinic anhydride was added. The mixture was stirred at 150° C. for 24 hours. After the solvent was removed by evaporation, the mixture was crystallized with methanol and acetone to obtain the compound D.

Amount: 1.0 g
Yield: 36%
H-NMR(DMSO-d6), δ: 8.70(d,2H), 7.35(d,2H), 3.90(m, 1H), 3.70–3.60(m,2H)

(51-5) Synthesis of compound E

In 100 ml of dimethylformamide, 9.4 g (0.1 mol) of 4-aminopyridine was dissolved. To the solution, 27.6 g (0.2 mol) of potassium carbonate was added. To the mixture cooled with ice, 20.0 g (0.1 mol) of 5-bromovaleryl chloride was add. The mixture was stirred for 15 minutes while cooling with ice. After confirming the disappearance of the stating materials, the reaction mixture was heated to 120° C., and stirred for 1 hour. The reaction mixture was poured into 300 ml of ice water, and extracted with chloroform. The chloroform phase was concentrated under a reduced pressure to obtain the compound E.

Amount: 11.9 g
Yield: 68%
H-NMR(DMSO-d6), δ: 8.50(d,2H), 7.40(d,2H), 3.70(t, 1H), 2.45(t,2H), 1.95–1.70(m,4H)

(51-6) Synthesis of compound F

In 100 ml of dimethylformamide, 9.4 g (0.1 mol) of 4-aminopyridine and 14.0 g (0.12 mol) of diglycolic anhydride were dissolved. The solution was heated at 120° C. for 5 hours. To the solution, 9.5 ml (0.1 mol) of acetic anhydride and 0.82 g (0.01 mol) of sodium acetate were added. The mixture was stirred at 120° C. for 1 hour. The reaction mixture was pored into 300 ml of ice water. Precipitated crystals were filtered off to obtain the compound F.

Amount: 4.6 g
Yield: 24%
H-NMR(DMSO-d6), δ: 8.70(d,2H), 7.35(d,2H), 4.55(s, 4H)

(51-7) Synthesis of compound G

In 100 ml of acetonitrile, 7.2 g (76 mmol) of 4-aminopyridine was dissolved. To the solution, 10.6 ml (76 mmol) of triethylamine was added. To the mixture cooled with ice, 10.0 g (76 mmol) of 2-furoyl chloride was added. The mixture was stirred for 2 hours while cooling with ice, and was further stirred at the room temperature for 2 hours. The reaction mixture was poured into ice water. Precipitated crystals were filtered off to obtain the compound G.

Amount: 14.0 g
Yield: 98%
H-NMR(DMSO-d6), δ: 11.15(s,1H), 8.58(d,2H), 8.08(d, 2H), 8.03(d,1H), 7.63(d,1H), 6.77(dd,1H)

(51-8) Synthesis of compound H

To 19 ml (0.2 mol) of acetic anhydride, 9.4 g (0.1 mol) of 4-aminopyridine was added. The mixture was stirred at 50° C. for 30 minutes. To the reaction mixture, 50 ml of hexane and 50 ml of ethyl acetate were added. Precipitated crystals were filtered off, and recrystallized with isopropanol to obtain the compound H.

Amount: 13.0 g
Yield: 95%
H-NMR(DMSQ-d6), δ: 10.30(s,1H), 8.40(d,2H), 7.50(d, 2H), 2.07(s,3H)

(51-9) Synthesis of compound I

In 50 ml of dimethylformamide, 4.7 g (50 mmol) of 4-aminopyridine and 12.0 g (53 mmol) of 4-sulfophthalic anhydride were dissolved. The mixture was stirred at 110° C. for 1 hour, and further stirred at 170° C. for 4 hours. The reaction mixture was cooled to the room temperature. To the reaction mixture, 200 ml of acetone was added. Precipitated crystals were filtered off to obtain the compound I.

Amount: 9.8 g
Yield: 64%
H-NMR(DMSO-d6), δ: 9.00(d,2H), 8.35-8.00(m,5H)

(52) Synthesis of pyridinium salts

Pyridinium salts were synthesized as follows.

(52-1) Synthesis of compound (V-1)

In 40 ml of toluene, 8.1 g (50 mmol) of the compound A and 8.0 g (52 mmol) of 2-chlorobenzoxazole were dissolved. The solution was refluxed for 3 hours while heating. The reaction solution was cooled to the room temperature. To the solution, 100 ml of acetone was added. Precipitated crystals were filtered off to obtain the compound V-1.

Amount: 15.5 g
Yield: 98%
H-NMR(DMSO-d6), δ: 9.60(d,2H), 8.45(d,2H), 8.03(d, 2H), 7.65(m,2H), 4.10(t,2H), 2.75(t,2H), 2.20(m,2H)
Mass(Posi): 280(M−Cl)$^+$ (52-2) Synthesis of compound (V-2)

In 40 ml of dimethylacetamide, 6.4 g (40 mmol) of the compound A and 8.5 g (50 mmol) of 2-chlorobenzothiazole were dissolved. The solution was heated at 140° C. for 2 hours. The reaction solution was cooled to the room temperature. To the solution, 100 ml of acetone was added. Precipitated crystals were filtered off to obtain the compound V-2.

Amount: 12.5 g
Yield: 94%
H-NMR(DMSO-d6), δ: 9.57(d,2H), 8.45–8.35(m,3H), 8.20(d,1H), 7.80–7.60(m,2H), 4.10(t,2H), 2.75(t,2H), 2.20 (m,2H)
Mass(Posi): 296(M−Cl)$^+$ (52-3) Synthesis of compound (V-3)

In 20 ml of dimethylsulfoxide, 0.5 g (3 mmol) of the compound A and 1.8 g (12 mmol) of 2-chloro-4,6-diaminotriazine were dissolved. The solution was heated at 145° C. for 20 minutes. The reaction solution was cooled to the room temperature. To the solution, 50 ml of acetone was added. Precipitated crystals were filtered off to obtain the compound V-3.

Amount: 0.9 g
Yield: 97%

H-NMR(DMSO-d6), δ: 9.50(d,2H), 8.40(d,2H), 7.60(bs, 4H), 4.10(t,2H), 2.75(t,2H), 2.20(m,2H)

Mass(Posi): 272(M−Cl)$^+$ (52-4) Synthesis of compound (V-4)

In 20 ml of dimethylformamide, 1.62 g (10 mmol) of the compound A and 0.92 g (5 mmol) of cyanurate chloride were dissolved. The solution was stirred at the room temperature for 1 hour. To the reaction solution, 0.5 ml of water was added. To the mixture, 50 ml of acetone was added. Precipitated crystals were filtered off to obtain the compound V-4.

Amount: 1.5 g
Yield: 66%
H-NMR(DMSO-d6), δ: 9.92(d,2H), 8.35(d,2H), 4.10(t, 2H), 2.75(t,2H), 2.20(m,2H) Mass(Posi): 418(M−Cl)$^+$ (52-5) Synthesis of compound (V-5)

To 3.1 g (20 mmol) of 2-chlorobenzoxazole, 3.5 g (20 mmol) of the compound B was added. The mixture was stirred at 100° C. for 1 hour. The reaction mixture was cooled to the room temperature. To the mixture, 100 ml of acetone was added. Precipitated crystals were filtered off to obtain the compound V-5.

Amount: 6.5 g
Yield: 99%
H-NMR(DMSO-d6), δ: 9.94(d,2H), 8.55(d,2H), 8.03(d, 2H), 7.65(m,2H), 2.95(s,4H)

Mass(Posi): 294(M−Cl)$^+$ (52-6) Synthesis of compound (V-8)

In 10 ml of toluene, 1.7 g (10 mmol) of the compound C and 1.7 g (10 mmol) of 2-chlorobenzothiazole were dissolved. The solution was refluxed for 3 hours while heating. The reaction solution was cooled to the room temperature. To the solution, 100 ml of acetone was added. Precipitated crystals were filtered off to obtain the compound V-8.

Amount: 2.7 g
Yield: 80%
H-NMR(DMSO-d6), δ: 9.45(d,2H), 9.20(bs,1H), 8.45–8.35(m,3H), 8.20(d,1H), 7.80–7.60(m,2H), 4.20(s,4H)

Mass(Posi): 311(M−Cl)$^+$ (52-7) Synthesis of compound (V-9)

In 20 ml of dimethylsulfoxide, 0.5 g (3 mmol) of the compound B and 3.6 g (12 mmol) of 2-chloro-4,6-dianilinotriazine were dissolved. The solution was heated at 145° C. for 20 minutes. The reaction solution was cooled to the room temperature. To the solution, 50 ml of acetone was added. Precipitated crystals were filtered off to obtain the compound V-9.

Amount: 1.6 g
Yield: 93%
H-NMR(DMSO-d6), δ: 9.50(d,2H), 8.40(d,2H), 7.00–6.50(m,10H), 2.95(s,4H) Mass(Posi): 437(M−Cl)$^+$ (52-8) Synthesis of compound (V-10)

In 50 ml of dimethylsulfoxide, 1.6 g (10 mmol) of the compound A and 9.0 g (30 mmol) of 2-chloro-4,6-diphenoxytriazine were dissolved. The solution was heated at 145° C. for 20 minutes. The reaction solution was cooled to the room temperature. To the solution, 100 ml of acetone was added. Precipitated crystals were filtered off to obtain the compound V-10.

Amount: 1.6 g
Yield: 93%
H-NMR(DMSO-d6), δ: 9.50(d,2H), 8.40(d,2H), 7.00–6.50(m,10H), 4.10(t,2H), 2.75(t,2H), 2.20(m,2H)

Mass(Posi): 426(M−Cl)$^+$ (52-9) Synthesis of compound (V-li) In 70 ml of dimethylsulfoxide, 1.6 g (10 mmol) of the compound A and 5.8 g (20 mmol) of 2-chloro-4,6-morpholinotriazine were dissolved. The solution was heated at 135° C. for 1.5 hour. The reaction solution was cooled to the room temperature. To the solution, 200 ml of ethyl acetate was added. Precipitated crystals were filtered off to obtain the compound V-11.

Amount: 3.8 g
Yield: 85%
H-NMR(DMSO-d6), δ: 9.85(d,2H), 8.25(d,2H), 4.10(t, 2H), 3.93(m,8H), 3.83(m,8H), 2.75(t,2H), 2.20(m,2H)

Mass(Posi): 412(M−Cl)$^+$ (52-10) Synthesis of compound (V-12)

In 10 ml of dimethylacetamide, 1.6 g (10 mmol) of the compound A and 1.7 g (15 mmol) of 2-chloropyrimidine were dissolved. The solution was heated at 160° C. for 6 hours. The reaction solution was cooled to the room temperature. To the solution, 100 ml of acetone was added. Precipitated crystals were filtered off to obtain the compound V-12.

Amount: 1.5 g
Yield: 54%
Mass(Posi): 241(M−Cl)$^+$ (52-11) Synthesis of compound (V-13) In 10 ml of dimethylacetamide, 1.6 g (10 mmol) of the compound A and 3.9 g (20 mmol) of hydrochloride of 4-bromopyridine were dissolved. To the solution, 2.8 ml (20 mmol) of triethylamine was added. The mixture was heated at 160° C. for 6 hours. The reaction solution was cooled to the room temperature. To the solution, 100 ml of acetone was added. Precipitated crystals were filtered off to obtain the compound V-13.

Amount: 1.6 g
Yield: 50%
Mass(Posi): 240(M−Br)$^+$ (52-12) Synthesis of compound (V-16)

In 40 ml of toluene, 2.1 g (12 mmol) of the compound E and 2.8 g (18 mmol) of 2-chlorobenzoxazole were dissolved. The solution was refluxed for 3 hours while heating. The reaction solution was cooled to the room temperature. To the solution, 100 ml of acetone was added. Precipitated crystals were filtered off to obtain the compound V-16.

Amount: 3.4 g
Yield: 87%
H-NMR(DMSO-d6), δ: 9.55(d,2H), 8.45(d,2H), 8.03(d, 2H), 7.65(m,2H), 4.00(t,2H), 2.75(t,2H), 2.10–1.80(m,4H)

Mass(Posi): 294(M−Cl)+

(52-13) Synthesis of compound (V-17)

In 40 ml of toluene, 3.8 g (20 mmol) of the compound F and 3.8 g (25 mmol) of 2-chlorobenzoxazole were dissolved. The solution was refluxed for 3 hours while heating. The reaction solution was cooled to the room temperature. To the solution, 100 ml of acetone was added. Precipitated crystals were filtered off to obtain the compound V-17.

Amount: 6.5 g
Yield: 94%
H-NMR(DMSO-d6), δ: 10.05(d,2H), 8.95(d,2H), 8.05(d, 2H), 7.65(m,2H), 4.60(s,4H)

Mass(Posi): 310(M−Cl)$^+$ (52-14) Synthesis of compound (V-18)

In 10 ml of toluene, 1.3 g (10 mmol) of the compound H and 2.0 g (13 mmol) of 2-chlorobenzoxazole were dissolved. The solution was refluxed for 1.5 hour while heating. The reaction solution was cooled to the room temperature. To the solution, 100 ml of acetone was added. Precipitated crystals were filtered off to obtain the compound V-18.

Amount: 2.5 g
Yield: 86%
H-NMR(DMSO-d6), δ: 12.60(s,1H), 9.55(d,2H), 8.30(d, 2H), 8.00(d,2H), 7.55(m,2H), 2.70(s,3H)

Mass(Posi): 254(M−Cl)⁺

(52-15) Synthesis of compound (V-19)

In 50 ml of dimethylacetamide, 9.4 g (0.1 mol) of 4-aminopyridine was dissolved. To the solution, 15 ml (0.1 mol) of 1,8-diazabicycloundecene and 20.0 g (0.11 mol) of o-sulfobenzoic anhydride were added. The mixture was stirred at the room temperature for 4 hours, and further stirred at 110° C. for 2 hours. The reaction mixture was cooled to the room temperature. To the solution, 200 ml of acetone was added. Precipitated crystals were filtered off to obtain the compound V-19.

Amount: 26.0 g
Yield: 66%
H-NMR(DMSO-d6), δ: 12.60(s,1H), 9.52(d,2H), 8.28(d, 2H), 7.95(dt,2H), 7.88(d,1H), 7.68–7.50(m,5H)

(52-16) Synthesis of compound (V-20)

In 10 ml of toluene and 10 ml of dimethylacetamide, 0.88 g (4.7 mmol) of the compound G and 0.8 g (5 mmol) of 2-chlorobenzoxazole were dissolved. The solution was refluxed at 120° C. for 4 hours. The reaction solution was cooled to the room temperature. To the solution, 100 ml of acetone was added. Precipitated crystals were filtered off to obtain the compound V-20.

Amount: 1.3 g
Yield: 81%
H-NMR(DMSO-d6), δ: 12.60(s,1H), 9.55(d,2H), 8.30(d, 2H), 8.15(d,1H), 8.00(d,2H), 7.70(d,1H), 7.55(m,2H), 6.85 (dd,1H)
Mass(Posi): 306(M−Cl)⁺

(52-17) Synthesis of compound (V-29)

In 10 ml of toluene, 1.6 g (10 mmol) of 4,4'-bipyridyl and 2.0 g (13 mmol) of 2-chlorobenzoxazole were dissolved. The solution was refluxed for 3 hours while heating. The reaction solution was cooled to the room temperature. To the solution, 100 ml of acetone was added. Precipitated crystals were filtered off to obtain the compound V-29.

Amount: 3.0 g
Yield: 97%
H-NMR(DMSO-d6), δ: 9.68(d,2H), 8.95(d,2H), 8.30(d, 2H), 8.15(d,2H), 8.00(d,2H), 7.55(m,2H)
Mass(Posi): 274(M−Cl)⁺

(52-18) Synthesis of compound (V-32)

In 10 ml of dimethylacetamide, 2.5 g (10 mmol) of the compound D and 2.0 g (13 mmol) of 2-chlorobenzoxazole were dissolved. The solution was stirred at 120° C. for 3 hours. The reaction solution was cooled to the room temperature. To the solution, 100 ml of acetone was added. Precipitated crystals were filtered off to obtain the compound V-32.

Amount: 2.5 g
Yield: 86%
H-NMR(DMSO-d6), δ: 9.55(d,2H), 8.35(d,2H), 8.00(d, 2H), 7.55(m,2H), 3.90(m,1H), 3.70–3.60(m,2H)

(52-19) Synthesis of compound (V-33)

In 10 ml of dimethylacetamide, 3.0 g (10 mmol) of the compound I and 1.8 g (12 mmol) of 2-chlorobenzoxazole were dissolved. To the solution, 1.5 ml (10 mmol) of 1,8-diazabicycloundecene were added. The mixture was stirred at 120° C for 2 hours. The reaction solution was cooled to the room temperature. To the solution, 100 ml of acetone was added. Precipitated crystals were filtered off to obtain the compound V-33.

Amount: 1.8 g
Yield: 43%
H-NMR(DMSO-d6), δ: 9.89(d,2H), 8.87(d,2H), 8.30–7.90(m,5H), 7.70–7.55(m,2H)

(53) Synthesis of oxonol compounds

The following oxonol compounds VI-1 to VI-16 were synthesized.

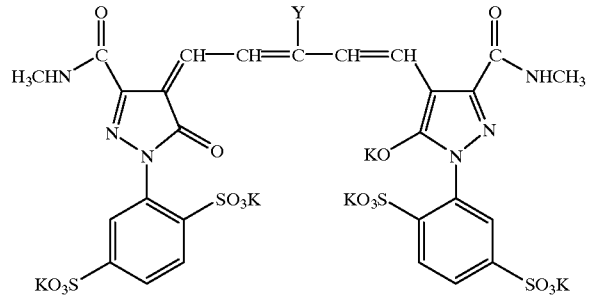

(Y)

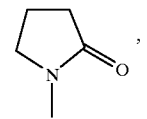

VI-1

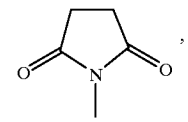

VI-2

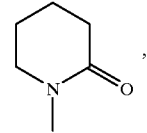

VI-3

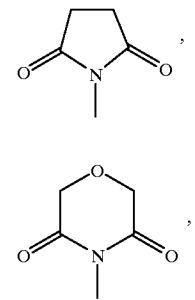

VI-4

-continued
VI-5
—NHCOCH₃,
VI-6
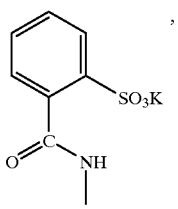
VI-7
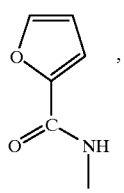
VI-8
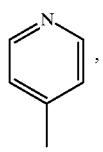
VI-9
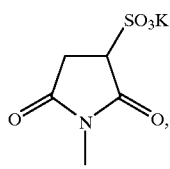
VI-10
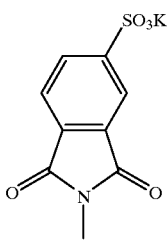
VI-11
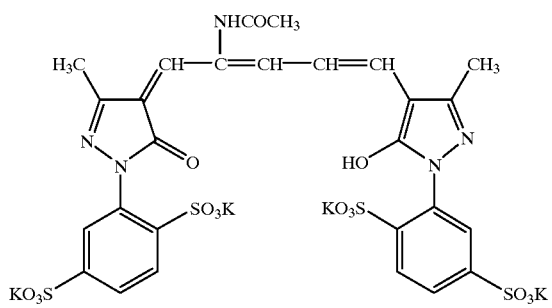
VI-12
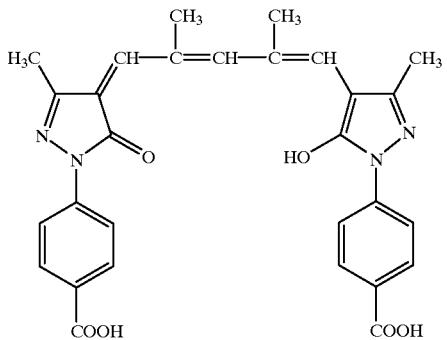
VI-13
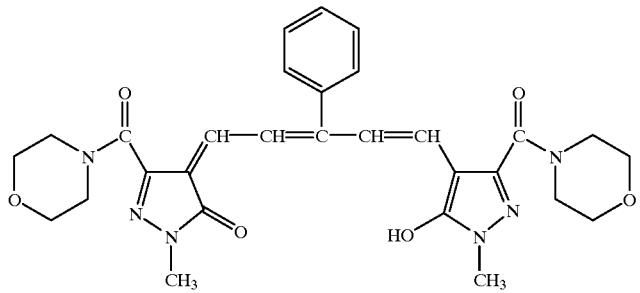

VI-14

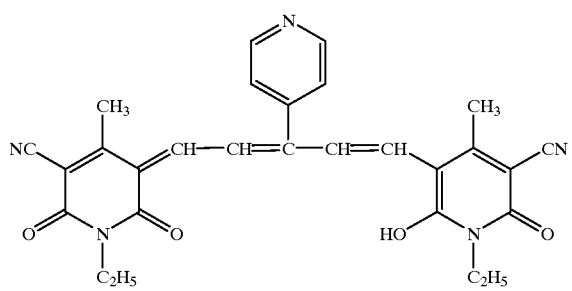

VI-15

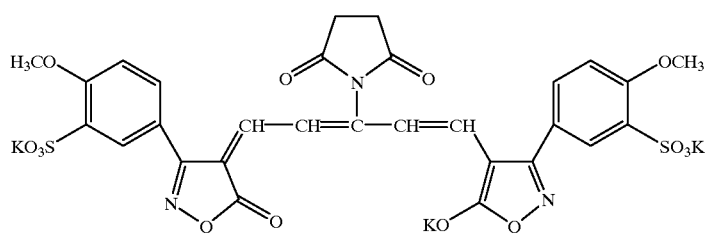

VI-16

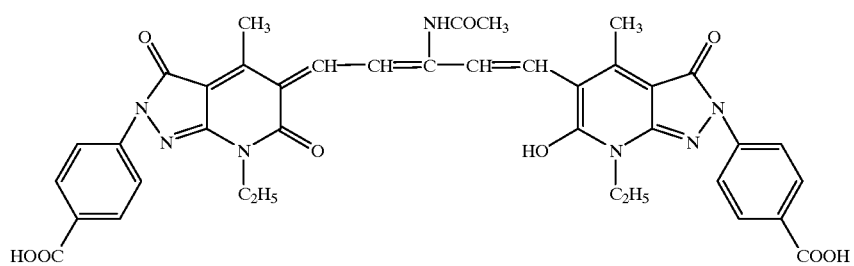

(53-1a) Synthesis of compound VI-1

In 50 ml of dimethylformamide, 12.6 g (31.6 mmol) of the compound IV-5 was dispersed. To the dispersion, 11.2 ml (80 mmol) of triethylamine was added. The mixture was stirred to make a uniform solution. To the solution, 5.0 g (15.8 mmol) of the compound V-1 was added. The mixture was stirred at the room temperature for 3 hours, and poured into 200 ml of acetone. The mixture was stirred at the room temperature for 30 minutes to precipitate triethylamine salt of the compound VI-1. The obtained crystals were dissolved in 50 ml of methanol. To the solution, 20 ml of methanol solution containing 11.6 g (0.12 mol) of potassium acetate was added. The mixture was stirred at the room temperature for 30 minutes to precipitate crude crystals of the compound VI-1. The crude crystals were dissolved in 20 ml of water. To the solution, 80 ml of methanol was added to precipitate again and obtain the compound VI-1.

Amount: 14.0 g
Yield: 81%
Melting point: >300° C.
Absorption maximum in solution: 680 nm (water)
Molar extinction coefficient: 140,000

(53-1b) Synthesis of compound VI-1

In 40 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.4 g (10 mmol) of the compound V-2 was added. The mixture was stirred at 40° C. for 1 hour, and poured into 200 ml of acetone. The mixture was stirred at the room temperature for 30 minutes to precipitate triethylamine salt of the compound VI-1. The obtained crystals were dissolved in 30 ml of methanol. To the solution, 10 ml of methanol solution containing 7.4 g (75 mmol) of potassium acetate was added. The mixture was stirred at the room temperature for 30 minutes to precipitate crude crystals of the compound VI-1. The crude crystals were dissolved in 50 ml of water. Insoluble materials were filtered out. To the solution, 80 ml of methanol was added to precipitate again and obtain the compound VI-1.

Amount: 8.1 g
Yield: 75%
Melting point: >300° C.
Absorption maximum in solution: 680 nm (water)
Molar extinction coefficient: 140,000 (53-1c) Synthesis of compound VI-1

In 80 ml of dimethylsulfoxide, 8.0 g (20 mmol) of the compound IV-5 was dispersed. To the dispersion, 5.6 ml (40 mmol) of triethylamine was added. The mixture was stirred to make a uniform solution. To the solution, 4.5 g (10 mmol) of the compound V-4 was added. The mixture was stirred at 60° C. for 1 hour, and poured into 200 ml of acetone. The mixture was stirred at the room temperature for 30 minutes to precipitate triethylamine salt of the compound VI-1. The obtained crystals were dissolved in 30 ml of methanol. To the solution, 10 ml of methanol solution containing 7.4 g (75 mmol) of potassium acetate was added. The mixture was stirred at the room temperature for 30 minutes to precipitate crude crystals of the compound VI-1. The crude crystals were dissolved in 50 ml of water. Insoluble materials were filtered out. To the solution, 80 ml of methanol was added to precipitate again and obtain the compound VI-1.

Amount: 7.3 g
Yield: 67%
Melting point: >300° C.

Absorption maximum in solution: 680 nm (water)

Molar extinction coefficient: 140,000

(53-1d) Synthesis of compound VI-1

The compound VI-1 was synthesized in the same manner as in the process of 53-1c, except that the compound V-10 was used in place of V-4. The yield was 65%.

(53-1e) Synthesis of compound VI-1

The compound VI-1 was synthesized in the same manner as in the process of 53-1a, except that the compound V-11 was used in place of V-1. The yield was 70%.

(53-1f) Synthesis of compound VI-1

The compound VI-1 was synthesized in the same manner as in the process of 53-1a, except that the compound V-12 was used in place of V-1. The yield was 72%.

(53-1g) Synthesis of compound VI-1

The compound VI-1 was synthesized in the same manner as in the process of 53-1a, except that the compound V-15 was used in place of V-1. The yield was 74%.

(53-1h) Synthesis (failed) of compound VI-1

In 80 ml of dimethylsulfoxide, 8.0 g (20 mmol) of the compound IV-5 was dispersed. To the dispersion, 5.6 ml (40 mmol) of triethylamine was added. The mixture was stirred to make a uniform solution. To the solution, 3.6 g (10 mmol) of the following compound J was added. The mixture was stirred at 60° C. for 1 hour. However, the reaction solution was not colored, which means that a dye forming reaction did not proceed.

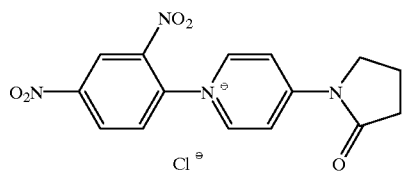

J

As is evident from the results shown above, the process of the invention can synthesize an oxonol compound of high yield from a pyridinium salt, even if the oxonol compound could not be synthesized from the pyridinium salt according to a conventional process.

(53-2a) Synthesis of compound VI-2

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.3 g (10 mmol) of the compound V-5 was added. The mixture was stirred at the room temperature for 1 hour, and poured into 200 ml of acetone. The mixture was stirred at the room temperature for 30 minutes to precipitate triethylamine salt of the compound VI-2. The obtained crystals were dissolved in 50 ml of methanol. To the solution, 20 ml of methanol solution containing 7.4 g (75 mmol) of potassium acetate was added. The mixture was stirred at the room temperature for 30 minutes to precipitate crude crystals of the compound VI-2. The crude crystals were dissolved in 50 ml of water. To the solution, 80 ml of methanol was added to precipitate again and obtain the compound VI-2.

Amount: 8.1 g

Yield: 73%

Melting point: >300° C.

Absorption maximum in solution: 689 nm (water)

Molar extinction coefficient: 140,000

(53-2b) Synthesis (comparison) of compound VI-2

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.8 g (10 mmol) of the following compound K was added. The mixture was stirred at the room temperature for 2 hours, and further stirred at 75° C. for 45 minutes. The reaction solution was poured into 200 ml of acetone. The mixture was stirred at the room temperature for 30 minutes to precipitate triethylamine salt of the compound VI-2. The obtained crystals were dissolved in 50 ml of methanol. To the solution, 10 ml of methanol solution containing 7.4 g of potassium acetate. The mixture was stirred at the room temperature for 30 minutes to precipitate crude crystals of the compound VI-2. The crude crystals were dissolved in 50 ml of water. To the solution, 80 ml of methanol was added to precipitate again and obtain the compound III-2.

Amount: 2.4 g

Yield: 22%

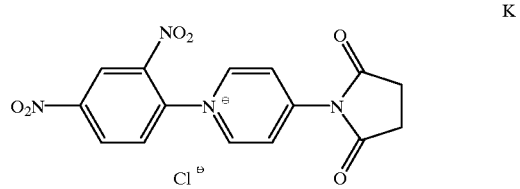

K

As is evident from the results shown above, the process of the invention can synthesize an oxonol compound of high yield because the dye forming reaction can proceed under moderate conditions. On the other hand, the conventional process synthesizes the oxonol compound of low yield because the efficiency of the dye forming reaction is low and because the reaction requires a high temperature, which causes a decomposition of the formed compound.

(53-3a) Synthesis of compound VI-3

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.3 g (10 mmol) of the compound V-16 was added. The mixture was stirred at the room temperature for 3 hours. The mixture was further treated in the same manner as in the process of 53-2a to obtain the compound VI-3.

Amount: 8.8 g

Yield: 80%

Melting point: >300° C.

Absorption maximum in solution: 681 nm (water)

Molar extinction coefficient: 140,000

(53-3b) Synthesis (failed) of compound VI-3

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.8 g (10 mmol) of the following compound L was added. The mixture was stirred at the room temperature for 2 hours. However, the reaction mixture was scarcely colored, which means that a dye forming reaction scarcely proceeded. Thus, the compound VI-3 was not isolated.

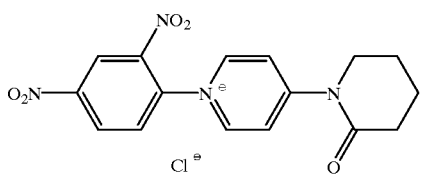

(53-4) Synthesis of compound VI-4

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.5 g (10 mmol) of the compound V-17 was added. The mixture was stirred at the room temperature for 2 hours. The mixture was further treated in the same manner as in the process of 53-2a to obtain the compound VI-4.
Amount: 8.4 g
Yield: 75%
Melting point: >300° C.
Absorption maximum in solution: 689 nm (water)
Molar extinction coefficient: 135,000

(53-5) Synthesis of compound VI-5

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 2.9 g (10 mmol) of the compound V-18 was added. The mixture was stirred at the room temperature for 2 hours. The mixture was further treated in the same manner as in the process of 53-2a to obtain the compound VI-5.
Amount: 7.5 g
Yield: 71%
Melting point: >300° C.
Absorption maximum in solution: 670 nm (water)
Molar extinction coefficient: 135,000

(53-6) Synthesis of compound VI-6

In 80 ml of dimethylformamide, 8.0 g (20 mmol) of the compound IV-5 was dispersed. To the dispersion, 7.0 ml (50 mmol) of triethylamine was added. The mixture was stirred to make a uniform solution. To the solution, 4.0 g (10 mmol) of the compound V-19 was added. The mixture was stirred at the room temperature for 2 hours. The mixture was further treated in the same manner as in the process of 53-2a to obtain the compound VI-6.
Amount: 8.7 g
Yield: 70%
Melting point: >300° C.
Absorption maximum in solution: 669 nm (water)
Molar extinction coefficient: 135,000

(53-7) Synthesis of compound VI-7

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.4 g (10 mmol) of the compound V-20 was added. The mixture was stirred at 40° C. for 3 hours. The mixture was further treated in the same manner as in the process of 53-2a to obtain the compound VI-7.
Amount: 8.5 g
Yield: 76%
Melting point: >300° C.
Absorption maximum in solution: 673 nm (water)
Molar extinction coefficient: 135,000

(53-8) Synthesis of compound VI-8

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 3.2 g (10 mmol) of the compound V-28 was added. The mixture was stirred at the room temperature for 4 hours. The mixture was further treated in the same manner as in the process of 53-2a to obtain the compound VI-8.
Amount: 8.6 g
Yield: 80%
Melting point: >300° C.
Absorption maximum in solution: 667 nm (water)
Molar extinction coefficient: 145,000

(53-9) Synthesis of compound VI-9

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 4.3 g (10 mmol) of the compound V-32 was added. The mixture was stirred at the room temperature for 4 hours. The mixture was further treated in the same manner as in the process of 53-2a to obtain the compound VI-9.
Amount: 8.2 g
Yield: 80%
Melting point: >300° C.
Absorption maximum in solution: 689 nm (water)
Molar extinction coefficient: 125,000

(53-10) Synthesis of compound VI-10

In 80 ml of dimethylformamide, 8.0 g (20 mmol) of the compound IV-5 was dispersed. To the dispersion, 5.6 ml (40 mmol) of triethylamine was added. The mixture was stirred to make a uniform solution. To the solution, 4.2 g (10 mmol) of the compound V-33 was added. The mixture was stirred at the room temperature for 3 hours. The mixture was further treated in the same manner as in the process of 53-2a to obtain the compound VI-10.
Amount: 9.4 g
Yield: 74%
Melting point: >300° C.
Absorption maximum in solution: 692 nm (water)
Molar extinction coefficient: 125,000

(53-11) Synthesis of compound VI-11

In 80 ml of dimethylacetamide, 7.1 g (20 mmol) of the compound IV-1 was dispersed. To the dispersion, 5.6 ml (40 mmol) of triethylamine was added. The mixture was stirred to make a uniform solution. To the solution, 3.5 g (10 mmol) of the compound V-22 was added. The mixture was stirred at 40° C. for 1 hour. The mixture was further treated in the same manner as in the process of 53-2a to obtain the compound VI-11.
Amount: 7.3 g
Yield: 78%
Melting point: >300° C.
Absorption maximum in solution: 660 nm (water)
Molar extinction coefficient: 125,000

(53-12) Synthesis of compound VI-12

In 80 ml of dimethylacetamide, 4.4 g (20 mmol) of the compound IV-20 was dispersed. To the dispersion,, 5.6 ml (40 mmol) of triethylamine was added. The mixture was stirred to make a uniform solution. To the solution, 3.2 g (10 mmol) of the compound V-21 was added. The mixture was stirred at 50° C. for 2 hours. The reaction mixture was poured into 200 ml of ice water. A small amount of acetic acid was added to the mixture. Precipitated crystals were filtered off to obtain the compound VI-12.
Amount: 3.6 g
Yield: 69%
Melting point: >300° C.
Absorption maximum in solution: 665 nm (DMF)

Molar extinction coefficient: 135,000

(53-13) Synthesis of compound VI-13

In 50 ml of methanol, 4.2 g (20 mmol) of the compound IV-31 was dissolved. To the solution, 5.6 ml (40 mmol) of triethylamine was added. To the mixture, 3.1 g (10 mmol) of the compound V-25 was added. The mixture was stirred at the room temperature for 2 hours. The reaction mixture was poured into 200 ml of ice water. Precipitated crystals were filtered off to obtain the compound VI-13.

Amount: 3.6 g

Yield: 65%

Melting point: >300° C.

Absorption maximum in solution: 681 nm (DMF)

Molar extinction coefficient: 135,000

(53-14) Synthesis of compound VI-14 In 50 ml of ethanol, 3.6 g (20 mmol) of the compound IV-32 was dissolved. To the solution, 5.6 ml (4° C. mmol) of triethylamine was added. To the mixture, 3.3 g (10 mmol) of the compound V-28 was added. The mixture was stirred at 40° C. for 1 hour. The reaction mixture was poured into 200 ml of ice water. Precipitated crystals were filtered off to obtain the compound VI-14.

Amount: 3.8 g

Yield: 77%

Melting point: >300° C.

Absorption maximum in solution: 729 nm (DMF)

Molar extinction coefficient: 135,000

(53-15) Synthesis of compound VI-15

In 40 ml of dimethylsulfoxide, 5.4 g (20 mmol) of the compound IV-34 was dispersed. To the dispersion, 5.6 ml (40 mmol) of triethylamine was added. The mixture was stirred to make a uniform solution. To the solution, 4.7 g (10 mmol) of the compound V-9 was added. The mixture was stirred at 50° C. for 2 hours. The mixture was further treated in the same manner as in the process of 53-1c to obtain the compound VI-15.

Amount: 4.9 g

Yield: 60%

Melting point: >300° C.

Absorption maximum in solution: 640 nm (DMF)

Molar extinction coefficient: 140,000

(53-16) Synthesis of compound VI-16 In 50 ml of ethanol, 5.7 g (20 mmol) of the compound IV-36 was dissolved. To the solution, 5.6 ml (40 mmol) of triethylamine was added. To the mixture, 2.9 g (10 mmol) of the compound V-18 was added. The mixture was stirred at 40° C. for 3 hours. The reaction mixture was poured into 200 ml of ice water. Precipitated crystals were filtered off to obtain the compound VI-16.

Amount: 5.4 g

Yield: 78%

Melting point: >300° C.

Absorption maximum in solution: 775 nm (DMF)

Molar extinction coefficient: 130,000

EXAMPLE 6

(61) Synthesis of pyridine derivatives

The following pyridine derivatives J and K were synthesized.

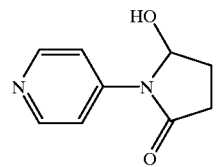

J

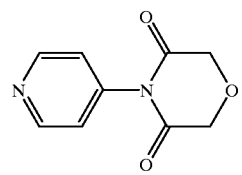

K (61-1) Synthesis of compound J

The compound B (17.6 g, 0.1 mol) synthesized in Example 5 was dissolved in a mixture of 100 ml of ethanol and 20 ml of water. To the solution, $NaBH_4$ (0.1 mol) was added. The mixture was reacted in the room temperature for 18 hours. The reaction mixture was condensed, and purified in a silica gel column chromatography to obtain the compound J.

Amount: 3.8 g

Yield: 20%

Mass(Posi): 179(M+H)

(61-2) Synthesis of compound K

In dimethylformamide (50 ml), 4-aminopyridine (9.4 g, 0.1 mol) and diglycolic anhydride (14 g, 0.12 mol) were dissolved. The solution was stirred at 120° C. for 8 hours. The solution was poured into ice water. The obtained crystals were filtered off to obtain the compound K.

Amount: 4.3 g

Yield: 22%

Mass(Posi): 193(M+H)

(62) Synthesis of methine sources

The methine sources were synthesized according to the following reaction formula.

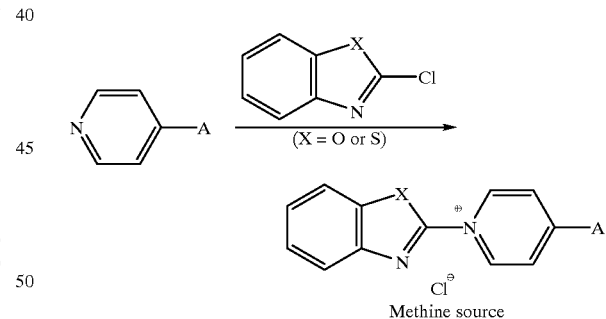

Methine source (62-1) Synthesis of methine source A-1

The methine source A-1 was synthesized in the same manner as in the synthesis of the compound V-1 in Example

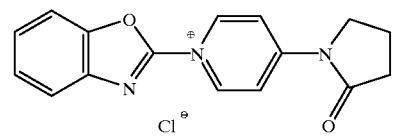

(A-1)

(62-2) Synthesis of methine source A-2

The methine source A-2 was synthesized in the same manner as in the synthesis of the compound V-2 in Example

5.

(A-2)
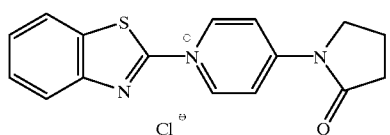

(J-1)
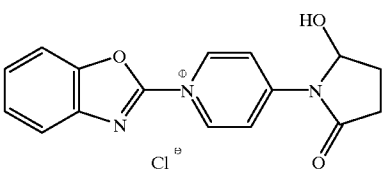

(62-3 to 62-11) Synthesis of methine sources B-1 to F-1, I-1, J-1, K-1 and d-1

The methine source B-1 to F-1, I-1, J-1, K-1 and d-1 were synthesized in the same manner as in the synthesis of the methine source A-2, except that the pyridine derivatives A to F and I synthesized in Example 5, the above-synthesized pyridine derivatives J and K, and the compound d synthesized in Example I were used respectively.

(K-1)
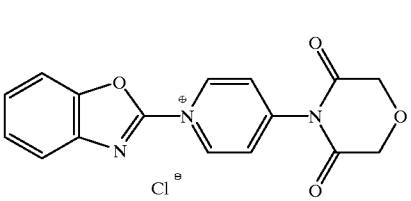

(d-1)
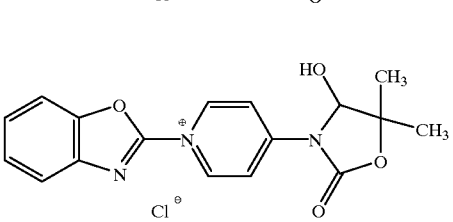

(B-1)
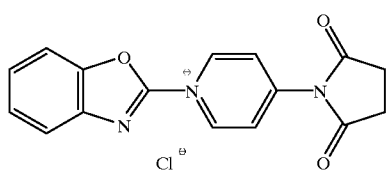

(63) Synthesis of oxonol compounds

The oxonol compounds were synthesized according to the following reaction formula.

(C-1)
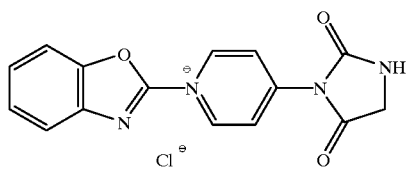

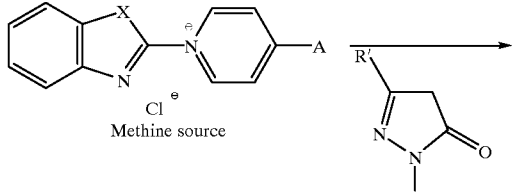

(D-1)
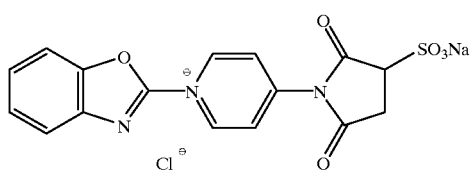

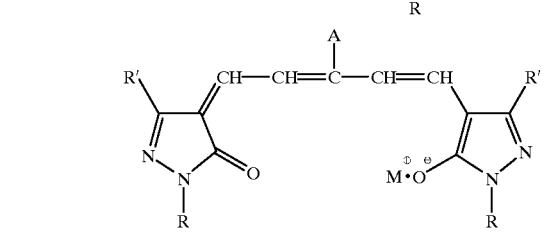

(E-1)
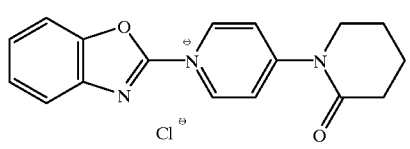

(63-1) Synthesis of oxonol compound Ib-1

The oxonol compound Ib-1 was synthesized in the same manner as in the synthesis of the compound VI-1 (method 53-1a) in Example 5 by using the methine source A-1 and the following pyrazolone compound P-1.

(F-1)
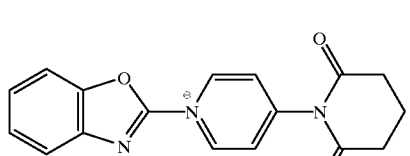

(P-1)
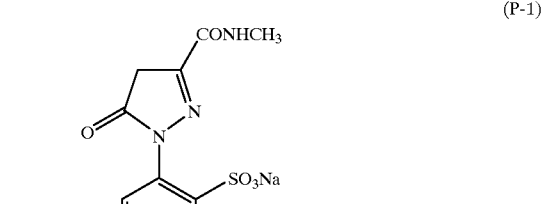

(I-1)
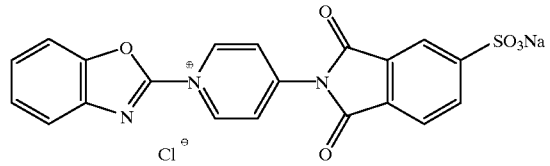

(63-2) Synthesis of oxonol compound Ib-1

The oxonol compound Ib-1 was synthesized in the same manner as in the synthesis of the compound VI-1 (method 53-1b) in Example 5 by using the methine source A-2 and the pyrazolone compound P-1.

(63-3) Synthesis of oxonol compound Ib-2

The oxonol compound Ib-2 was synthesized in the same manner as in the process of 63-1, except that the following pyrazolone compound P-2 was used in place of P-1. The yield was 82%.

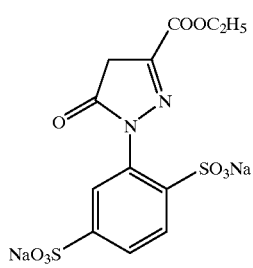

(P-2)

(63-4) Synthesis of oxonol compound Ib-3

The oxonol compound Ib-3 was synthesized in the same manner as in the process of 63-1, except that the following pyrazolone compound P-3 was used in place of P-1. The yield was 85%.

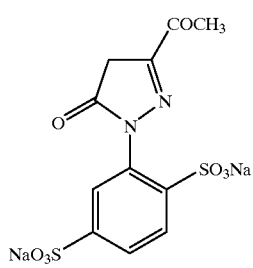

(P-3)

(63-5) Synthesis of oxonol compound Ib-4

The oxonol compound Ib-4 was synthesized in the same manner as in the process of 63-1, except that the following pyrazolone compound P-4 was used in place of P-1. The yield was 85%.

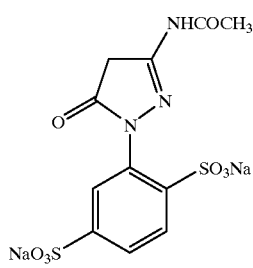

(P-4)

(63-6) Synthesis of oxonol compound Ib-5

The oxonol compound Ib-5 was synthesized in the same manner as in the process of 63-1, except that the following pyrazolone compound P-5 was used in place of P-1. The yield was 80%.

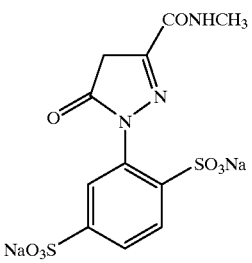

(P-5)

(63-7) Synthesis of oxonol compound Ib-6

The oxonol compound Ib-6 was synthesized in the same manner as in the process of 63-1, except that the following pyrazolone compound P-6 was used in place of P-1. The yield was 71%.

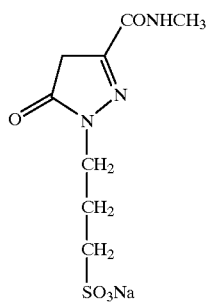

(P-6)

(63-8) Synthesis of oxonol compound Ib-7 The oxonol compound Ib-7 was synthesized in the same manner as in the process of 63-1, except that the methine source E-1 was used in place of A-1. The yield was 88%.

(63-9) Synthesis of oxonol compound Ib-9

The oxonol compound Ib-9 was synthesized in the same manner as in the process of 63-1, except that the methine source J-1 was used in place of A-1. The yield was 56%.

(63-10) Synthesis of oxonol compound Ia-21

The oxonol compound Ia-21 was synthesized in the same manner as in the process of 63-1, except that the methine source B-1 was used in place of A-1. The yield was 91%.

(63-11) Synthesis of oxonol compound Ia-1

The oxonol compound Ia-1 was synthesized in the same manner as in the process of 63-1, except that the methine source C-1 was used in place of A-1. The yield was 86%.

(63-12) Synthesis of oxonol compound Ia-23

The oxonol compound Ia-23 was synthesized in the same manner as in the process of 63-1, except that the methine source d-1 was used in place of A-1, and the following pyrazolone compound P-7 was used in place of P-1. The yield was 72%.

(P-7)

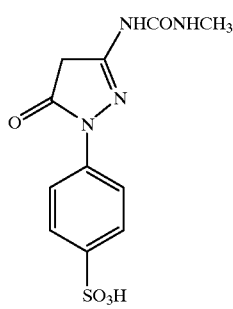

(63-13) Synthesis of oxonol compound Ia-25

The oxonol compound Ia-25 was synthesized in the same manner as in the process of 63-1, except that the methine source I-1 was used in place of A-1. The yield was 76%.
(63-14) Synthesis of oxonol compound Ia-26 The oxonol compound Ia-26 was synthesized in the same manner as in the process of 63-1, except that the methine source F-1 was used in place of A-1. The yield was 80%. (63-15) Synthesis of oxonol compound Ia-28 The oxonol compound Ia-28 was synthesized in the same manner as in the process of 63-1, except that the methine source K-1 was used in place of A-1, and the pyrazolone compound P-2 was used in place of P-1. The yield was 80%.

(63-14) Synthesis of oxonol compound Ia-30

The oxonol compound Ia-30 was synthesized in the same manner as in the process of 63-1, except that the methine source D-1 was used in place of A-1. The yield was 78%.

The optical and physical characteristics of the oxonol compounds are set forth in Table 3.

TABLE 3

| Oxonol compound | Maximum absorption wavelength (in $H_2O$) | Molar absorption coefficient | Melting point |
| --- | --- | --- | --- |
| Ib-1 | 680 nm | 140,000 | >300° C. |
| Ib-2 | 685 nm | 140,000 | >300° C. |
| Ib-3 | 683 nm | 140,000 | >300° C. |
| Ib-4 | 676 nm | 138,000 | >300° C. |
| Ib-5 | 678 nm | 135,000 | >300° C. |
| Ib-6 | 678 nm | 135,000 | >300° C. |
| Ib-7 | 681 nm | 140,000 | >300° C. |
| Ib-8 | 681 nm | 126,000 | >300° C. |
| Ib-9 | 686 nm | 115,000 | >300° C. |
| Ib-10 | 675 nm | 123,000 | 186–188° C. |
| Ib-11 | 680 nm | 140,000 | 195–200° C. |
| Ib-12 | 683 nm | 110,000 | 202–205° C. |
| Ia-21 | 691 nm | 142,000 | >300° C. |
| Ia-22 | 690 nm | 140,000 | >300° C. |
| Ia-1 | 692 nm | 141,000 | >300° C. |
| Ia-23 | 692 nm | 124,000 | >300° C. |
| Ia-24 | 692 nm | 115,000 | 246–250° C. |
| Ia-17 | 695 nm | 138,000 | >300° C. |
| Ia-25 | 695 nm | 140,000 | >300° C. |
| Ia-26 | 691 nm | 140,000 | >300° C. |
| Ia-27 | 691 nm | 121,000 | 175–178° C. |
| Ia-28 | 696 nm | 137,000 | >300° C. |
| Ia-29 | 695 nm | 121,000 | >300° C. |
| Ia-30 | 690 nm | 139,000 | >300° C. |
| Ia-31 | 675 nm | 121,000 | >300° C. |

What is claimed is:

1. An oxonol compound represented by the following formula (I):

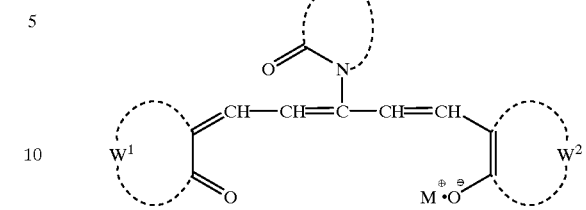

in which Z is an atomic group that forms a cyclic amide ring; each of $W^1$ and $W^2$ independently is an atomic group that forms an acidic nucleus ring; and M is a cation.

2. The oxonol compound as claimed in claim 1, wherein each of $W^1$ and $W^2$ independently is an atomic group that forms a pyrazolone ring.

3. The oxonol compound as claimed in claim 1, wherein Z is an atomic group that forms a five or six-membered heterocyclic ring.

4. The oxonol compound as claimed in claim 1, wherein the oxonol compound is represented by the following formula (Ia):

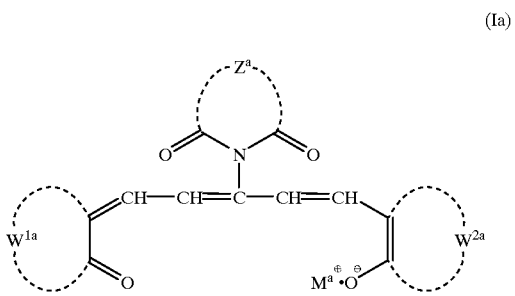

in which each of $Z^a$, $W^{1a}$ and $W^{2a}$ independently is an atomic group that forms a heterocyclic ring; and $M^a$ is a cation.

5. The oxonol compound as claimed in claim 1, wherein the oxonol compound is represented by the following formula (Ib):

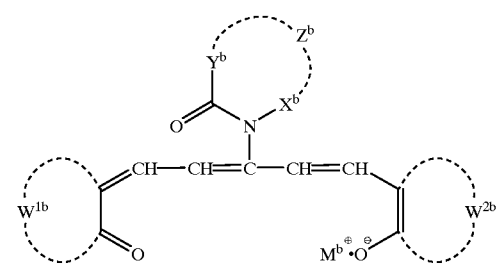

in which $X^b$ is —$CHR^{1b}$—, —$CR^{2b}$=, —$NR^{3b}$— or —N=, wherein $R^{1b}$ is hydrogen, hydroxyl or carboxyl, $R^{2b}$ is hydrogen or is combined with $R^{8b}$ to form a benzene ring condensed with the cyclic amide ring, and $R^{3b}$ is hydrogen or an alkyl group having 1 to 20 carbon atoms; $Y^b$ is —$CR^{4b}R^{5b}$—, —$CR^{6b}$= or —$NR^{7b}$—, wherein each of $R^{4b}$, $R^{5b}$ and $R^{7b}$ independently is hydrogen or an alkyl group having 1 to 20 carbon atoms, and $R^{6b}$ is hydrogen or is combined with $R^{9b}$ to form a benzene ring condensed with the cyclic amide ring; $Z^b$ is —$CH_2$—, —$CR^{8b}$—, —N=, =$CR^{9b}$—, —$CH_2$—$CH_2$—, —NH—$CH_2$—, —O—$CH_2$—, =CH—CH=, or —CO—$CH_2$—, wherein the right side is attached to $X^b$, the left side is attached to $Y^b$, $R^{8b}$ is hydrogen or is combined with $R^{2b}$ to form a benzene ring condensed with the cyclic amide ring, and $R^{9b}$ is hydrogen or is combined with $R^{6b}$ to form a benzene ring condensed with the cyclic amide ring; each of $W^{1b}$ and $W^{2b}$ independently is an atomic group that forms an acidic nucleus ring; and $M^b$ is a cation.

6. An oxonol compound represented by the following formula (IIa), (IIIa), (IIb), (IIIb), (IIc) or (IIIc):

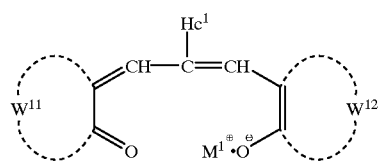

(IIa)

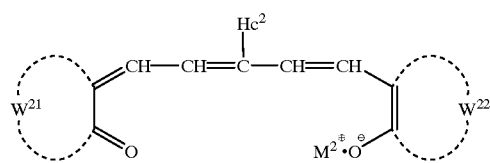

(IIIa)

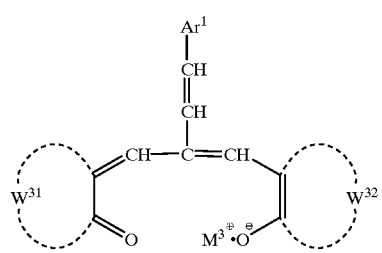

(IIb)

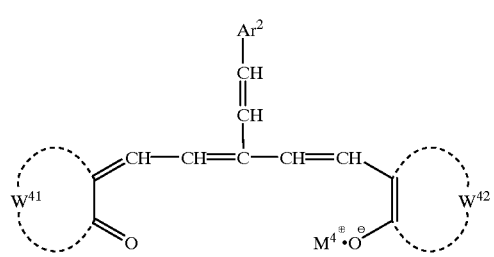

(IIIb)

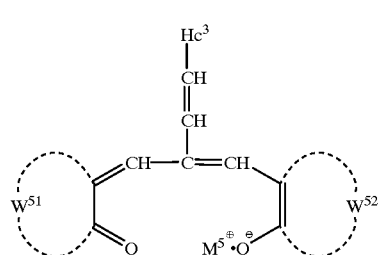

(IIc)

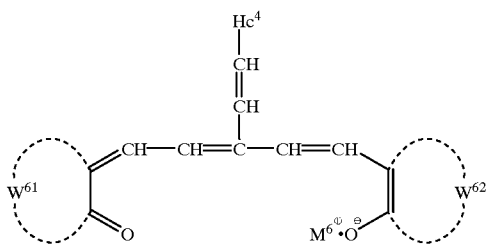

(IIIc)

in which each of $W^{11}$, $W^{12}$, $W^{21}$, $W^{22}$, $W^{31}$, $W^{32}$, $W^{41}$, $W^{42}$, $W^{51}$, $W^{52}$, $W^{61}$ and $W^{62}$ independently is an atomic group that forms an acidic nucleus ring; each of $M^1$, $M^2$, $M^3$, $M^4$, $M^5$ and $M^6$ independently is a cation: each of $Hc^1$, $Hc^2$, $Hc^3$ and $Hc^4$ independently is an unsaturated heterocyclic group; and each of $Ar^1$ and $Ar^2$ independently is an aromatic group.

7. The oxonol compound as claimed in claim 6, wherein the oxonol compound is represented by the following formula (IIA), (IIIA), (IIB), (IIIB), (IIC) or (IIIC):

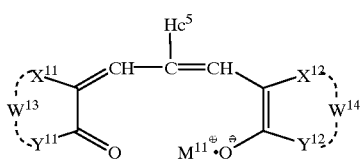

(IIA)

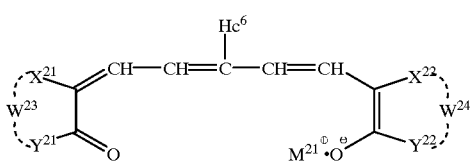

(IIIA)

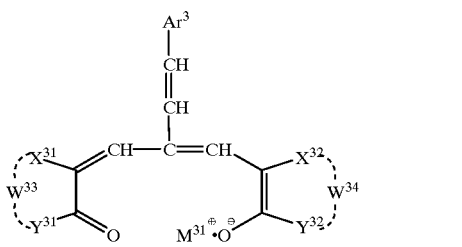

(IIB)

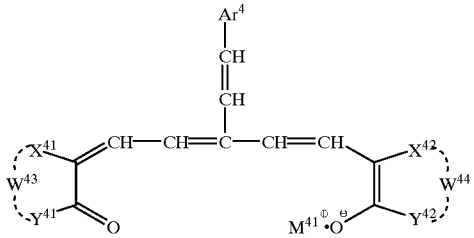

(IIIB)

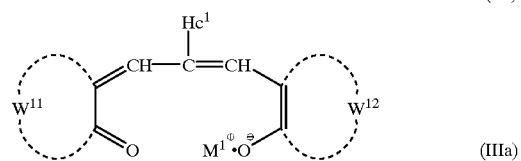
(IIa)

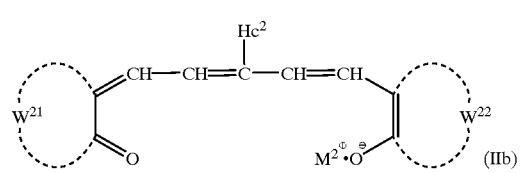
(IIIa)

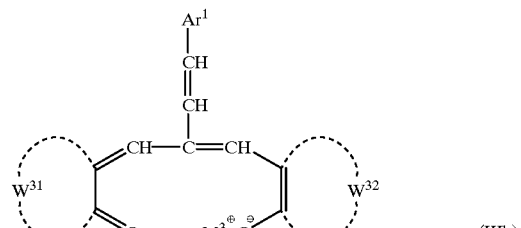
(IIb)

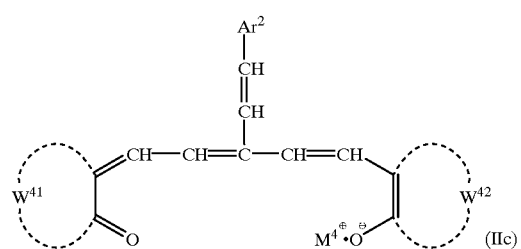
(IIIb)

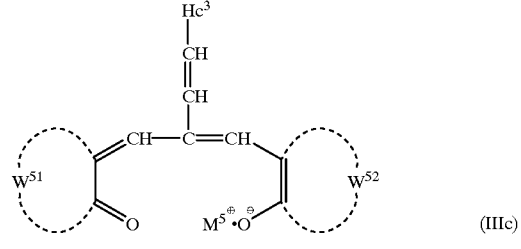
(IIc)

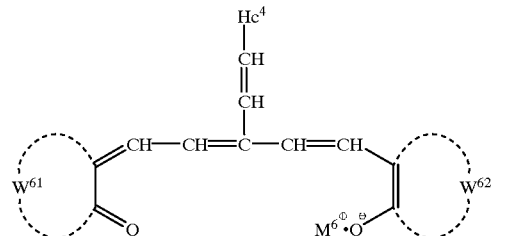
(IIIc)

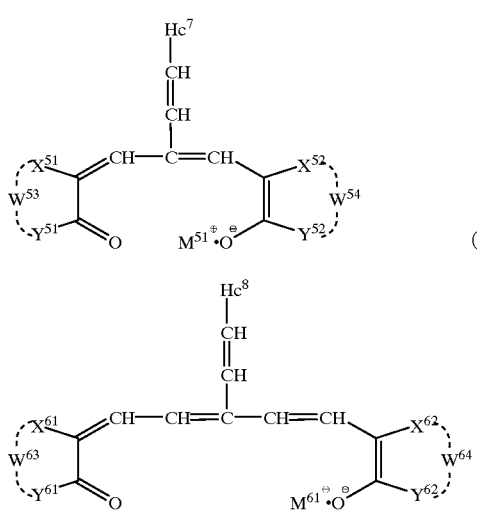
(IIC)

(IIIC)

in which each of $X^{11}$, $X^{12}$, $X^{21}$, $X^{22}$, $X^{31}$, $X^{32}$, $X^{41}$, $X^{42}$, $X^{51}$, $X^{52}$, $X^{61}$ and $X^{62}$ independently is —$CR^{11}$l=, —CO— or —$NR^{12}$—; each of $Y^{11}$, $Y^{12}$, $Y^{21}$, $Y^{22}$, $Y^{31}$, $Y^{32}$, $Y^{41}$, $Y^{42}$, $Y^{51}$, $Y^{52}$, $Y^{61}$ and $Y^{62}$ independently is —$NR^{13}$—, —N= or —O—; each of $R^{11}$, $R^{12}$ and $R^{13}$ independently is an alkyl group having 1 to 6 carbon atoms, an aralkyl group having 7 to 10 carbon atoms, an alkoxy group having 1 to 6 carbon atoms, an aryl group having 6 to 15 carbon atoms, an alkoxycarbonyl group having 2 to 6 carbon atoms, an acyl group having 2 to 6 carbon atoms, a carbamoyl group having 1 to 8 carbon atoms, a sulfamoyl group having 1 to 8 carbon atoms, a substituted amino group having 1 to 10 carbon atoms, carboxyl or a salt thereof; each of $W^{13}$, $W^{14}$, $W^{23}$, $W^{24}$, $W^{33}$, $W^{34}$, $W^{43}$, $W^{44}$, $W^{53}$, $W^{54}$, $W^{63}$ and $W^{64}$ independently is an atomic group that forms an acidic nucleus ring; each of $M^{1}1$, $M^{21}$, $M^{31}$, $M^{41}$, $M^{51}$ and $M^{61}$ independently is a cation: each of $Hc^{5}$, $Hc^{6}$, $Hc^{7}$ and $Hc^{8}$ independently is an unsaturated heterocyclic group; and each of $Ar^{3}$ and $Ar^{4}$ independently is an aromatic group.

8. A light-sensitive material comprising a support, a light-sensitive layer and a non-light-sensitive layer, wherein the light-sensitive layer or the non-light-sensitive layer contains an oxonol dye represented by the following formula (I), (IIa), (IIIa), (IIb), (IIIb), (IIc) or (IIIc):

(I)

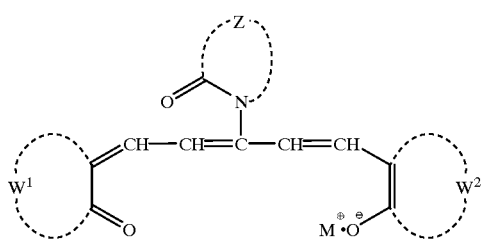

in which Z is an atomic group that forms a cyclic amide ring; each of $W^1$ and $W^2$ independently is an atomic group that forms an acidic nucleus ring; and M is a cation:

in which each of $W^{11}$, $W^{12}$t $W^{21}$, $W^{22}$, $W^{31}$, $W^{32}$, $W^{41}$, $W^{42}$, $W^{51}$, $W^{52}$, $W^{61}$ and $W^{62}$ independently is an atomic group that forms an acidic nucleus ring; each of $M^{1}$, $M^{2}$, $M^{3}$, $M^{4}$, $M^{5}$ and $M^{6}$ independently is a cation: each of $Hc^{1}$, $Hc^{2}$, $Hc^{3}$ and $Hc^{4}$ independently is an unsaturated heterocyclic group; and each of $Ar^{1}$ and $Ar^{2}$ independently is an aromatic group.

9. The light-sensitive material as claimed in claim 8, wherein the non-light-sensitive layer contains the oxonol dye.

10. The light-sensitive material as claimed in claim 8, wherein the light-sensitive layer or the non-light-sensitive layer contains the oxonol dye in an amount of 0.5 to 1,000 mg per 1 $m^2$ of the light-sensitive material.

11. The light-sensitive material as claimed in claim 8, wherein the light-sensitive layer is a silver halide emulsion layer.

12. A process for the synthesis of an oxonol compound, wherein an oxonol compound represented by the following formula (VI) is synthesized by a reaction of an α-ketomethylene compound represented by the following formula (IV) with a pyridinium compound represented by the following formula (V):

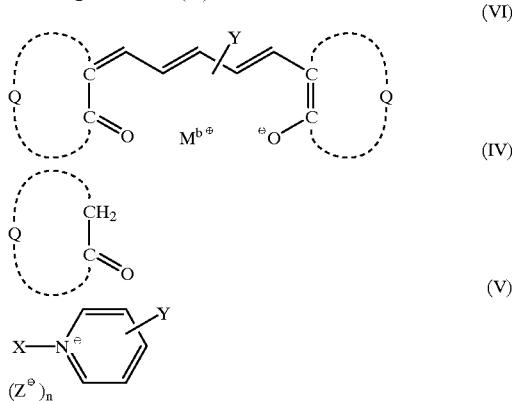

in which Q is an atomic group that forms a carbon ring or a heterocyclic ring; X is a heterocyclic group; Y is a substituent group for the methine chain in the formula (VI) or the pyridinium ring in the formula (V); Z is an anion; n is an integer required for neutralizing the molecule in the formula (V); and $M^b$ is a cation.

13. The process for the synthesis of an oxonol compound as claimed in claim 12, wherein the pyridinium compound is represented by the following formula (Va):

in which X is a heterocyclic group; Y is a substituent group for the pyridinium ring; Z is an anion; and n is an integer required for neutralizing the molecule.

14. The process for the synthesis of an oxonol compound as claimed in claim 12, wherein Y is a heterocyclic group.

15. The process for the synthesis of an oxonol compound as claimed in claim 14, wherein Y is a heterocyclic group represented by the following formula (Ya):

in which A is an atomic group that forms a cyclic amide ring.

16. The process for the synthesis of an oxonol compound as claimed in claim 14, wherein Y is 4-pyridyl.

17. The process for the synthesis of an oxonol compound as claimed in claim 12, wherein X is a heterocyclic group represented by the following formula (Xa):

in which W is an atomic group that forms a heterocyclic ring.

18. The light-sensitive material as claimed in claim 8, wherein each of $W^1$ and $W^2$ in formula (I) is independently an atomic group that forms a pyrazolone ring.

19. The light-sensitive material as claimed in claim 8, wherein Z in formula (I) is an atomic group that forms a five or six-membered heterocyclic ring.

20. The light-sensitive material as claimed in claim 8, wherein the oxonol compound is represented by the following formula (Ia):

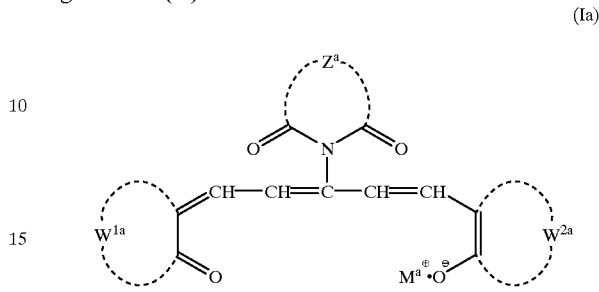

in which each of $Z^a$, $W^{1a}$ and $W^{2a}$ independently is an atomic group that forms a heterocyclic ring; and $M^a$ is a cation.

21. The light-sensitive material as claimed in claim 8, wherein the oxonol compound is represented by the following formula (Ib):

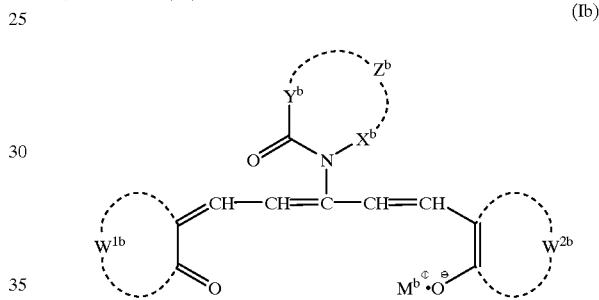

in which $X^b$ is —CHR$^{1b}$—, —CR$^{2b}$=, —NR$^{3b}$— or —N=, wherein R$^{1b}$ is hydrogen, hydroxyl or carboxyl, R$^{2b}$ is hydrogen or is combined with R$^{8b}$ to form a benzene ring condensed with the cyclic amide ring, and R$^{3b}$ is hydrogen or an alkyl group having 1 to 20 carbon atoms; $Y^b$ is —CR$^{4b}$R$^{5b}$—, —CR$^{6b}$= or —NR$^{7b}$—, wherein each of R$^{4b}$, R$^{5b}$ and R$^{7b}$ independently is hydrogen or an alkyl group having 1 to 20 carbon atoms, and R$^{6b}$ is hydrogen or is combined with R$^{9b}$ to form a benzene ring condensed with the cyclic amide ring; $Z^b$ is —CH$_2$—, —CR$^{8b}$=, —N=, CR$^{9b}$—, —CH$_2$—CH$_2$—, —NH—CH$_2$—, =CH—CH=, or —CO—CH$_2$—, wherein the right side is attached to $X^b$, the left side is attached to $Y^b$, R$^{8b}$ is hydrogen or is combined with R$^{2b}$ to form a benzene ring condensed with the cyclic amide ring, and R$^{9b}$ is hydrogen or is combined with R$^{6b}$ to form a benzene ring condensed with the cyclic amide ring; each of W$^{1b}$ and W$^{2b}$ independently is an atomic group that forms an acidic nucleus ring; and $M^b$ is a cation.

22. The light-sensitive material as claimed in claim 8, wherein the oxonol compound is represented by the following formula (IIA), (IIIA), (IIB), (IIIB), (IIC) or (IIIC):

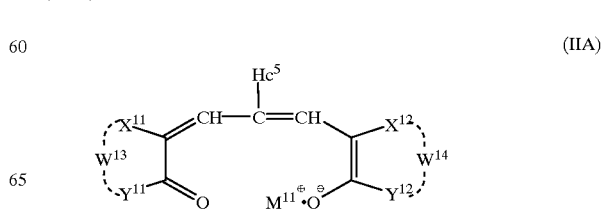

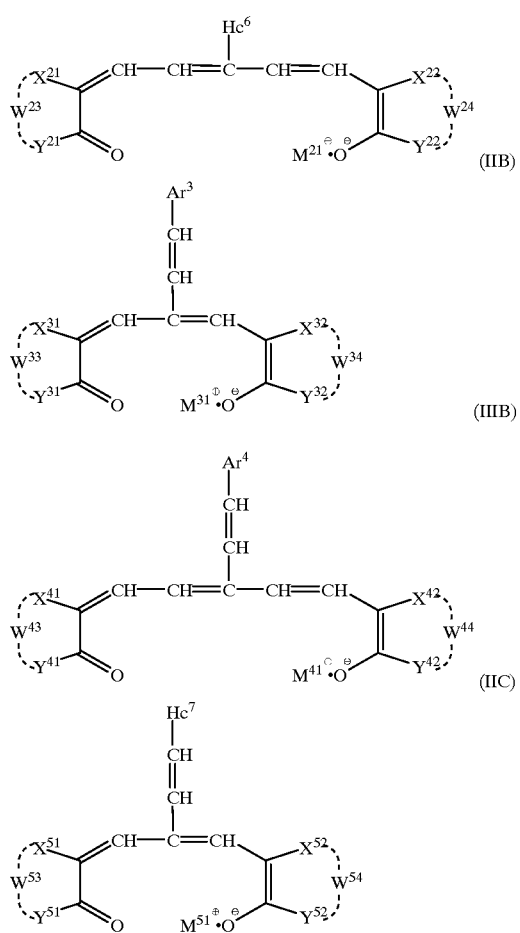

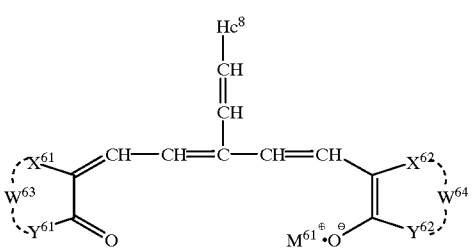

in which each of $X^{11}$, $X^{12}$, $X^{21}$, $X^{22}$, $X^{31}$, $X^{32}$, $X^{41}$, $X^{42}$, $X^{51}$, $X^{52}$, $X^{61}$ and $X^{62}$ independently is —CR$^{11}$=, —CO— or —NR$^{12}$—; each of $Y^{11}$, $Y^{12}$, $Y^{21}$, $Y^{22}$, $Y^{31}$, $Y^{32}$, $Y^{41}$, $Y^{42}$, $Y^{51}$, $Y^{52}$, and $Y^{61}$ independently is —NR$^{13}$—, —N= or —O—; $Y^{62}$ is —NR$^{13}$— or —N=; each of $R^{11}$, $R^{12}$ and $R^{13}$ independently is an alkyl group having 1 to 6 carbon atoms, an aralkyl group having 7 to 10 carbon atoms, an alkoxy group having 1 to 6 carbon atoms, an aryl group having 6 to 15 carbon atoms, an alkoxycarbonyl group having 2 to 6 carbon atoms, an acyl group having 2 to 6 carbon atoms, a carbamoyl group having 1 to 8 carbon atoms, a sulfamoyl group having 1 to 8 carbon atoms, a substituted amino group having 1 to 10 carbon atoms, carboxyl or a salt thereof; each of $W^{13}$, $W^{14}$, $W^{23}$, $W^{24}$, $W^{33}$, $W^{34}$, $W^{43}$, $W^{44}$, $W^{53}$, $W^{54}$, $W^{63}$ and $W^{64}$ independently is an atomic group that forms an acidic nucleus ring; each of $M^{11}$, $M^{21}$, $M^{31}$, $M^{41}$, $M^{51}$ and $M^{61}$ independently is a cation; each of $Hc^5$, $Hc^6$, $Hc^7$ and $Hc^8$ independently is an unsaturated heterocyclic group; and each of $Ar^3$ and $Ar^4$ independently is an aromatic group.

* * * * *